(12) United States Patent
Gupta et al.

(10) Patent No.: US 11,262,714 B2
(45) Date of Patent: Mar. 1, 2022

(54) BUILDING MANAGEMENT SYSTEM WITH EQUIPMENT SCHEDULE AND SETPOINT SYNCHRONIZATION AND CONTROL

(71) Applicant: Johnson Controls Technology Company, Auburn Hills, MI (US)

(72) Inventors: Vivek V. Gupta, Shorewood, WI (US); Yogesh Jalkote, Pune (IN); Vikram Ashok Lunge, Pune (IN); Mark T. Fischbach, Milwaukee, WI (US); John S. Jilek, Grafton, WI (US); Benjamin D. Sanfelippo, Glendale, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 31 days.

(21) Appl. No.: 16/429,600

(22) Filed: Jun. 3, 2019

(65) Prior Publication Data
US 2020/0379420 A1    Dec. 3, 2020

(51) Int. Cl.
*G05B 15/02* (2006.01)
*G06F 21/62* (2013.01)
*G06F 21/60* (2013.01)

(52) U.S. Cl.
CPC .......... *G05B 15/02* (2013.01); *G06F 21/602* (2013.01); *G06F 21/6218* (2013.01)

(58) Field of Classification Search
CPC .... G05B 15/02; G06F 21/602; G06F 21/6218
USPC ...................................................... 700/275
See application file for complete search history.

(56) References Cited

U.S. PATENT DOCUMENTS

| | | | |
|---|---|---|---|
| 2002/0166053 A1* | 11/2002 | Wilson | G06F 21/62 713/189 |
| 2005/0040248 A1 | 2/2005 | Wacker et al. | |
| 2007/0055757 A1* | 3/2007 | Mairs | H04L 12/281 709/223 |
| 2011/0015802 A1* | 1/2011 | Imes | G05D 23/1923 700/300 |
| 2014/0031992 A1* | 1/2014 | Bergman | F24F 11/00 700/276 |
| 2014/0245071 A1* | 8/2014 | Drees | H02J 13/00002 714/39 |
| 2017/0045864 A1* | 2/2017 | Fadell | F24F 11/30 |
| 2017/0276571 A1* | 9/2017 | Vitullo | G06Q 10/06 |

(Continued)

*Primary Examiner* — Jigneshkumar C Patel
(74) *Attorney, Agent, or Firm* — Foley & Lardner LLP

(57) ABSTRACT

A building management system includes building equipment operable to affect a physical state of a building. The building management system includes a system manager coupled to the building equipment via a system bus, the system manager comprising a schedule manager configured to control an operation schedule of the building equipment. A client device is configured to communicate with the schedule manager to modify operation schedules of the building equipment or add new operation schedules for the building equipment. The schedule manager comprises a list of available schedules for the building equipment and is configured to, in response to modification of the operation schedules or addition of new operation schedules, update the list of available schedules to include the modification or the new operation schedule. The enterprise batch synchronization module is configured to create, copy, modify and apply schedule and setpoint configuration templates to multiple cloud connected building equipment simultaneously.

19 Claims, 44 Drawing Sheets

(56) References Cited

U.S. PATENT DOCUMENTS

2019/0180355 A1\* 6/2019 Suzuki ................ G08G 1/149
2020/0073419 A1   3/2020 Pickard et al.

\* cited by examiner

3800

| | |
|---|---|
| Spaces | SCHEDULES 🔔 |
| | ADD SCHEDULE |
| Devices | Schedule Name — 3802 |
| | [Church Lobby Schedule] |
| Data Share | Status — 3804 |
| Interlocks | [Enabled] [Disabled] |
| | Schedule Type |
| Schedule Sync | [ON/OFF ▼] — 3806 |
| › Setting | Schedule Devices and Points — 3808 |
| › Admin | Select devices to be controlled by this schedule |
| | Generic IOM [BO-3] |
| | [Select devices and points] — 3810   3814 |
| | [Weekly] [Exceptions] — 3812   [+Add Exception] |
| | Currently, no exceptions added. |
| 3818 — [Cancel] [Save] — 3816 |

| | |
|---|---|
| Spaces | SCHEDULES 🔔 |
| | ADD SCHEDULE |
| Devices | Select which point(s) you wish to control with this schedule. De-select points which you do not wish to control. |
| Data Share | ☐ York RTU 10 - Occupancy Schedule |
| Interlocks | ☑ Generic IOM-BO1 |
| | ☑ Generic IOM-BO2 |
| Schedule Sync | ☐ Generic IOM-BO3 |
| › Setting | ⚠ Generic IOM-BO3 is being controlled by Zone Schedule |
| › Admin | ☐ Zone Coordinator |
| | ⚠ Zone Coordinator is being controlled by Zone Schedule |
| | [Cancel] [Save] — 3904 |
| 3906 |

FIG. 39     3902

BUILDING MANAGEMENT SYSTEM WITH EQUIPMENT SCHEDULE AND SETPOINT SYNCHRONIZATION AND CONTROL

BACKGROUND

The present disclosure relates generally to building management systems. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system comprising building equipment operable to affect a physical state or condition of a building. The building management system includes a system manager coupled to the building equipment via a system bus, the system manager comprising a schedule manager configured to control an operation schedule of the building equipment. A client device is configured to communicate with the schedule manager to modify the operation schedule of the building equipment or add a new operation schedule for the building equipment. The schedule manager comprises a list of available schedules for the building equipment and is configured to, in response to a modification of the operation schedule or an addition of the new operation schedule, update the list of available schedules to include the modification of the operation schedule or the new operation schedule.

Another implementation of the present disclosure is a method for monitoring and controlling building equipment in a building management system. The method includes operating building equipment to affect a physical state or condition of a building and identifying new building equipment in communication with the building management system. The method further includes discovering new equipment schedules within the new building equipment and comparing the new equipment schedules with existing equipment schedules to determine if any of the new equipment schedules are substantially different from the existing equipment schedules. The method also includes providing a schedule manager with different schedules, the different schedules being the new equipment schedules that are substantially different from the existing equipment schedules and updating a list of schedules in the schedule manager to include the different schedules.

A further implementation of the present disclosure is a building management system comprising building equipment operable to affect a physical state or condition of a building and a system manager coupled to the building equipment via a system bus. The system manager comprises a malfunction detector in communication with a diagnostic file creator, the malfunction detector configured to detect a current or future malfunction of the building equipment. The diagnostic file creator is in communication with an encrypted code generator, the diagnostic file creator configured to create a diagnostic file comprising data regarding the current or future malfunction of the building equipment. The encrypted code generator is in communication with a client device and an enterprise system, the encrypted code generator configured to create a code related to the diagnostic file.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 38 is an illustration of a user interface to view which devices to associate with a schedule, according to some embodiments.

FIG. 39 is an illustration of a user interface to select points to control, according to some embodiments.

DETAILED DESCRIPTION

Overview

Referring generally to the FIGURES, a building management system (BMS) and components thereof are shown according to various exemplary embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In brief overview, the BMS described herein provides a system manager that facilitates synchronizing schedules between equipment (e.g., HVAC systems, lighting systems, etc.) across multiple building sites. In some embodiments, the system manager can discover building equipment and determine whether the equipment is controlled by a schedule. If controlled by a schedule, the system manager can then incorporate the equipment schedule into the master schedule database. The system manager can also push new or modified schedules, or exceptions to those schedules, to building equipment across multiple building sites simultaneously (e.g., synchronizing schedules in batches across multiple building sites). In some embodiments, the system manager can determine setpoints associated with building equipment and incorporate those setpoints into the master setpoint database. The system manager can also push new or modified setpoints, or exceptions to the setpoints, to building equipment across multiple building sites simultaneously (e.g. synchronizing setpoints in batches across multiple building sites). In some embodiments, the system manager can control access to building equipment data logs by encrypting the electronic file (e.g., the diagnostic file) in which the data is stored. The system manager generates a unique passcode that can be used in conjunction with other encrypted information to access the file. The encrypted file and unique passcode can either be downloaded locally or pushed to the enterprise connection.

The system manager can perform these functions as described for a single building, across multiple buildings in the same geographic location, or across multiple buildings spread across different geographic locations via an enterprise connection.

Building and HVAC System

Figure 1:
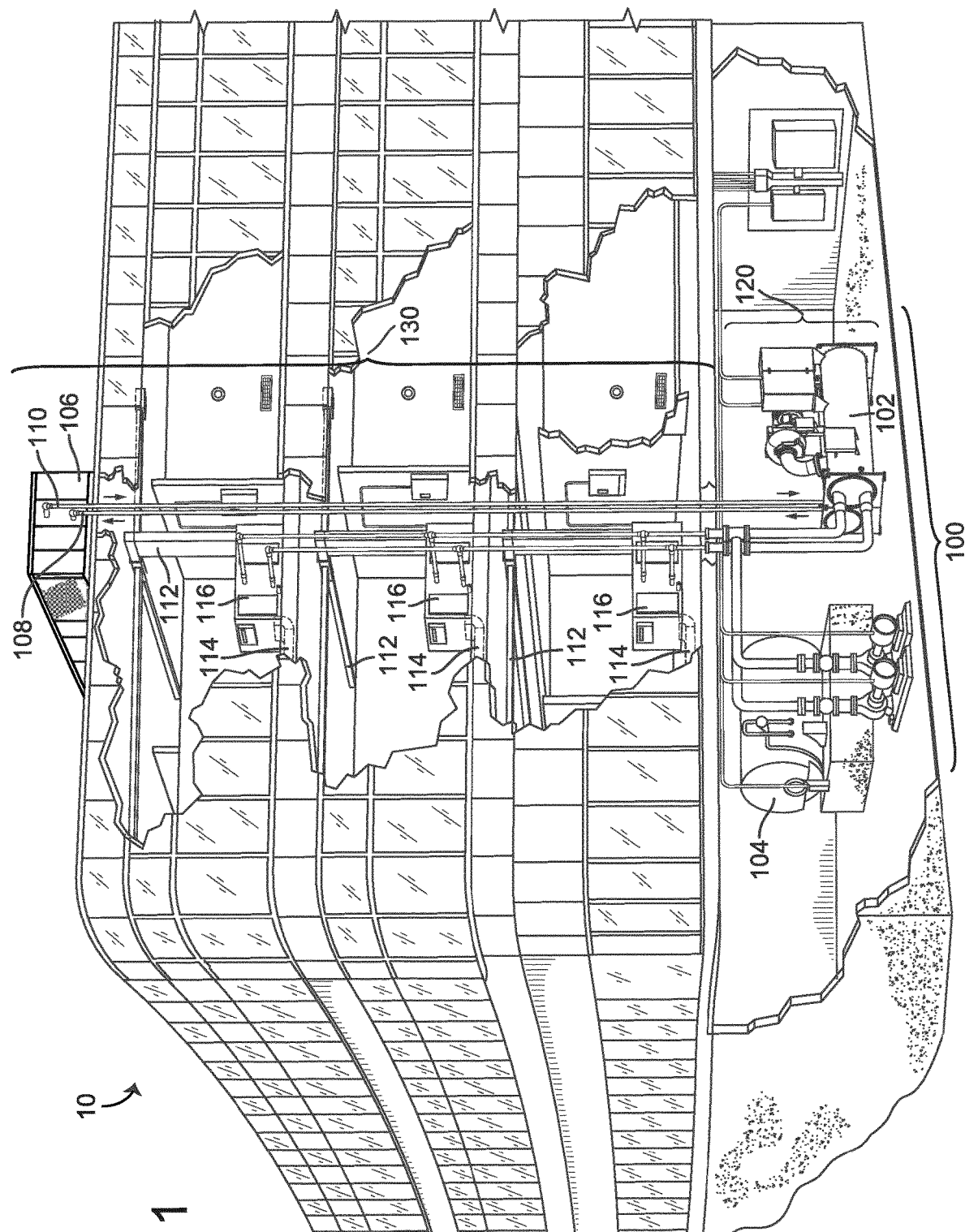
FIG. 1 is drawing of a building equipped with a heating, ventilating, and air conditioning (HVAC) system, according to some embodiments.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Building Management System

Figure 2:
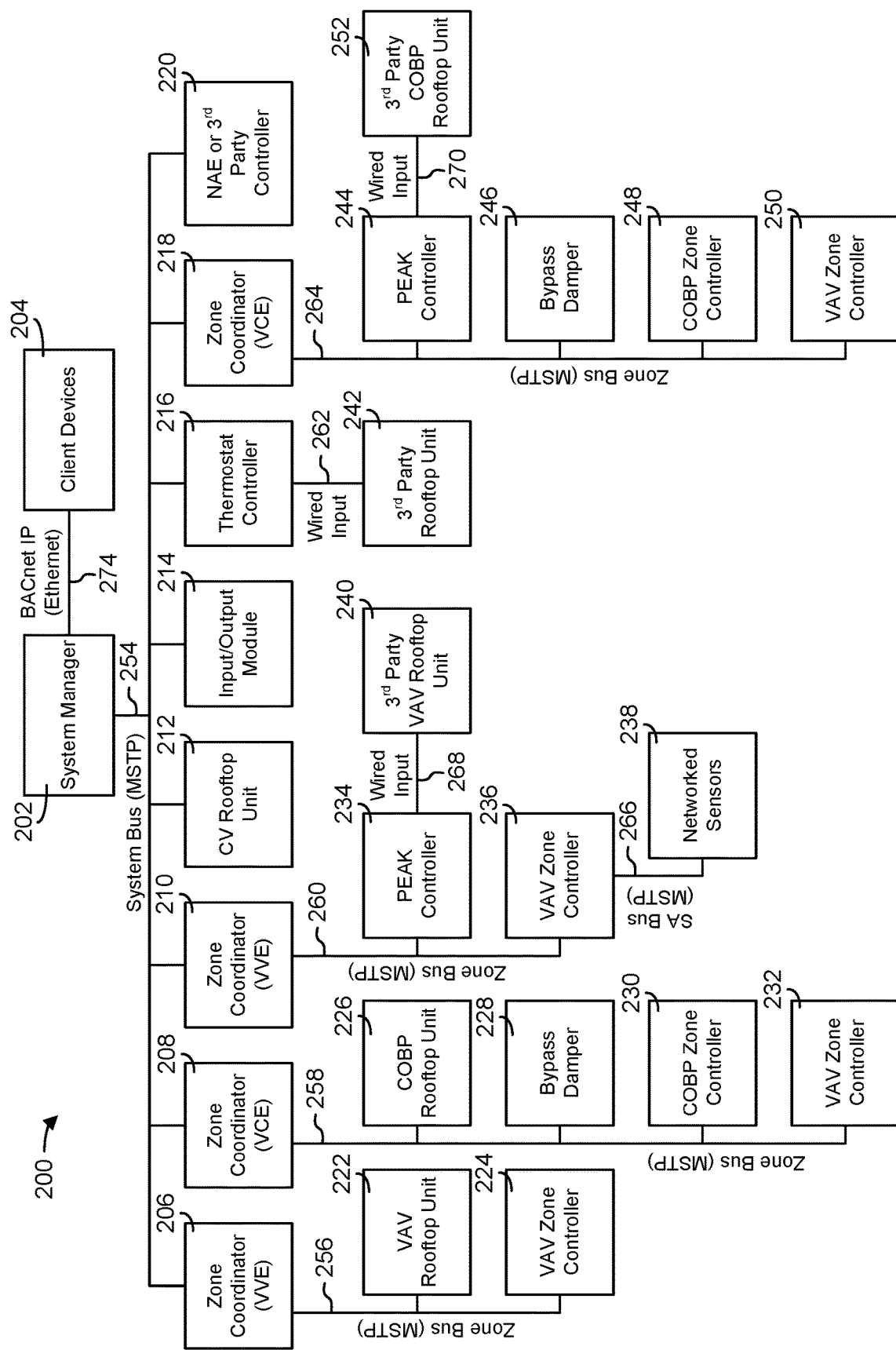
FIG. 2 is a block diagram of a building management system (BMS) which can be used to monitor and control the building and HVAC system of FIG. 1, according to some embodiments.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the devices of HVAC system 100 (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202 (i.e., a smart building hub); several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 274 (e.g., BACnet IP, Ethernet, wired or wireless communications, etc.). System manager 202 can provide a user interface to client devices 204 via data communications link 274. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (TOM) 214, a thermostat controller 216 (e.g., a TEC3000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 302. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

System Manager

Figure 3:
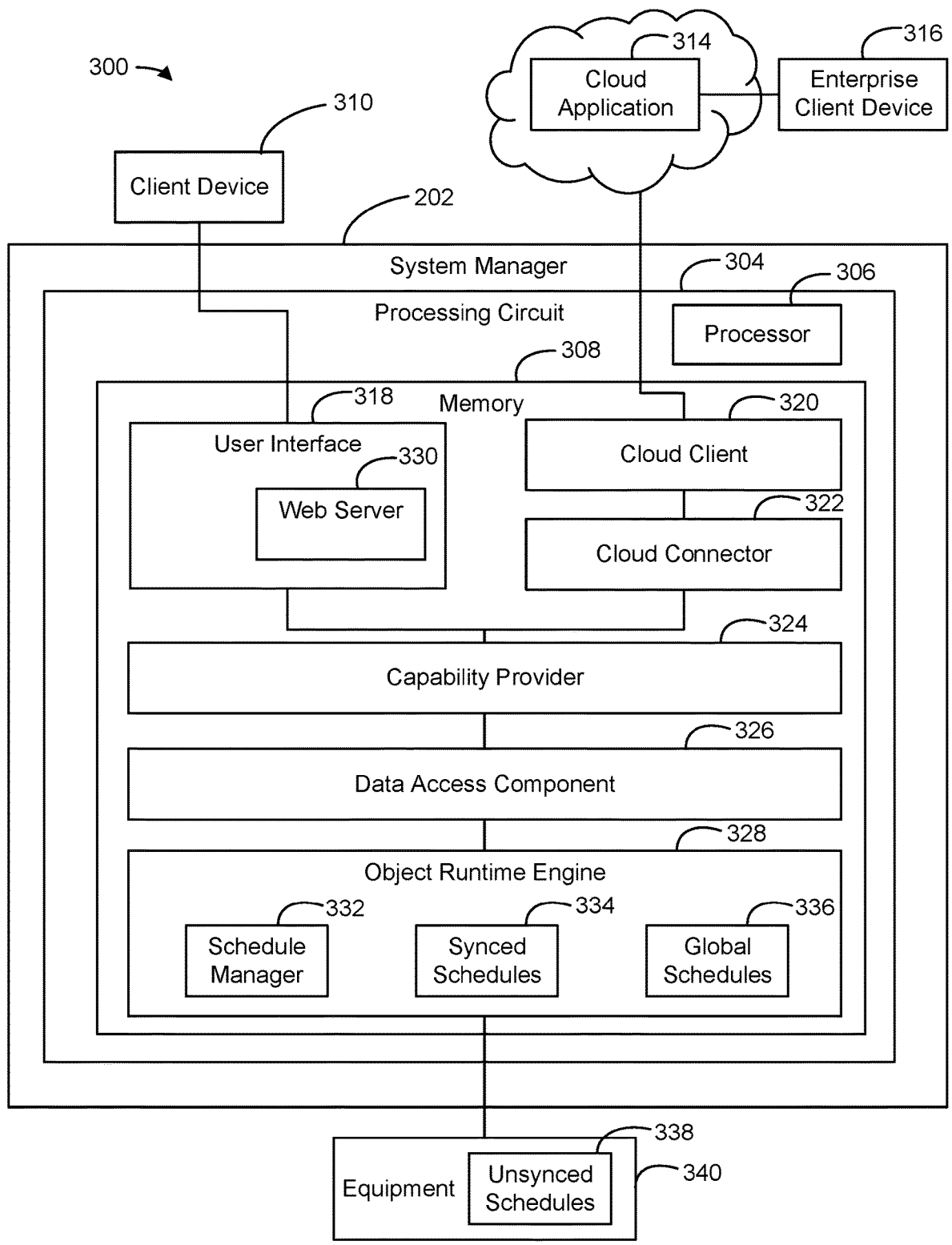
FIG. 3 is a block diagram illustrating the system manager of the BMS of FIG. 2 in greater detail, according to some embodiments.

Referring now to FIG. 3, a block diagram illustrating the system manager 202 of the BMS of FIG. 2 in greater detail is shown, according to an exemplary embodiment. The system manager 202 is shown to include a processing circuit 304. The processing circuit 304 is shown to include a processor 306 and a memory 308. The processor 306 can be a general purpose or specific purpose processor, an application specific integrated circuit (ASIC), one or more field programmable gate arrays (FPGAs), a group of processing components, or other suitable processing components. The processor 306 is configured to execute computer code or instructions stored in the memory 308 or received from other computer readable media (e.g., CDROM, network storage, a remote server, etc.).

The memory 308 can include one or more devices (e.g., memory units, memory devices, storage devices, etc.) for storing data and/or computer code for completing and/or facilitating the various processes described in the present disclosure. The memory 308 can include random access memory (RAM), read-only memory (ROM), hard drive storage, temporary storage, non-volatile memory, flash memory, optical memory, or any other suitable memory for storing software objects and/or computer instructions. The memory 308 can include database components, object code components, script components, or any other type of information structure for supporting the various activities and information structures described in the present disclosure. The memory 308 can be communicably connected to the processor 306 via the processing circuit 304 and can include computer code for executing (e.g., by the processor 306) one or more processes described herein. When the processor 306 executes instructions stored in the memory 308, the processor 306 generally configures the system manager 202 (and more particularly the processing circuit 304) to complete such activities.

Still referring to FIG. 3, the system manager 202 is shown to include an object runtime engine (ORE) 328, a data access component 326, a capability provider 324, a user interface 318, a cloud connector 322, and a cloud client 320. The system manager 202 is also shown to communicate with a client device 310, a cloud application 314, and equipment 340.

The ORE 328 is shown further include a schedule manager 332, synced schedules 334, and global schedules 336. The ORE 328 is configured to support communication between the system manager 202 and the equipment 340 by including equipment models and view definitions. An equipment model defines equipment object attributes, view definitions, schedules, trends, and the associated BACnet value objects (e.g., analog value, binary value, multistate value, etc.) that are used for integration with other systems. Some devices in the BMS 200 store their own equipment models. Other devices in the BMS 200 have equipment models stored externally (e.g., within other devices). For example, a zone coordinator can store the equipment model for a bypass damper. In some embodiments, the zone coordinator automatically creates the equipment model for the bypass damper and/or other devices on the zone bus. Other zone coordinators can also create equipment models for devices connected to their zone busses. The equipment model for a device can be created automatically based on the types of data points exposed by the device on the zone bus, device type, and/or other device attributes.

The view definition may identify a set of attributes for a particular device that are core to the functionality of the device. Each device or type of device in the BMS 200 may have a different view definition. For example, the view definition for a chiller controller may identify the chiller outlet temperature as an important data point; however, the view definition for a valve controller may not identify such a data point as important to the operation of the valve. In some embodiments, the view definition for a device identifies a subset of the data objects defined by the equipment model for the device. The web server 330 may use the view definition to dynamically select a subset of the stored data objects for inclusion in a web interface (e.g., a webpage) generated by web server 330.

The schedule manager 332 is configured to maintain a list of schedules that are available for use with the equipment 340. In some embodiments, the schedule manager 332 maintains a single list of schedules that includes the synced schedules 334 and the global schedules 336. In some embodiments, the schedule manager 332 maintains separate lists of schedules for the synced schedules 334 and the global schedules 336.

Synced schedules 334 are schedule objects located within the system manager 202 and are configured to store the schedule configuration that can be applied to one or more schedule objects located in the equipment 340. The schedule configuration can include any type of schedule that the equipment 340 can follow (e.g. a weekly schedule or an exception to a schedule). In some embodiments, synced schedules 334 can be used to apply the same schedule to a plurality of equipment 340 at the same building site. In some embodiments, the synced schedules 334 can be used to apply the same schedule to a plurality of equipment 340 across different building sites.

Global schedules 336 are schedule objects located within the system manager 202 and are configured to evaluate the schedule configuration that applies to the current day. In some embodiments, global schedules 336 are used when the equipment 340 does not have a schedule to follow or when a user chooses to schedule a property on the equipment 340 that the equipment 340 does not control. In some embodiments, global schedules 336 are used to control setpoints on the equipment. For example, global schedules 336 may be used to set a specific temperature within a synced schedule 334 without disrupting the synced schedule 334 or the equipment controlled by the synced schedule 334.

Unsynced schedules 338 are schedule objects located within the equipment 340 and are configured to store the schedule configuration that can be applied to the equipment 340. The schedule configuration can include any type of schedule that the equipment 340 can follow (e.g. a weekly schedule or an exception to a schedule). In some embodiments, the unsynced schedules 338 cannot be used to apply the same schedule to a plurality of equipment 340 across different building sites because the unsynced schedules 338 are not pushed to the system manager 202. In some embodiments, the unsynced schedules 338 can be used to apply the same schedule to a plurality of equipment 340 across different building sites after the unsynced schedules 338 are shared with the system manager 202.

The data access component 326 is configured to relay data between the ORE 328 and the capability provider 324. The ORE 328 may be compatible with a particular type of non-proprietary computer language (e.g., JavaScript Object Notation or JSON) and the data coming from the capability provider 324 may be compatible with a proprietary computer language. The data access component 326 is configured to covert the non-proprietary computer language to the proprietary computer language, and vice-versa, such that communication between the equipment 340 and the system manager 202 is possible.

The capability provider 324 is configured to function as a feature server for system manager 202. The capability provider 324, the cloud connector 322, and the user interface 318 and can process the inputs and outputs of the system manager 202 (e.g., both device- and user-oriented). The capability provider 324 can interact with the cloud client 320 to serve various features of the cloud application 314 to the system manager 202. Features of the cloud application 314 served by the capability provider 324 can include, for example, time series, alarms, schedules, write property, data model, system settings, and software update. Other features of the cloud application 314 served by the capability provider 324 may include interlock, data share, audit, and fault detection and diagnostics (FDD). The features and functionality of the cloud application 314 are described in greater detail below.

The cloud connector 322 can be configured to interact with both the capability provider 324 and the cloud client 320. The cloud connector 322 can translate concepts from the system manager 202 concepts (e.g., Verasys concepts) into cloud concepts to allow the system manager 202 to communicate with the cloud application 314. The cloud connector 322 can also translate cloud concepts into system manager concepts to allow data from the cloud application 314 to be received and processed by the system manager 202.

The cloud client 320 can be configured to interact with the cloud application 314. In some embodiments, the cloud client 320 includes a library that encapsulates an internet-of-things (IoT) hub SDK with a data platform wrapper. The cloud client 320 can be configured to understand the endpoints, APIs, and other services provided by the cloud application 314 and can be configured to communicate with the cloud application 314. In some embodiments, the cloud client 320 is configured to exchange messages with the cloud application 314 using the native messaging format of the cloud application 314 (e.g., JSON).

The user interface 318 is configured to present schedule data from the web server 330 to the client device 310 in a manner suitable for the client device 310. For example, the user interface 318 may configure schedule data to be viewed on a mobile device if a user is accessing the information via a mobile device. The user interface 318 may configure schedule data to be viewed on a widescreen monitor if a user is accessing the information via a desktop computer.

The web server 330 is configured to receive a schedule request from the client device 310 and can generate a response that includes the requested schedule information. For example, a user may wish to view the available schedules for a chiller and request the information via the web server 330. The web server 330 would then retrieve that information and provide it to the user via the user interface 318. In some embodiments, the web server 330 communicates with the capability provider 324 to generate the requested schedule information. In some embodiments, the web server 330 communicates with the data access component 326 to generate the requested schedule information. In some embodiments, the web server 330 communicates with the ORE 328 to generate the requested schedule information.

The system manager 202 is further shown to communicate with a client device 310. The client device 310 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with BMS 200, and/or the various subsystems, and devices thereof. The client device 310 can be a computer workstation, a client terminal, a remote or local interface, or any other type of user interface device. The client device 310 can be a stationary terminal or a mobile device. For example, the client device 310 can be a desktop computer, a computer server with a user interface, a laptop computer, a tablet, a smartphone, a PDA, or any other type of mobile or non-mobile device.

The system manager 202 is further shown to communicate with a cloud application 314. The cloud application 314 can include a variety of cloud-based services and/or applications configured to store, process, analyze, or otherwise consume the data collected from the system manager 202. The cloud application 314 may be accessed by various users (e.g., enterprise users, mechanical contractors, cloud application users, etc.). Some users can access and interact with the system manager 202 directly via client devices 310 (e.g., via a UI provided by the system manager 202), whereas other users can interact with the cloud application 314 (e.g., via a UI provided by cloud application 314).

The cloud application 314 is further shown to communicate with an enterprise client device 316. The enterprise client device 316 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with BMS 200 (via the cloud application 314), and/or the various subsystems, and devices thereof. The enterprise client device 316 can be a computer workstation, a client terminal, a remote or local interface, or any other type of user interface device. The enterprise client device 316 can be a stationary terminal or a mobile device. For example, enterprise client device 316 can be a desktop computer, a computer server with a user interface, a laptop computer, a tablet, a smartphone, a PDA, or any other type of mobile or non-mobile device.

The system manager is further shown to communicate with the equipment 340. The equipment 340 can be any of the building equipment described in FIGS. 1-2, e.g., boilers, chillers, variable air volume units, heating coils, cooling coils, fans, and any other building equipment that is configured to follow a schedule of operation.

The equipment 340 is further shown to include unsynced schedules 338. The unsynced schedules 338 are schedule objects that are located within the equipment 340 that is connected to the system manager 202. The unsynced schedules 338 evaluate the schedule configuration that applies to the current day and write the values of properties accordingly. The unsynced schedules 338 cannot be created by the BMS 200 or the system manager 202.

Figure 4:
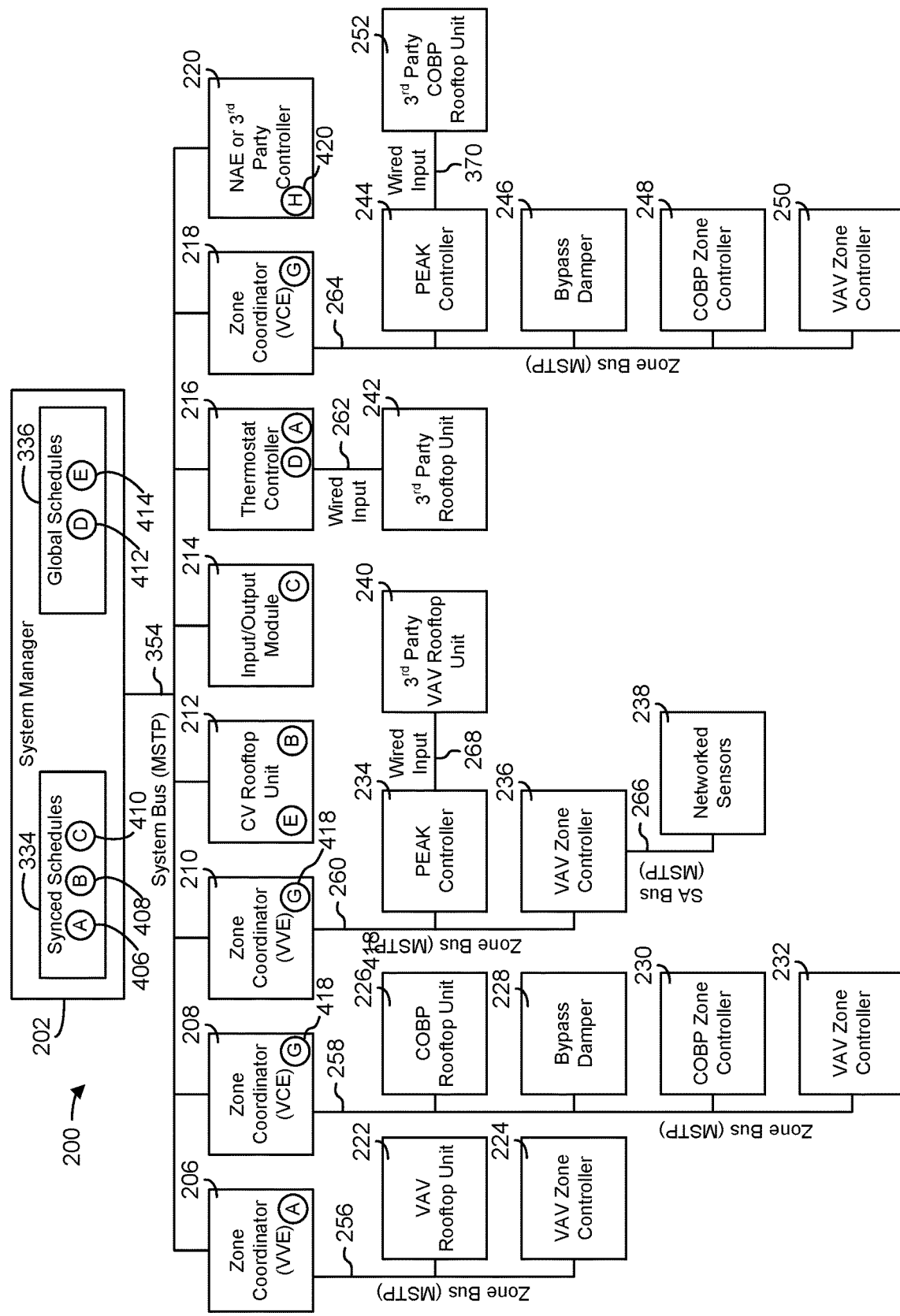
FIG. 4 is a block diagram of the BMS of FIG. 2 in greater detail, according to some embodiments.

Referring now to FIG. 4, a block diagram of the building management system (BMS) 200 of FIG. 2 is shown in greater detail, according to an exemplary embodiment. Synced schedules 334 is shown to include a schedule object A 406, a schedule object B 408, and a schedule object C 410. The global schedules 336 is shown to include a schedule object D 412 and a schedule object E 414. The zone coordinators 208, 210, and 218 are shown to include an unsynced equipment schedule object G 418, and the NAE 220 is shown to include an unsynced equipment schedule object H 420.

The unsynced equipment schedule objects G 418 and H 420 are equipment schedule objects input at the equipment site by a user. For example, a user at the building site may determine that the zone coordinators 208, 210, and 218, and the NAE 220 should follow a schedule that is not one of the available synced schedule objects. In some embodiments, the user may determine that the zones controlled by the zone controllers 208, 210, and 218 must remain at a cooler temperature than would be provided by any of the available synced schedules. The user would then program the schedule object G 418 into the zone coordinators 208, 210, and 218 such that the zone coordinators 208, 210, and 218 maintain the cooler temperature. In some embodiments, the user may determine that the NAE 220 must remain on for a longer period than would be provided by any of the available synced schedules. The user would then program the schedule object H 420 into the NAE 220 such that NAE 220 remained on for a longer period.

The schedule objects A 406, B 408, and C 410 are synced schedules that reside within the system manager 202. The schedule objects A 406, B 408, and C 410 include configuration information regarding a schedule that can be pushed to individual equipment or devices. Once the schedule object is pushed to a device or piece of equipment, it becomes linked to a local schedule object on the device or equipment, and the local schedule object actually controls the device or equipment. For example, the schedule object A 406 may include a weekly schedule that controls the temperature. When pushed to the zone coordinator 206 and the thermostat controller 216, the information in the schedule object A 406 is linked to local schedule objects within the zone coordinator 206 and the thermostat controller 216. The zone coordinator 206 and the thermostat controller 216 are then controlled by the local schedule objects that are linked to schedule object A 406 and therefore control the zone coordinator 206 and the thermostat controller 216 based on the schedule in the schedule object A 406.

The schedule objects D 412 and E 414 are global schedules that reside within the system manager 202. The schedule objects D 412 and E 414 include configuration information regarding a setpoint that can be pushed to individual equipment or devices that include a synced schedule. Once the schedule object is pushed to a device or piece of equipment, it becomes linked to the synced schedule on the device or equipment. For example, the schedule object A 406 may be linked to the local schedule object of the thermostat controller 216. In some embodiments, a user may determine that the temperature setpoint of the schedule object A 406 is too low and should be increased for the thermostat controller 216. However, the user may also determine that the temperature increase may not need to be linked to each device or piece of equipment that is linked to the schedule object A 406. To avoid modifying the operation of each device or piece of equipment linked to the schedule object A 406 (e.g., the zone coordinators 206 and 216), the global schedule object D 412 can be pushed only to the thermostat 216. In this way, the overall schedule of schedule object A 406 (e.g., a weekly schedule) is still followed by the thermostat controller, however the setpoints within schedule object A 406 would follow the global schedule object D 412.

Schedule Manager

Figure 5:
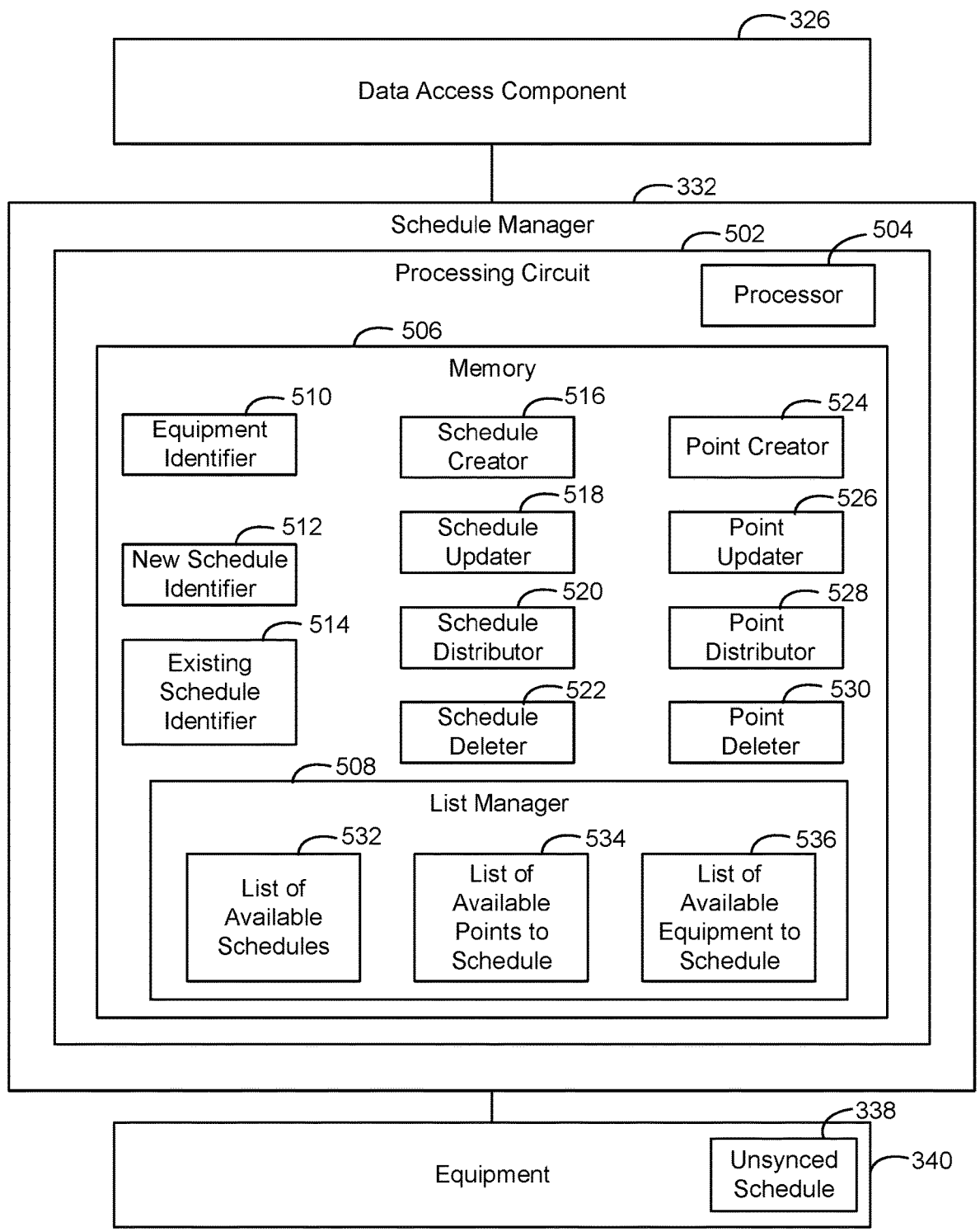
FIG. 5 is a block diagram illustrating a schedule manager of the system manager of FIG. 3, according to some embodiments.

Referring now to FIG. 5, a block diagram illustrating the schedule manager 332 of the system manager of FIG. 3 is shown, according an exemplary embodiment. The schedule manager 332 is shown to include a processing circuit 502. Processing circuit 502 is further shown to include a processor 504 and a memory 506. The processor 504 can be a general purpose or specific purpose processor, an application specific integrated circuit (ASIC), one or more field programmable gate arrays (FPGAs), a group of processing components, or other suitable processing components. The processor 504 is configured to execute computer code or instructions stored in the memory 506 or received from other computer readable media (e.g., CDROM, network storage, a remote server, etc.).

The memory 506 can include one or more devices (e.g., memory units, memory devices, storage devices, etc.) for storing data and/or computer code for completing and/or facilitating the various processes described in the present disclosure. The memory 506 can include random access memory (RAM), read-only memory (ROM), hard drive storage, temporary storage, non-volatile memory, flash memory, optical memory, or any other suitable memory for storing software objects and/or computer instructions. The memory 506 can include database components, object code components, script components, or any other type of information structure for supporting the various activities and information structures described in the present disclosure. The memory 506 can be communicably connected to the processor 504 via the processing circuit 502 and can include computer code for executing (e.g., by the processor 504) one or more processes described herein. When the processor 504 executes instructions stored in the memory 506, the processor 504 generally configures the schedule manager 332 (and more particularly the processing circuit 502) to complete such activities.

The memory 506 is further shown to include an equipment identifier 510, a new schedule identifier 512, an existing schedule identifier 514, a schedule creator 516, a schedule updater 518, a schedule distributor 520, a schedule deleter 522, a point creator 524, a point updater 526, a point distributor 528, a point deleter 530, and a list manager 508.

The equipment identifier 510 is configured to determine if any new equipment 340 is available and add any new equipment 340 to the list of available equipment to schedule 536. In some embodiments, the equipment identifier 510 automatically detects when new equipment 340 is connected to the system manager 202. For example, the equipment identifier 510 may be constantly monitoring the network for new equipment 340. When new equipment 340 (e.g, a chiller) is installed and connected to the network, the equipment identifier 510 recognizes and identifies the new equipment 340. In some embodiments, the equipment identifier 510 detects new equipment 340 when the new equipment 340 sends a signal through the network. When the new equipment (e.g., a chiller) sends a signal through the network, the equipment identifier 510 recognizes and identifies the new equipment.

The new schedule identifier 512 is configured to determine whether equipment 340 on the system manager 202 includes a schedule that is not already included within the schedule manager 332. In some embodiments, the new schedule identifier 512 automatically detects whether equipment 340 includes a schedule not already included within the schedule manager 332. For example, the new schedule identifier 512 may be constantly monitoring the system manager 202 for new schedules. When a new schedule is identified (e.g., when new equipment 340 is installed and includes a new schedule), the new schedule identifier 512 recognizes and identifies the new schedule.

The existing schedule identifier 514 is configured to determine whether the equipment 340 on the system manager 202 includes a schedule that is already included within the schedule manager 332. In some embodiments, the existing schedule identifier 514 automatically detects whether equipment 340 includes a schedule that is already included within the schedule manager 332. For example, the existing schedule identifier 514 may be constantly monitoring the system manager for existing schedules. When an existing schedule is identified (e.g., when new equipment 340 is installed and includes an existing schedule), the existing schedule identifier 514 recognizes and identifies the existing schedule.

The schedule creator 516 is configured to create a new schedule that can be pushed to the equipment 340 connected to the system manager 202 and add the new schedule to the list of available schedules 532. In some embodiments, the schedule creator 516 creates a schedule based on user input. For example, a user may determine that a new schedule is required for a piece of equipment 340 (e.g., a boiler). The user would then access the schedule creator 516 through the system manager 202 and create the desired schedule that could then be pushed to the piece of equipment 340. After the new schedule is created, the list of available schedules 532 would be updated to include the newly created schedule.

The schedule updater 518 is configured to update or modify an existing schedule that can be pushed to the equipment 340 that is connected to the system manager 202. In some embodiments, the schedule updater 518 modifies an existing schedule based on user input. For example, a user may determine that a schedule controlling some of the equipment 340 is not ideal and should be modified. The user would then access the schedule updater 518 through the system manager 202 and modify the desired schedule. The equipment 340 would then operate under the modified schedule.

The schedule distributor 520 is configured to push schedules to equipment 340. In some embodiments, the schedule distributor 520 can automatically push a schedule to a new piece of equipment 340 based on the equipment model and/or the location of the equipment 340. For example, the schedule distributor 520 may automatically distribute a certain schedule for a boiler in a cold location to a new boiler installed in Alaska. In some embodiments, the schedule distributor 520 can push a schedule to equipment 340 upon request from a user. For example, equipment 340 may be operating under a certain schedule, however a user determines that a different schedule would be better for the equipment 340. The user would then request the schedule distributor 520 push the different schedule to equipment 340 to replace the previous schedule.

The schedule deleter 522 is configured to delete schedules from the list of available schedules 532. In some embodiments, the schedule deleter 522 can automatically delete a schedule from the equipment 340 when the equipment 340 is removed the system manager 202. For example, one type of chiller that requires a certain schedule may be replaced by another type of chiller that requires a different schedule. When the replaced chiller is removed and the system manager 202 no longer detects the replaced chiller, the schedule deleter 522 can delete the schedule of the replaced chiller from the list of available schedules 532.

The point creator 524 is configured to create a new point that can be pushed to the equipment 340 connected to the system manager 202 and add the new point to the list of available points to schedule 534. In some embodiments, the point creator 524 creates a point based on user input. For example, a user may determine that a new point is required for a piece of the equipment 340 (e.g., a boiler). The user would then access the point creator 524 through the system manager 202 and create the desired point that could then be pushed to the piece of equipment 340. After the new point is created, the list of available points to schedule 534 would be updated to include the newly created point.

The point updater 526 is configured to update or modify an existing point that can be pushed to the equipment 340 that is connected to the system manager 202. In some embodiments, the point updater 526 modifies an existing point based on user input. For example, a user may determine that a point controlling the setpoint of some of the equipment 340 (e.g., the temperature setting of a thermostat) is not ideal and should be modified. The user would then access the point updater 526 through the system manager 202 and modify the desired point. The equipment 340 would then operate under the same schedule with the modified point.

The point distributor 528 is configured to push points to the equipment 340. In some embodiments, the point distributor 528 can automatically push a schedule to a new piece of equipment 340 based on the equipment model and/or the location of the equipment 340. For example, the point distributor 528 may automatically distribute a certain point for a boiler in a cold location to a new boiler installed in Alaska. In some embodiments, the point distributor 528 can push a point to equipment 340 upon request from a user. For example, the equipment 340 may be operating under a certain point, however a user determines that a different point would be better for the equipment 340. The user would then request the point distributor 528 push the different point to equipment 340 to replace the previous point.

The point deleter 530 is configured to delete points from the list of available points to schedule 534. In some embodiments, the point deleter 530 can automatically delete a point from the equipment 340 when the equipment 340 is removed the system manager 202. For example, one type of chiller that requires a certain point may be replaced by another type of chiller that requires a different point. When the replaced chiller is removed and the system manager 202 no longer detects the replaced chiller, the point deleter 530 can delete the point from the list of available points to schedule 534.

The list manager 508 further includes the list of available schedules 532, the list of available points to schedule 534, and the list of available equipment to schedule 536. The list of available schedules 532 includes all of the schedules that can be pushed to the equipment 340 (e.g., weekly schedules, monthly schedules, weekend schedules, etc.). For example, the list of available schedules 532 can include a weekly schedule for a boiler indicating when the boiler should be operational Monday through Friday.

The list of available points to schedule 534 includes all of the possible setpoints for the equipment 340 that can be pushed to the equipment 340 (e.g., temperature setpoints, lights on/off setpoints, door lock/unlock setpoints, etc.). For example, the list of available points to schedule on a thermostat can include all possible temperatures settings on the thermostat.

The list of available equipment to schedule 536 includes all of the equipment 340 that is recognized by the system manager 202 (e.g., chillers, boilers, air handlers, etc.). For example, a new boiler that is discovered by the equipment identifier 510 would then be included in the list of available equipment to schedule 536.

Figure 6:
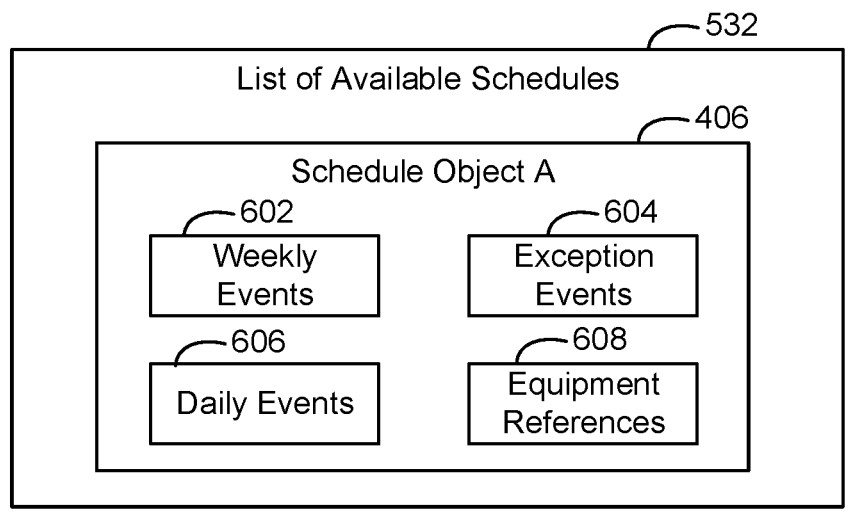
FIG. 6 is a block diagram illustrating a list of available schedules within the schedule manager of FIG. 5, according to some embodiments.

Referring now to FIG. 6, a block diagram illustrating the list of available schedules 532 within the schedule manager 332 of FIG. 5 is shown, according to an exemplary embodiment. The list of available schedules 532 is shown to include the schedule object A 406. The schedule object A 406 is further shown to include weekly events 602, exception events 604, daily events 606, and equipment references 608.

The weekly events 602 include schedule events that occur on a weekly basis. In some embodiments, the weekly events 602 can include security events. For example, a weekly event 602 for a security system may include locking access doors during non-business hours and weekends, and unlocking doors during business hours. In some embodiments, the weekly events 602 can include climate events. For example, a weekly event 602 for a HVAC system may include turning the heat up during business hours when employees are in the office, and turning the heat down outside of business hours and during weekends when employees are not in the office.

The daily events 606 include schedule events that occur on a daily basis. In some embodiments, the daily events 606 can include climate events. For example, a daily event 606 for a HVAC system may include turning the air conditioning higher during the hottest hours of the day, but turning it lower during the early morning and evening hours to save energy.

The exception events 604 include schedule events that occur on an irregular basis. In some embodiments, the exception events 604 can include holiday events. For example, an exception event 604 for a security system may include locking access doors during a national holiday when all businesses are closed, even though the holiday occurs on a normal workday when the access doors would normally be unlocked. In some embodiments, the exception events 604 may include lighting events. For example, an exception event for a lighting system may include turning the lights off during a company holiday party when all the employees are out of the office, even though the company holiday party occurs on a normal workday when the lights would otherwise be on. The exception events 604 serve to provide a user a way to alter the operation of critical building functions and equipment 340 without changing the normal operating schedules of the equipment 340.

The equipment references 608 include references to the equipment 340 that can adhere to the schedule object A 406. In some embodiments, the equipment references 608 include a group of equipment 340 with similar characteristics. For example, the equipment references 608 can include references to a group of boilers that can use the schedule object A 406. If the schedule object A 406 is mistakenly pushed to a different piece of equipment 340 (e.g., a chiller), the equipment reference 608 for the boiler would not match the equipment profile of a chiller, and the discrepancy would cause the chiller to reject the schedule object A 406 because the schedule object of the chiller would not be compatible with the schedule object designed for a boiler.

Figure 7:
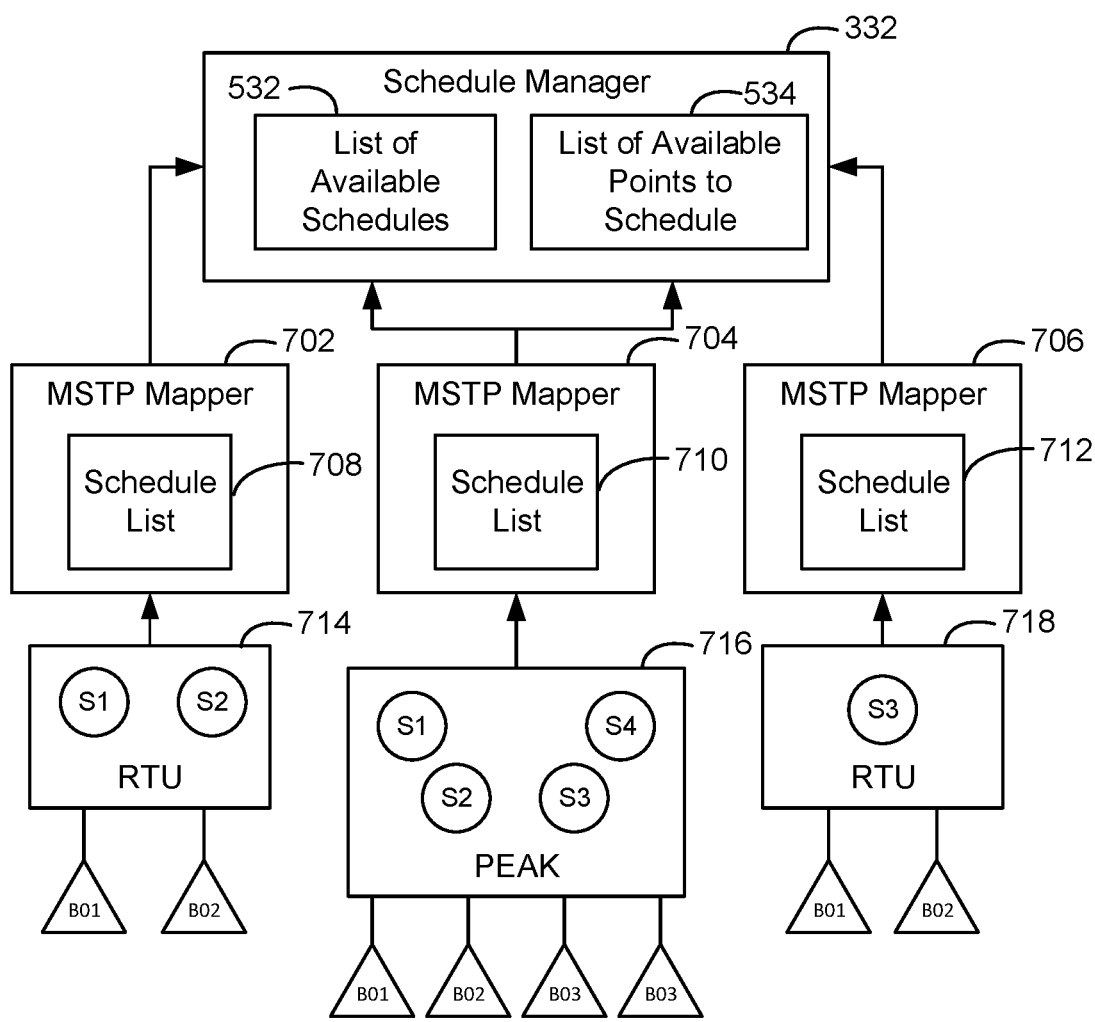
FIG. 7 is a block diagram illustrating the schedule manager of FIG. 5 discovering schedules, according to some embodiments.

Referring now to FIG. 7, a block diagram illustrating the schedule manager 332 of FIG. 5 discovering schedules is shown, according to an exemplary embodiment. The schedule manager 332 is shown to be in communication with the MSTP mappers 702, 704, and 706. The MSTP mappers 702, 704, and 706 are objects created when a new piece of equipment 340 is added to the system manager 202. In some embodiments, the MSTP mappers 702, 704, and 706 are configured to discover all the available objects within the new equipment 340. After discovering all the available objects with the new equipment 340, the available objects are compiled into a schedule list, which is supplied to the list of available schedules 532 and the list of available points to schedule 534.

For example, the MSTP mapper 702 is shown to further include schedule list 708, the MSTP mapper 704 is further shown to include a schedule list 710, and the MSTP mapper 706 is further shown to include a schedule list 712. The MSTP mapper 702 is configured to communicate with the RTU 714 and discover all objects within the RTU 714. The MSTP mapper 702 may discover that the RTU 714 includes two available schedules, S1 and S2, and two available points, B01 and B02. The available schedules and points would then be compiled by the schedule list 708 and communicated to the schedule manager 332 such that S1 and S2 would be added to the list of available schedules 532 and the list of available points to schedule 534. The same process would occur for the PEAK 716 and the RTU 718 such that schedules S3 and S4, and point B03 would be added to the list of available schedules 532 and the list of available points to schedule 534, respectively.

Figure 8:
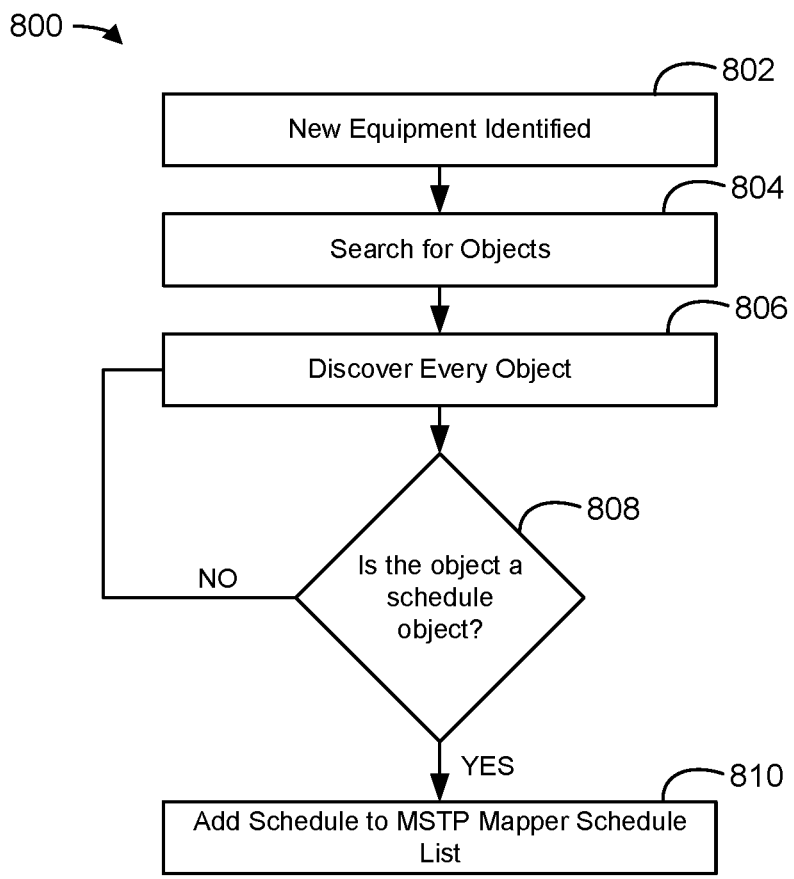
FIG. 8 is a flow diagram illustrating a technique which can be used to discover devices and schedules, according to some embodiments.

Referring now to FIG. 8, a flow diagram illustrating a process 800 which can be used to discover devices and schedules is shown, according to an exemplary embodiment. Process 800 can be performed by one or more components of the system manager 202, as described with reference to FIGS. 3-7. In some embodiments, process 800 is performed by the system manager 202 when a new equipment 340 is identified.

Process 800 is shown to include identifying a new piece of equipment within the system manager 202 (step 802). For example, step 802 can include using address information (e.g., MAC addresses, network addresses, etc.) of the new equipment 340 to identify the new equipment. In some embodiments, the new equipment 340 can present itself to the system manager 202 using an equipment model to identify itself. When the new equipment 340 is identified, an MSTP mapper object is created and is associated with the new equipment 340.

Process 800 is shown to include searching for objects within the new equipment (step 804). For example, the MSTP mapper object created when the new equipment 340 is identified searches for objects within the new equipment 340.

Process 800 is shown to include discovering every object within the new equipment (step 806). For example, the MSTP mapper object will continue to identify objects within the new equipment 340 until no other new objects are found.

Process 800 is shown to include determining whether the objects discovered are schedule objects (step 808). For example, the MSTP mapper may find many different objects within the new equipment 340 including object attributes, view definitions, trends, and schedules.

If the object discovered by the MSTP mapper is not a schedule object (NO at step 808), the MSTP mapper will continue searching for objects within the new equipment 340. If the object discovered by the MSTP mapper is a schedule object (YES at step 808), then the schedule is added to the schedule list within the MSTP mapper to then be included with the list of available schedules 532 or the list of available points to schedule 534 (step 810).

Figure 9:
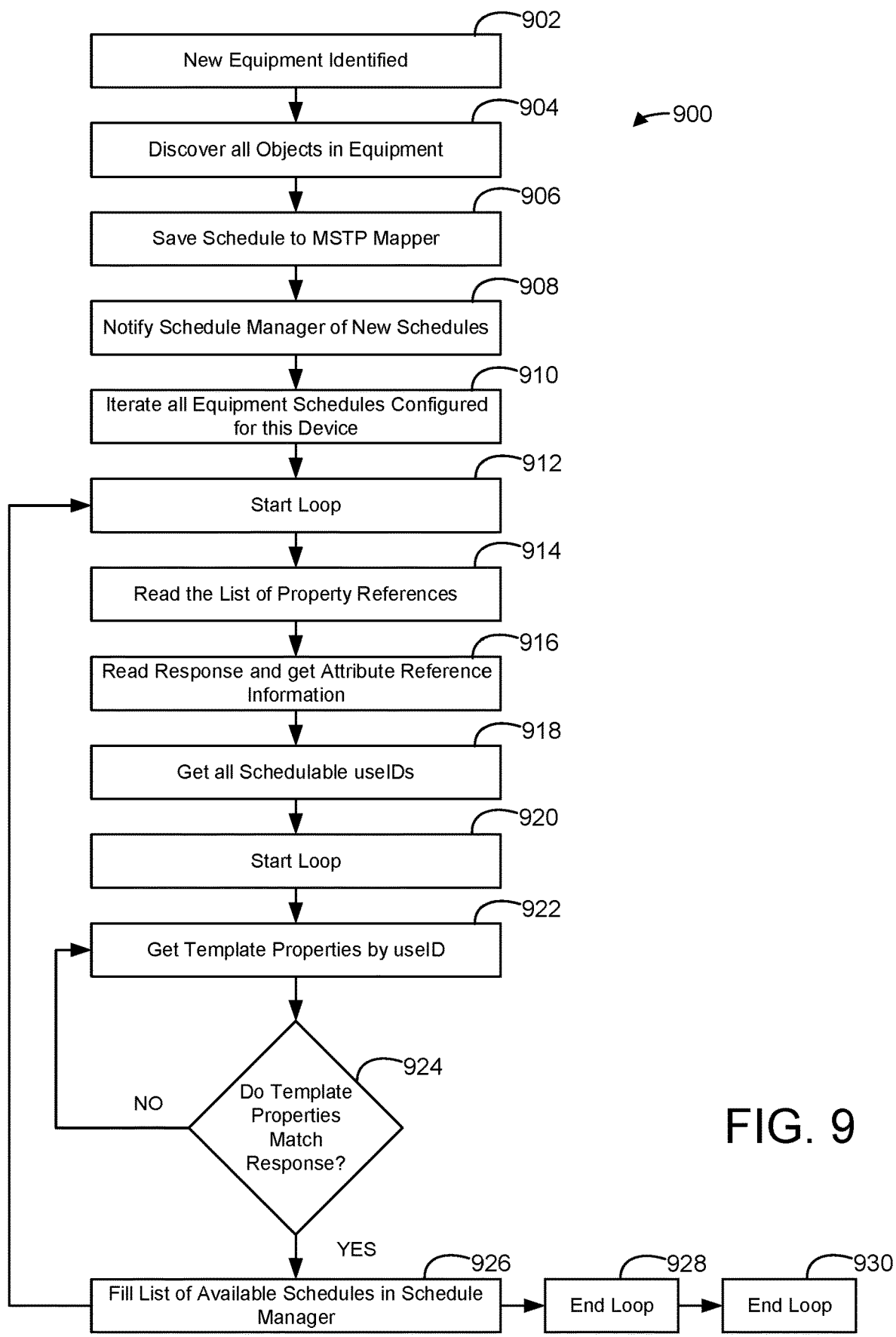
FIG. 9 is a flow diagram illustrating a technique which can be used to populate a list of available schedules in the schedule manager of FIG. 5, according to some embodiments.

Referring now to FIG. 9, a flow diagram illustrating a process 900 which can be used to populate a list of available schedules in the schedule manager 332 of FIG. 5 is shown, according to some embodiments. Process 900 can be performed by one or more components of the system manager 202, as described with reference to FIGS. 3-7. In some embodiments, process 900 is performed by the system manager 202 when a new equipment 340 is identified.

Process 900 is shown to include identifying new equipment (step 902). As described above, step 902 can include using address information (e.g., MAC addresses, network addresses, etc.) of the new equipment to identify the new equipment. In some embodiments, the new equipment can present itself to the system manager 202 using an equipment model to identify itself. When the new equipment is identified, an MSTP mapper object is created and is associated with the new equipment.

Process 900 is shown to include discovering all objects in the equipment (step 904). As described above, the MSTP mapper object created when the new equipment is identified searches for objects within the new equipment.

Process 900 is shown to include saving the schedules discovered to the MSTP mapper (step 906). If the object discovered by the MSTP mapper is a schedule object, then the schedule is added to the schedule list within the MSTP mapper. This step will continue until all schedule objects within the equipment have been identified and added to the schedule list within the MSTP mapper.

Process 900 is shown to include notifying the schedule manager 202 that new schedules are available (step 908). After the schedule objects identified by the MSTP mapper are added to the schedule list within the MSTP mapper, the MSTP mapper provides the system manager 202 the schedule list that includes the schedule objects identified in the new equipment.

Process 900 is shown to include iterating across all equipment schedules configured for the new equipment (step 910). The system manager 202 then determines which of the equipment available in the list of available equipment to schedule 536 is similar to the new equipment. For example, if the new equipment is a chiller, the system manager will determine which of the equipment available in the list of available equipment to schedule 536 is also a chiller. When all of the equipment similar to the new equipment has been identified, the system manager 202 will iterate the process 900 across all of the schedules for the similar equipment and begin a loop (step 912).

Process 900 is shown to include reading the list of property references for the new equipment (step 914). For example, the system manager 202 will read the property references of the schedules of the new equipment such as all the points the schedule controls, where the schedule is used, and the use identification of the schedule.

Process 900 is shown to include reading a response and getting attribute reference information (step 916). For example, the system manager 202 will read the property references of the schedules of the new equipment and determine if any new schedules may be available in the new equipment.

Process 900 is shown to include getting all schedulable useIDs (step 918). For example, when the system manager 202 determines that new schedules may be available from the new equipment, the system manager 202 retrieves all of the useIDs (e.g., unique identifiers) of the schedules and iterates over those schedules (step 920).

Process 900 is shown to include getting template properties by useID (step 922). For example, the system manager 202 retrieves the properties of the schedules of the similar equipment (e.g., all the points the schedule controls, where the schedule is used, the use identification schedule, etc.).

Process 900 is shown to include determining whether the template properties match the response (step 924). If the template properties do not match the response (NO at step 924), the system manager 202 continues to iterate through the available template properties. If the template properties match the response (YES at step 924), the system manager 202 includes the schedule of the new equipment in the list of available schedules 532 (step 926). After looping through all the available property references and template properties, the loops end (steps 928 and 930).

Figure 10:
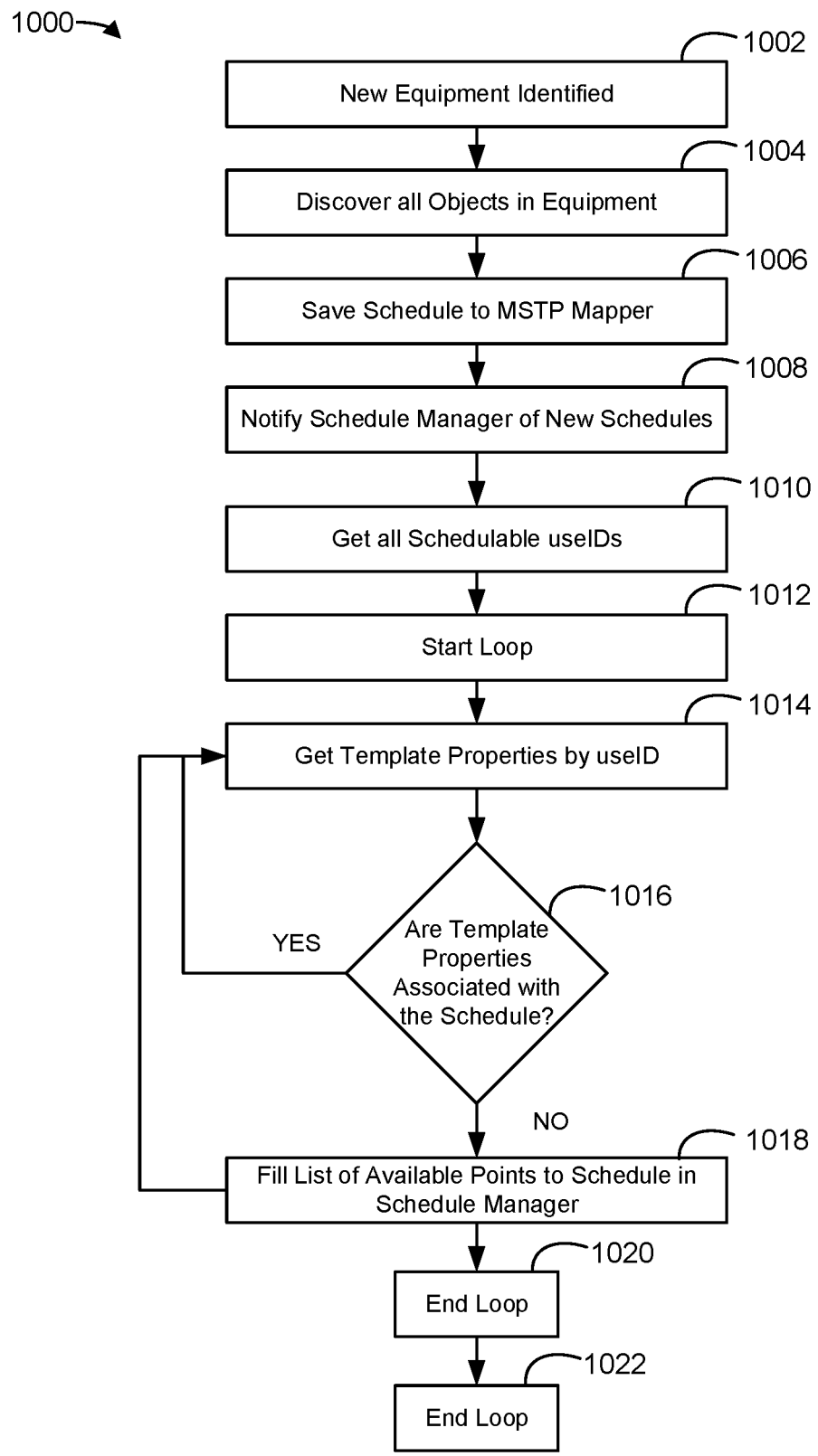
FIG. 10 is a flow diagram illustrating a technique which can be used to populate a list of available points to schedule in the schedule manager of FIG. 5, according to some embodiments.

Referring now to FIG. 10, a flow diagram illustrating a process 1000 which can be used to populate a list of available points to schedule in the schedule manager 332 of FIG. 5 is shown, according to some embodiments. Process 1000 can be performed by one or more components of the system manager 202, as described with reference to FIGS. 3-7. In some embodiments, process 1000 is performed by the system manager 202 when a new equipment 340 is identified.

Process 1000 is shown to include identifying new equipment (step 1002). As described above, step 1002 can include using address information (e.g., MAC addresses, network addresses, etc.) of the new equipment to identify the new equipment. In some embodiments, the new equipment can present itself to the system manager 202 using an equipment model to identify itself. When the new equipment is identified, an MSTP mapper object is created and is associated with the new equipment.

Process 1000 is shown to include discovering all objects in the equipment (step 1004). As described above, the MSTP mapper object created when the new equipment is identified searches for objects within the new equipment.

Process 1000 is shown to include saving the schedules discovered to the MSTP mapper (step 1006). If the object discovered by the MSTP mapper is a schedule object, then the schedule is added to the schedule list within the MSTP mapper. This step will continue until all schedule objects within the equipment have been identified.

Process 1000 is shown to include notifying the schedule manager 202 that new schedules are available (step 1008). After the schedule objects identified by the MSTP mapper are added to the schedule list within the MSTP mapper, the MSTP mapper provides the system manager 202 the schedule list that includes the schedule objects identified in the new equipment.

Process 1000 is shown to include getting all schedulable useIDs (step 1010). For example, when the system manager 202 determines that new schedules may be available from the new equipment, the system manager retrieves all of the useIDs (e.g., unique identifiers) of the schedules and iterates over those schedules (step 1012).

Process 1000 is shown to include getting template properties by useID (step 1014). For example, the system manager 202 retrieves the properties of the schedules of the similar equipment (e.g., all the points the schedule controls, where the schedule is used, the use identification schedule, binary outputs, etc.).

Process 1000 is shown to include determining whether the template properties are associated with the schedule (step 1016). If the template properties are associated with the schedule (YES at step 1016), the system manager 202 continues to iterate through the available template properties. If the template properties are not associated with the schedule (NO at step 924), the system manager 202 includes the template properties (e.g., point values, binary outputs, etc.) in the list of available points to schedule 534 (step 1018). After looping through all the available property references and template properties, the loops end (steps 1020 and 1022).

Figure 11:
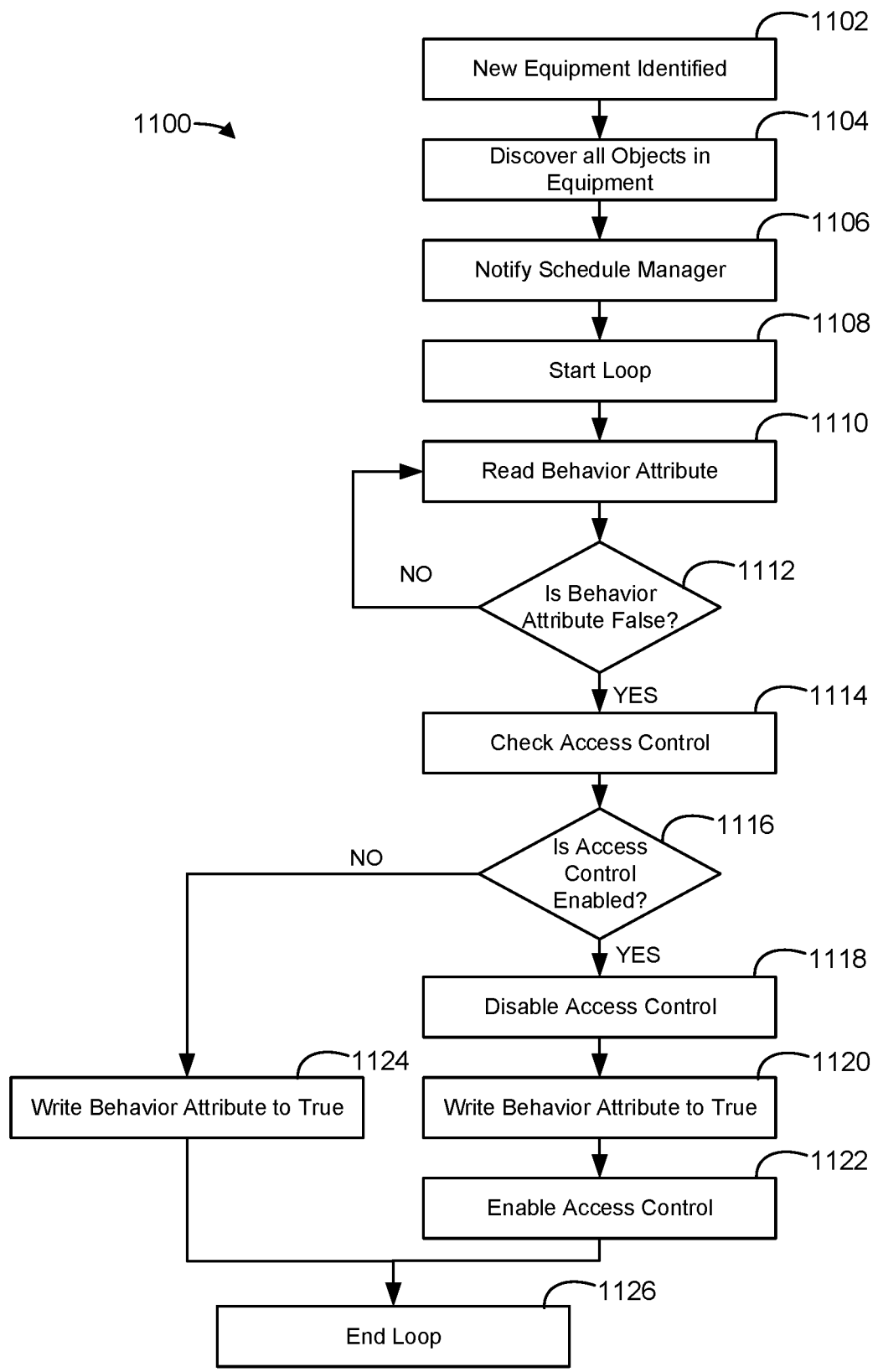
FIG. 11 is a flow diagram illustrating a technique which can be used to provide access to modify schedules, according to some embodiments.

FIG. 11 is a flow diagram illustrating a process 1100 which can be used to provide access to modify schedules, according to some embodiments. Process 1100 can be performed by one or more components of the system manager 202, as described with reference to FIGS. 3-7.

In some embodiments, process 1100 is performed by the system manager 202 when a new equipment 340 is identified.

Process 1100 is shown to include identifying new equipment (step 1102). As described above, step 1002 can include using address information (e.g., MAC addresses, network addresses, etc.) of the new equipment to identify the new equipment. In some embodiments, the new equipment can present itself to the system manager 202 using an equipment model to identify itself. When the new equipment is identified, an MSTP mapper object is created and is associated with the new equipment.

Process 1100 is shown to include discovering all objects in the equipment (step 1104). As described above, the MSTP mapper object created when the new equipment is identified searches for objects within the new equipment.

Process 1100 is shown to include notifying the schedule manager 202 that new schedules are available (step 1106). After the schedule objects identified by the MSTP mapper are added to the schedule list within the MSTP mapper, the MSTP mapper provides the system manager 202 the schedule list that includes the schedule objects identified in the new equipment and the schedule manager 332 iterates over those schedules (step 1108).

Process 1100 is shown to include reading a behavior attribute (step 1110). The behavior attribute controls access to schedules and the ability to add, delete, or modify schedules. To allow for access control, the behavior attribute must be set to TRUE. In some embodiments, access control is permitted if the behavior attribute is set to FALSE but access control is enabled. For example, a user may attempt to modify an existing schedule only to find access to the schedule is blocked because the behavior attribute of the schedule is set to FALSE and access control is not enabled.

Process 1100 is shown to include determining whether a behavior attribute is FALSE (step 1112). If the behavior attribute is not FALSE (NO at step 1112, e.g, if the behavior attribute is TRUE), the system manager 202 will continue to iterate over the equipment schedules. If the behavior attribute is FALSE (YES at step 1112), the system manager 202 proceeds to check whether access control is enabled (step 1114).

Process 1100 is shown to include determining whether access control is enabled (step 1116). If access control is enabled (YES at step 1116), the system manager 202 proceeds to disable access control (step 1118).

Process 1100 is shown to include writing the behavior attribute to TRUE (step 1120). After access control is disabled, the system manager 202 must first change the behavior attribute to TRUE, and then the system manager 202 can enable access control (step 1122). Process 1100 then ends (step 1126).

If access control is not enabled (NO at step 1116), then the system manager 202 does not need to disable access control and can proceed with writing the behavior attribute to TRUE (step 1124), thereby providing access to a user to add, edit, or delete a schedule. Process 1100 then ends (step 1126).

Creating or Updating a New Schedule

Figure 12:
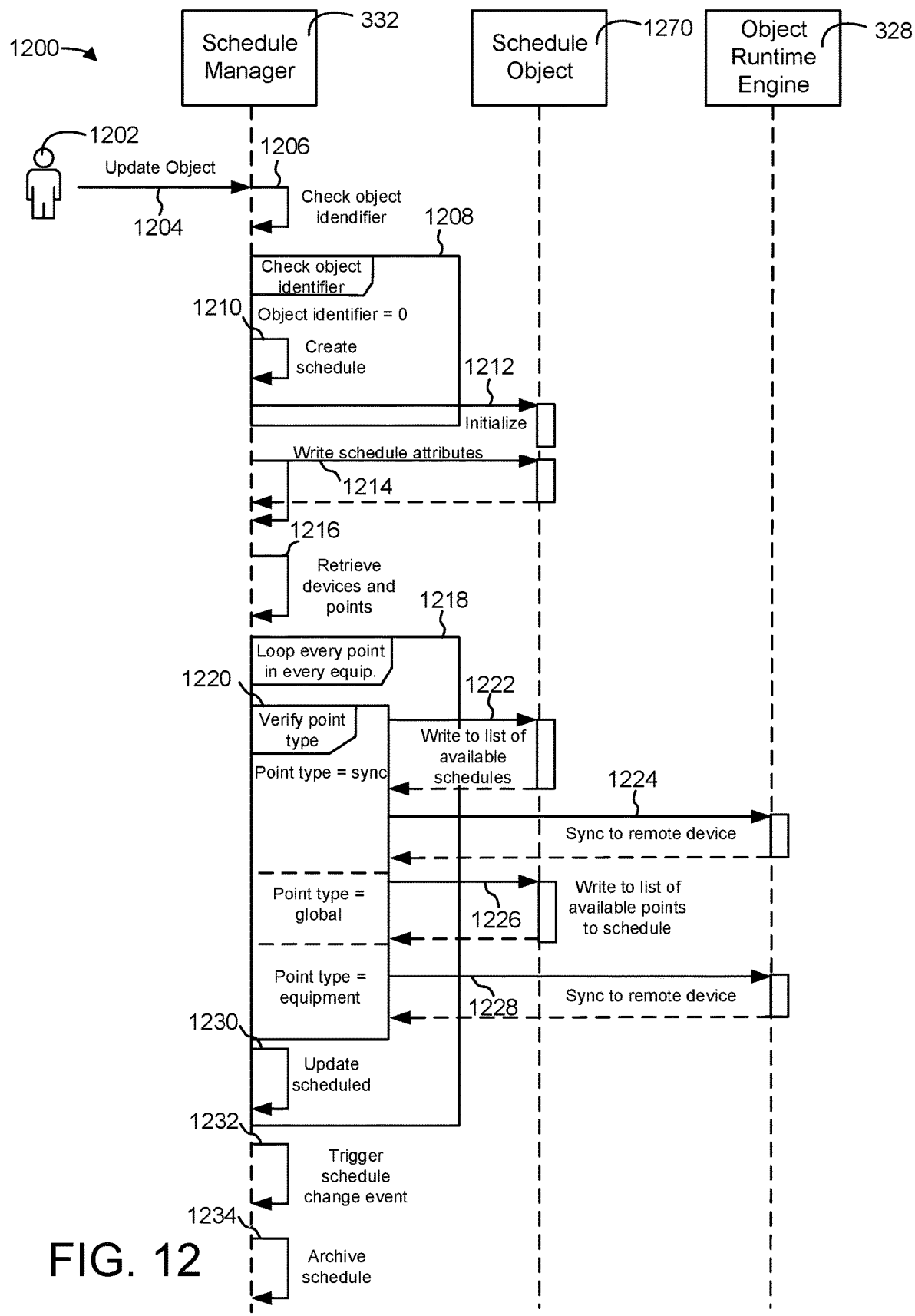
FIG. 12 is a sequence diagram illustrating a process for creating or updating a new schedule which can be performed by the schedule manager of FIG. 5, according to some embodiments.

Referring now to FIG. 12, a sequence diagram illustrating a process 1200 for creating or updating a new schedule which can be performed by the schedule manager 332 of FIG. 5 is shown, according to some embodiments. Process 1200 can be performed by one or more components of the system manager 202 to create or update a new schedule.

The process 1200 is shown to include a user 1202 sending a request to the schedule manager 332 to update a schedule object (step 1204). The schedule manager 332 then initiates a process to check the schedule object identifier (step 1206). The process to check the schedule object identifier begins (step 1208) and the schedule manager 332 categorizes the schedule object identifier as a "1" or a "0." For example, if the schedule object is one that already exists in the schedule manager 332, the schedule object identifier would be categorized as a "1," and the schedule would not be created or updated. If the schedule object 1270 is one that does not already exist in the schedule manager 332, the schedule object identifier would be categorized as a "0."

If the schedule manager 332 finds that the schedule object does not already exist in the schedule manager 332, the schedule object 1270 is categorizes as a "0" and the schedule manager 332 begins the process to create the schedule (step 1210) by initializing the schedule object 1270 (step 1212). The schedule attributes are then written to the schedule object 1270 (step 1214). In some embodiments, the schedule attributes include items such as weekly schedules, exception schedules, daily schedules, etc. In some embodiments, the schedule attributes include items such as setpoints, on/off points, etc. The schedule manager 332 then retrieves a list of devices and points that will include the schedule object 1270 (step 1216) and initiates a loop that cycles through every point on every piece of equipment in the list (step 1218).

Within the loop at step 1218, another loop is executed for every point on every device (step 1220) to verify the point type within the equipment. If the point is a sync point, the schedule manager 332 will write the point to the list of available schedules 532 (step 1222). In some embodiments, a sync point is a point that can include any type of schedule that the equipment 340 can follow (e.g., a weekly schedule or an exception schedule). The schedule manager 332 can then sync the sync point to a remote device (step 1224) via the ORE 328. For example, the schedule object 1270 may be intended for a chiller, and the ORE 328 can sync the schedule object 1270 to the chiller so as to incorporate the schedule object 1270 into the chiller. If the point is a global point, the schedule manager 332 will write the point to the list of available points to schedule 534 (step 1226). In some embodiments, a global point is a point that can include any type of setpoint that the equipment 340 can follow (e.g., a temperature setpoint, a switch on/off setpoint, etc.). If the point is an equipment point, the point will not be included in either the list of available schedules 532 or the list of available points to schedule 534, and the schedule manager 332 will sync the point directly to the equipment 340 via the ORE 328 (step 1228).

After verifying the point type, the schedule manager 332 will schedule the update to occur (step 1230) after step 1218 is complete. After every point in every piece of equipment 340 has been checked, the schedule manager 332 triggers the schedule change/update event (step 1232) so as to include the schedule object 1270 within the schedule manager 332. The schedule manager 332 then archives the schedule object 1270 (step 1234).

Retrieving a List of Schedules

Figure 13:
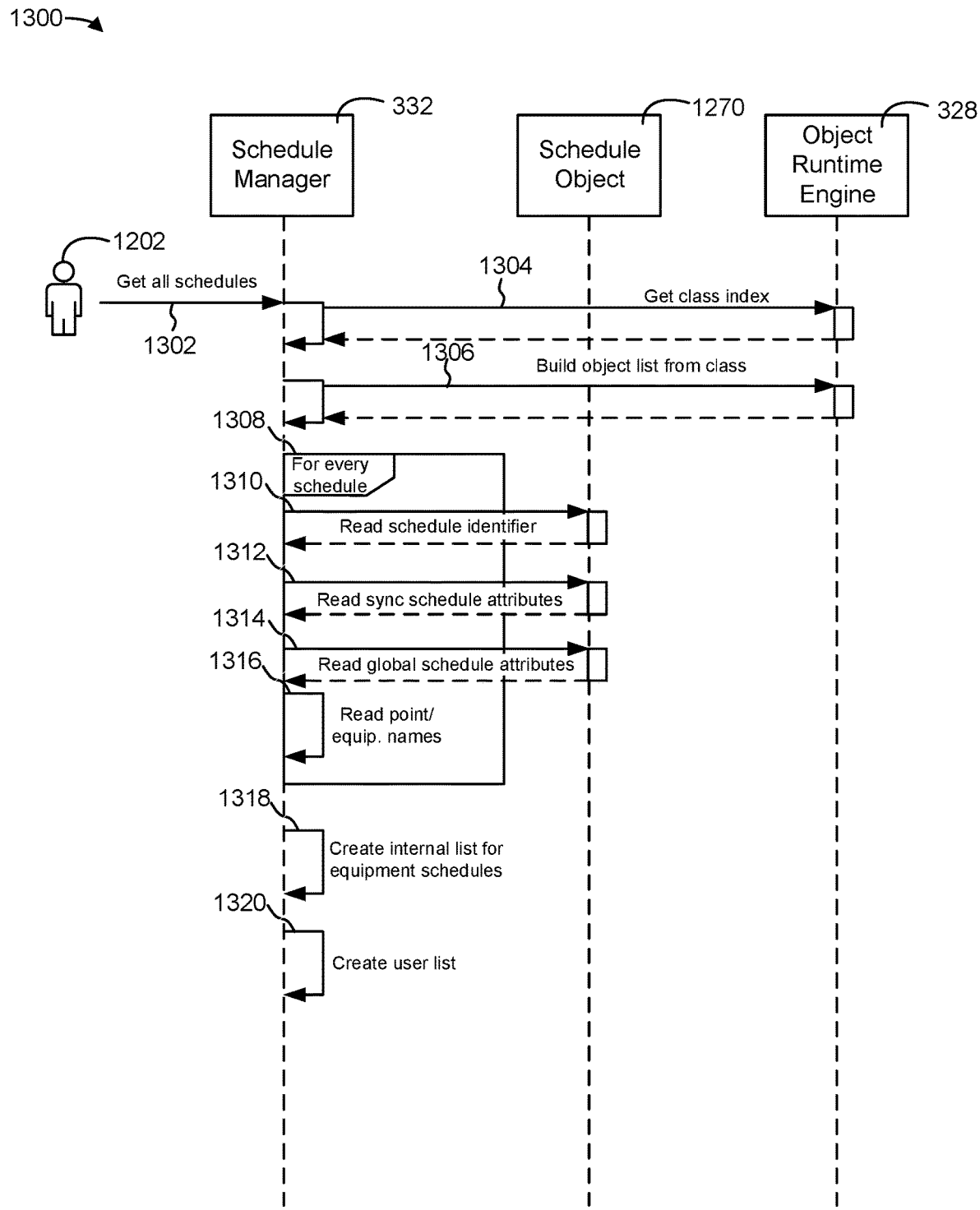
FIG. 13 is sequence diagram illustrating a process for determining a list of all configured schedule objects which can be performed by the schedule manager of FIG. 5, according to some embodiments.

Referring now to FIG. 13, a sequence diagram illustrating a process 1300 for retrieving a list of all configured schedule objects which can be performed by the schedule manager 332 of FIG. 5 is shown, according to some embodiments.

The process 1300 is shown to include a user 1202 sending a request to the schedule manager 332 to get all the schedules (step 1302). The schedule manager 332 then receives a class index from the ORE 328 (step 1304). In some embodiments, the class index includes a list of equipment 340 separated into classes. For example, the class index may include a list of equipment 340 with sub-parts including a list of chillers, a list of boilers, a list of thermostats, etc. The schedule manager 332 then receives an object list from the ORE 328 (step 1306). In some embodiments, the object list may include a list of schedule objects within the equipment 340. For example, the object list may include a list of weekly schedules and exception schedules for a chiller.

The schedule manager 332 will then loop over every schedule in the object list (step 1308). The loop begins with the schedule manager 332 receiving the schedule name and the schedule events (e.g., weekly schedule, exception schedule, etc.) of the schedule object 1270 (step 1310). The schedule manager 332 then receives the synced schedule attributes for the synced schedules within the schedule object 1270 (step 1312), and the global schedule attributes for the global schedules within the schedule object 1270 (step 1314). The schedule manager 332 then reads all the names for the equipment 340 and the points within the equipment 340 (step 1316).

After looping through every schedule on the equipment 340, the schedule manager 332 will create an internal list for the schedules for the equipment 340 (step 1318) that includes the information received in steps 1308-1316. The schedule manager 332 then creates the list of schedules for the equipment 340 for the user (step 1320).

Retrieving a List of Points to Schedule

Figure 14:
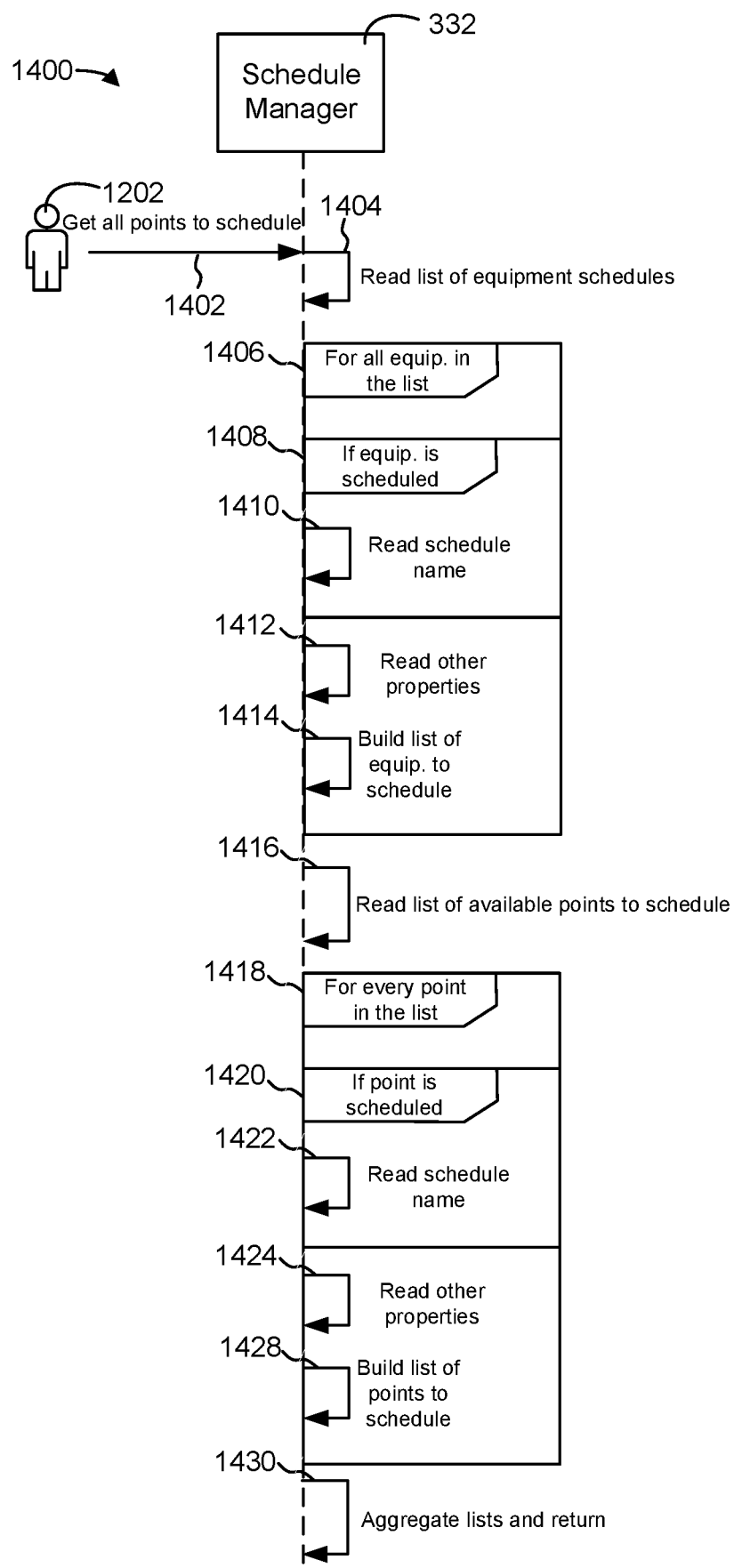
FIG. 14 is a sequence diagram illustrating a process for reading a list of devices and points to schedule which can be performed by the schedule manager of FIG. 5, according to some embodiments.

Referring now to FIG. 14, a sequence diagram illustrating a process 1400 for building a list of points and equipment 340 that can be scheduled which can be performed by the schedule manager 332 of FIG. 5 is shown, according to some embodiments.

The process 1400 shows a user 1202 requesting the schedule manager 332 to return a list of points and equipment 340 that can be scheduled (step 1402). The schedule manager 332 then reads the list of equipment schedules (step 1404) to determine all the equipment 340 that is available. The schedule manager 332 then begins a loop (step 1406) that is iterated over all the available equipment 340. The schedule manager 332 then initiates another loop (step 1408) and determines whether the equipment 340 has an equipment schedule. If the equipment 340 has an equipment schedule, the schedule manager 332 reads the name of the equipment schedule (step 1410). If the equipment 340 does not have an equipment schedule, the schedule manager 332 reads other properties of the equipment 340 (e.g., equipment type, name, operating parameters, etc.) (step 1412) to include in the list of available equipment to schedule 536. The schedule manager 332 then builds the list of available equipment to schedule 536 in preparation to return the list to the user 1202 (step 1414).

The schedule manager 332 then reads the list of available points to schedule to determine all of the available points (step 1416). The schedule manager 332 then begins another loop (step 1418) that is iterated over all the available points to schedule. The schedule manager 332 then initiates another loop (step 1420) and determines whether a point is scheduled. If a point is scheduled, the schedule manager 332 reads the schedule name (step 1422). If a point is not scheduled, the schedule manager 332 reads other properties of the point (e.g., the point value, the point type, etc.) (step 1424) to include in the list of available points to schedule 534. The schedule manager 332 then builds the list of available points to schedule 534 in preparation to return the list to the user 1202 (step 1428).

The schedule manager 332 then aggregates the list of available devices to schedule 536 and the list of available points to schedule 534 and returns them to the user 1202 (step 1430).

Schedule Access Control

Figure 15:
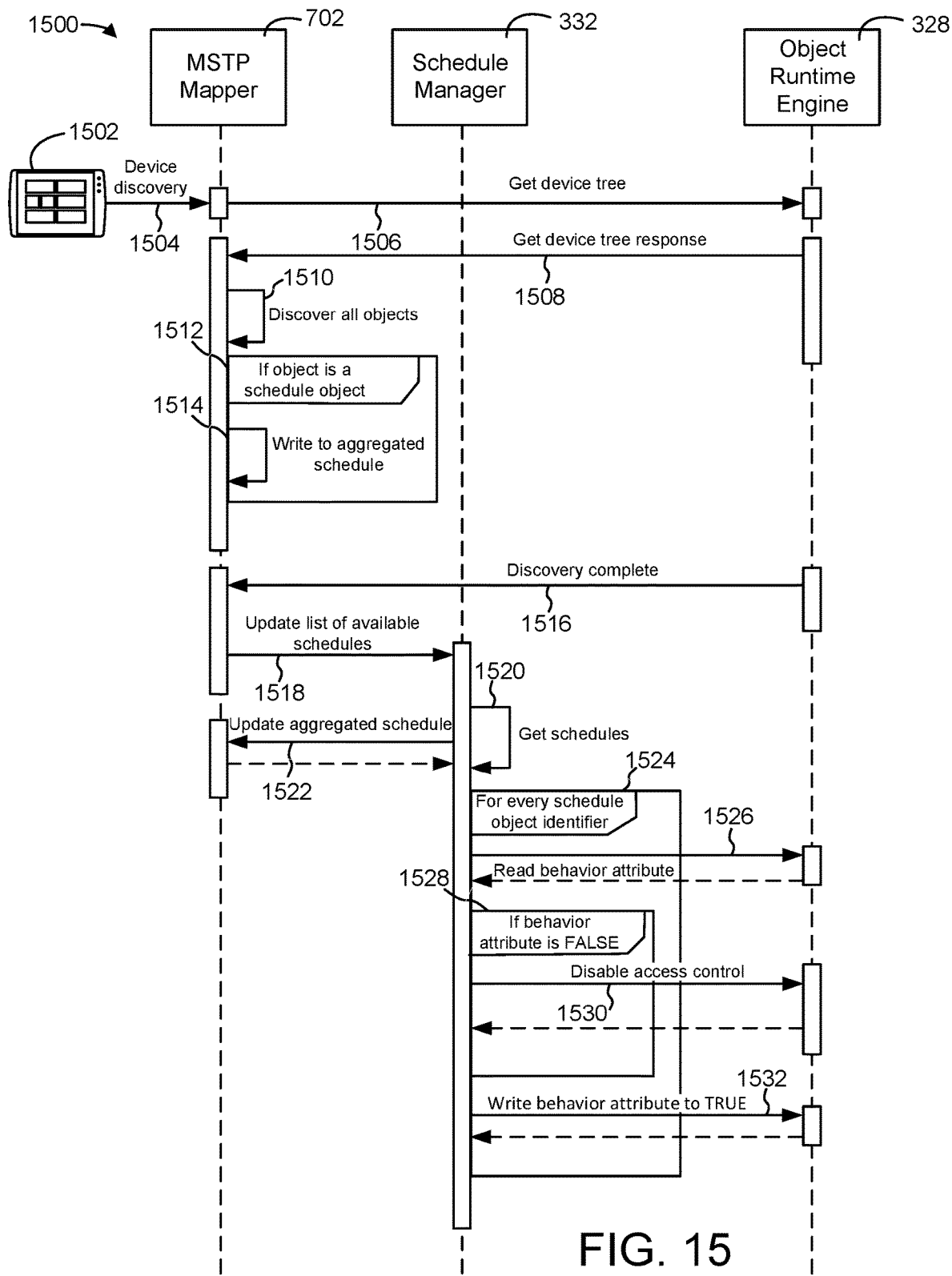
FIG. 15 is a sequence diagram illustrating a device startup sequence which can be performed by the system manager of FIG. 2, according to some embodiments.

Referring now to FIG. 15, a sequence diagram illustrating an access control process 1500 which can be performed by the system manager 202 of FIG. 2 is shown, according to some embodiments.

Process 1500 is shown to include a device 1502. The device 1502 may be any type of building equipment that is introduced into the BMS 200 (e.g., heaters, chillers, air handling units, pumps, fans, thermal energy storage, etc.). When the device 1502 is connected to the BMS 200, the MSTP mapper 702 discovers the device 1502 (step 1504). In some embodiments, the device 1502 is discovered automatically by the MSTP mapper 702 because the MSTP mapper 702 may monitor the BMS 200 to determine if any new devices have been connected. In some embodiments, the device 1502 is discovered when the device 1502 sends a signal to the BMS 200 indicating that the device 1502 is connected to the BMS 200.

The MSTP mapper 702 then sends a request to the ORE 328 to retrieve the device tree for the device 1502 (step 1506). The device tree includes all of the objects included in the device 1502. For example, the device tree for the device 1502 may include schedule objects, point objects, binary objects, etc. The ORE 328 then returns the device tree to the MSTP mapper 702 (step 1508). The MSTP mapper 702 analyzes the device tree and discovers all available objects within the device tree (step 1510).

The MSTP mapper 702 then iterates over all available objects within the device tree to determine if the available objects are schedule objects (step 1512). If an object is a schedule object, the MSTP mapper 702 will then write the schedule object to the aggregated schedule that includes other schedules found and schedules already within the schedule manager 332. After all schedule objects have been discovered and aggregated, the ORE 328 notifies the MSTP mapper 702 that the discovery is complete (step 1516).

The MSTP mapper 702 then sends a command to the schedule manager 332 to update the list of available schedules 532 with the information from the device 1502 (step 1518). The schedule manager 332 then retrieves the schedules from the list of available schedules 532 (step 1520), reads the aggregated schedule and includes the information from the device 1502 in the list of available schedules 532 (step 1522).

The schedule manager 332 then iterates over every schedule object identifier to provide for access control to the schedule object (step 1524). The schedule manager 332 first reads the behavior attributes of the schedule objects (step 1526), and loops over all the schedule objects (step 1528), to determine if the behavior attribute is FALSE. If the behavior attribute is FALSE, a user would not be able to edit, update, or modify the schedule object. If the schedule manager 332 finds the behavior attribute to be FALSE, then access control is disabled (step 1530) so that the behavior attribute can be set to TRUE (step 1532). With the behavior attribute set to TRUE, the schedule object can be edited, modified, or changed.

Adding Schedule References

Figure 16:
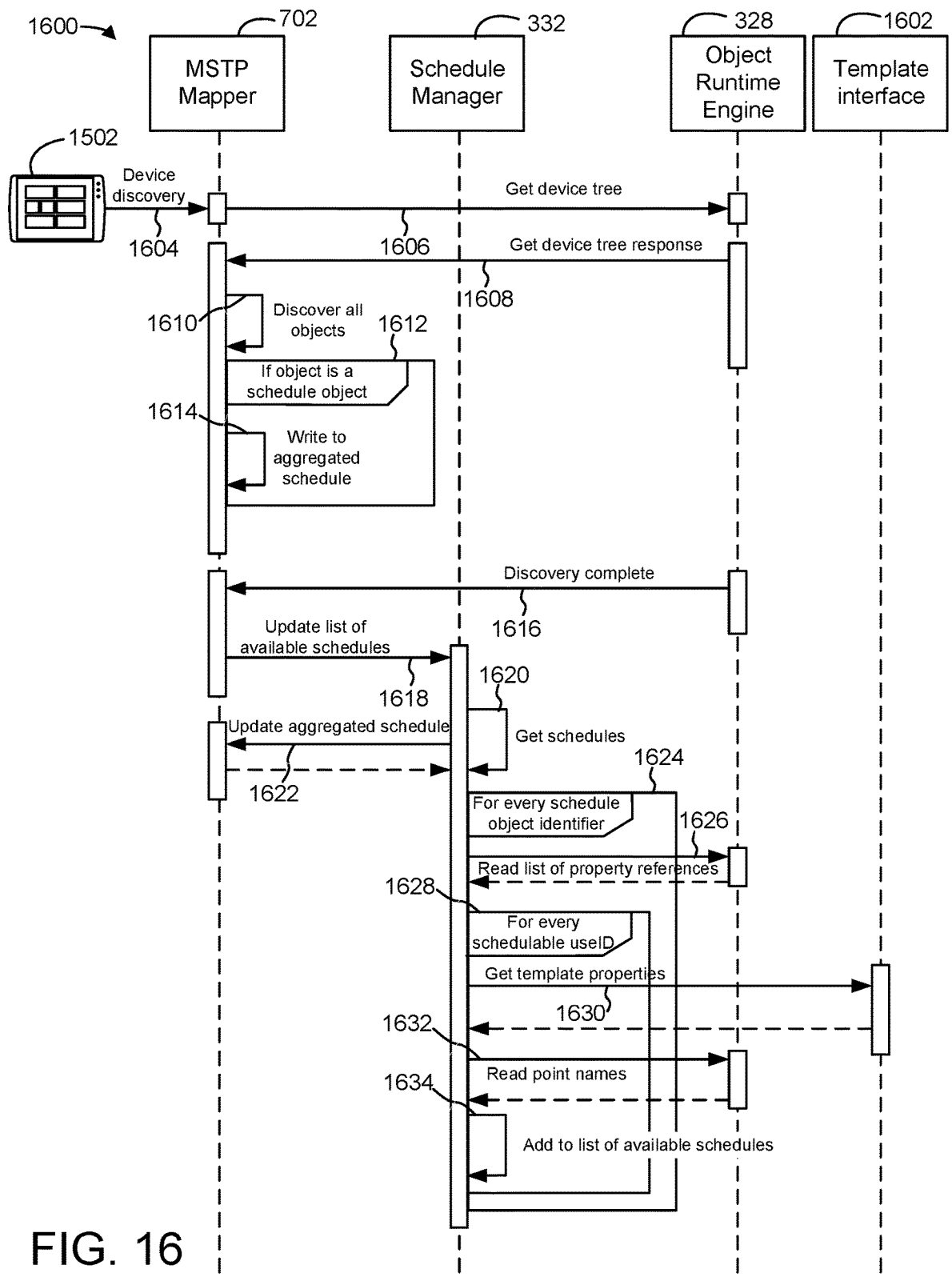
FIG. 16 is a sequence diagram illustrating a schedule addition process which can be performed by the system manager of FIG. 2, according to some embodiments.

Referring now to FIG. 16, a sequence diagram illustrating a schedule addition process 1600, which can be performed by the system manager 202 of FIG. 2 is shown, according to some embodiments.

The process 1600 is shown to include the device 1502 being discovered by the MSTP mapper 702 (step 1604). In some embodiments, the device 1502 is discovered automatically by the MSTP mapper 702 because the MSTP mapper 702 may monitor the BMS 200 to determine if any new devices have been connected. In some embodiments, the device 1502 is discovered when the device 1502 sends a signal to the BMS 200 indicating that the device 1502 is connected to the BMS 200. The MSTP mapper 702 then sends a request to retrieve the device tree from the ORE 328 (step 1606). The device tree includes all of the objects included in the device 1502. For example, the device tree for the device 1502 may include schedule objects, point objects, binary objects, etc. The ORE 328 then returns the device tree to the MSTP mapper 702 (step 1608). The MSTP mapper 702 analyzes the device tree and discovers all available objects within the device tree (step 1610).

The MSTP mapper 702 then iterates over all available objects within the device tree to determine if the available objects are schedule objects (step 1612). If an object is a schedule object, the MSTP mapper 702 will then write the schedule object to the aggregated schedule that includes other schedules found and schedules already within the schedule manager 332 (step 1614). After all schedule objects have been discovered and aggregated, the ORE 328 notifies the MSTP mapper 702 that the discovery is complete (step 1616).

The MSTP mapper 702 then sends a command to the schedule manager 332 to update the list of available schedules 532 with the information from the device 1502 (step 1618). The schedule manager 332 then retrieves the schedules from the list of available schedules 532 (step 1620), reads the aggregated schedule and includes the information from the device 1502 in the list of available schedules 532 (step 1622).

The schedule manager 332 then iterates over every schedule object identifier to add schedule references (step 1624). The schedule manager 332 first reads the list of property references for every schedule object. The list of property references includes all the points controlled by the schedule objects (step 1626). The schedule manager 332 then loops over all the schedule objects (step 1628) for every schedule, and first receives the template properties for every schedule object (step 1630) from the template interface 1602 for each schedule object. The template properties are properties of the schedule object that can identify the schedule object (e.g., all the points the schedule controls, where the schedule is used, the use identification schedule, binary outputs, etc.).

The schedule manager 332 then receives point names for every schedule object from the ORE 328 (step 1632). The schedule manager 332 then adds the point names to the list of available schedules 532.

Adding Point References

Figure 17:
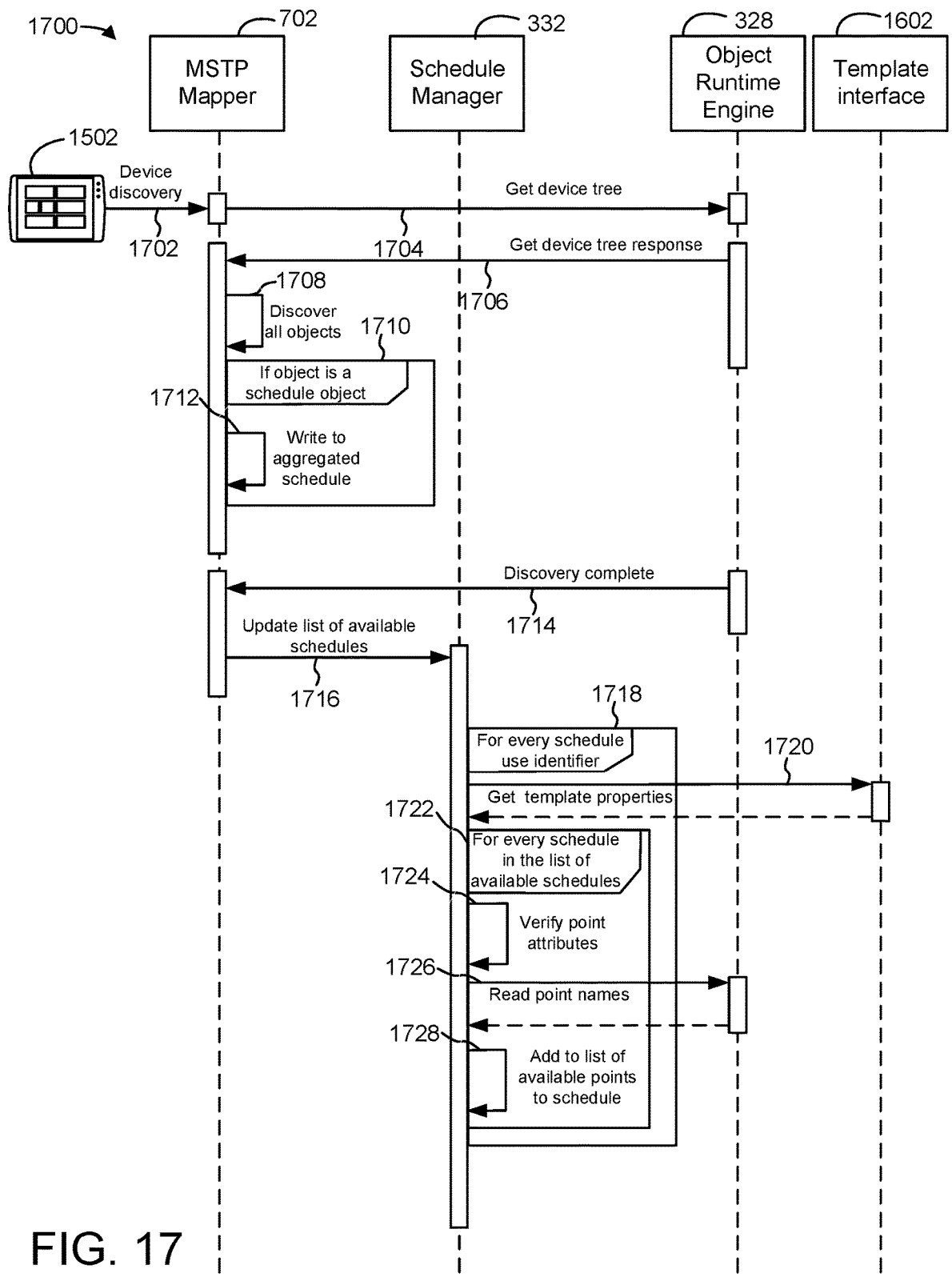
FIG. 17 is a sequence diagram illustrating a point addition process which can be performed by the system manager of FIG. 2, according to some embodiments.

Referring now to FIG. 17, a sequence diagram illustrating a point addition process 1700 which can be performed by the system manager 202 of FIG. 2 is shown, according to some embodiments.

The process 1700 is shown to include the device 1502 being discovered by the MSTP mapper 702 (step 1702). In some embodiments, the device 1502 is discovered automatically by the MSTP mapper 702 because the MSTP mapper 702 may monitor the BMS 200 to determine if any new devices have been connected. In some embodiments, the device 1502 is discovered when the device 1502 sends a signal to the BMS 200 indicating that the device 1502 is connected to the BMS 200. The MSTP mapper 702 then sends a request to retrieve the device tree from the ORE 328 (step 1704). The device tree includes all of the objects included in the device 1502. For example, the device tree for the device 1502 may include schedule objects, point objects, binary objects, etc. The ORE 328 then returns the device tree to the MSTP mapper 702 (step 1706). The MSTP mapper 702 analyzes the device tree and discovers all available objects within the device tree (step 1708).

The MSTP mapper 702 then iterates over all available objects within the device tree to determine if the available objects are schedule objects (step 1710). If an object is a schedule object, the MSTP mapper 702 will then write the schedule object to the aggregated schedule that includes other schedules found and schedules already within the schedule manager 332 (step 1712). After all schedule objects have been discovered and aggregated, the ORE 328 notifies the MSTP mapper 702 that the discovery is complete (step 1714).

The MSTP mapper 702 then sends a command to the schedule manager 332 to update the list of available schedules 532 with the information from the device 1502 (step 1716). The schedule manager 332 then loops over every schedule use identifier (step 1718) and receives the schedule template properties from the template interface 1602 (step 1720). The schedule use identifier is a unique identifier for each instance in which a schedule is used. For example, a schedule used for a chiller in a first building may have a different schedule use identifier than the same schedule used for a chiller in a second building.

The schedule manager 332 then loops over every schedule listed in the list of available schedules 532 (step 1722) and verifies the attributes of each point found in every schedule listed in the list of available schedules 532 (1724).

The schedule manager 332 then receives point names for every schedule object from the ORE 328 (step 1726). The schedule manager 332 then adds the point names to the list of available points to schedule 534 (step 1728).

Retrieving a Summary of Schedules

Figure 18:
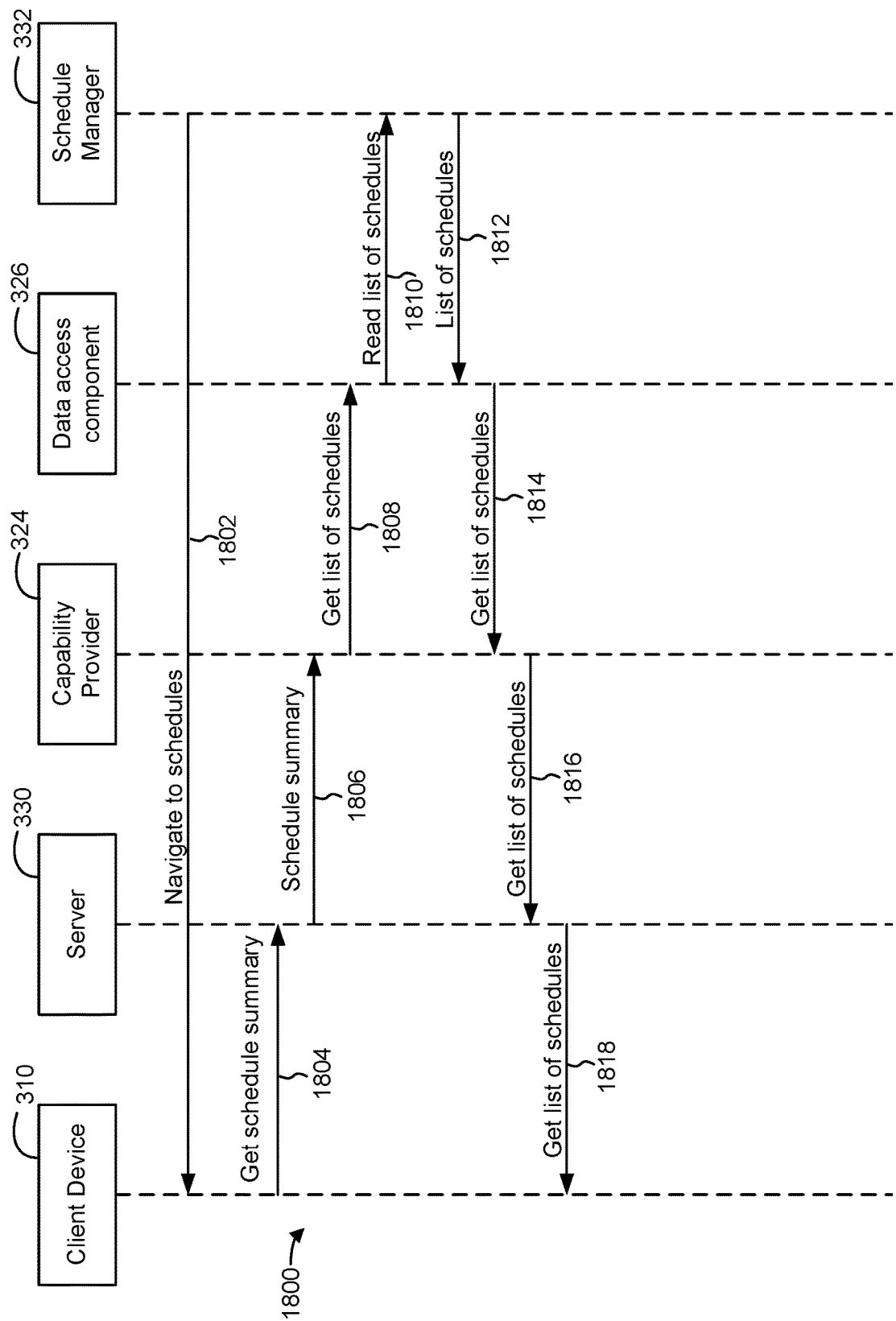
FIG. 18 is a sequence diagram illustrating a process for providing a summary of schedules which can be performed by the system manager of FIG. 2, according to some embodiments.

Referring now to FIG. 18, a sequence diagram illustrating a process 1800 for providing a summary of schedules which can be performed by the system manager 202 of FIG. 2, according to some embodiments.

The process 1800 is shown to include the schedule manager 332 providing the client device 310 access to the schedules on a user interface (step 1802). In some embodiments, a user may navigate to a tab labeled "schedules" on a user interface and click on the tab, sending a request to the schedule manager 332 to allow the client device 310 to display the "schedules" tab to the user.

In some embodiments, the schedule manager 332 evaluates each schedule object in a discovered device to determine whether the schedule object is synced or unsynced, and to which kind of property reference the schedule object belongs. In some embodiments, a schedule object may control a piece of HVAC equipment based on an occupancy schedule. In some embodiments, a schedule object may control lighting equipment and its on/off schedule. In some embodiments, a schedule object may control another type of point such as a temperature setpoint. Regardless of the type of schedule object discovered by the schedule manager 332, the schedule manager 332 will categorize the schedule objects according to their property references.

The process 1800 is also shown to include the client device 310 requesting the schedule summary from the server 330 (step 1804), and the server 330 forwards the request to the capability provider 324 (step 1806). The capability provider 324 then requests a list of schedules from the data access component 326 (step 1808), and the data access component 326 sends the request to the schedule manager 332 (step 1810).

The schedule manager 332 then sends the list of schedules to the data access component 326 (step 1812). The list of schedules includes unsynced equipment schedules, synced schedules, and global schedules. The data access component 326 then sends the list of schedules to the capability provider 324 (step 1814), which sends the list of schedules to the server 330 (step 1816), and the server 330 then sends the list of schedules to the client device 310 (step 1818) so the user can view the schedule summary.

Retrieving a List of Schedule Types and a List of Property References

Figure 19:
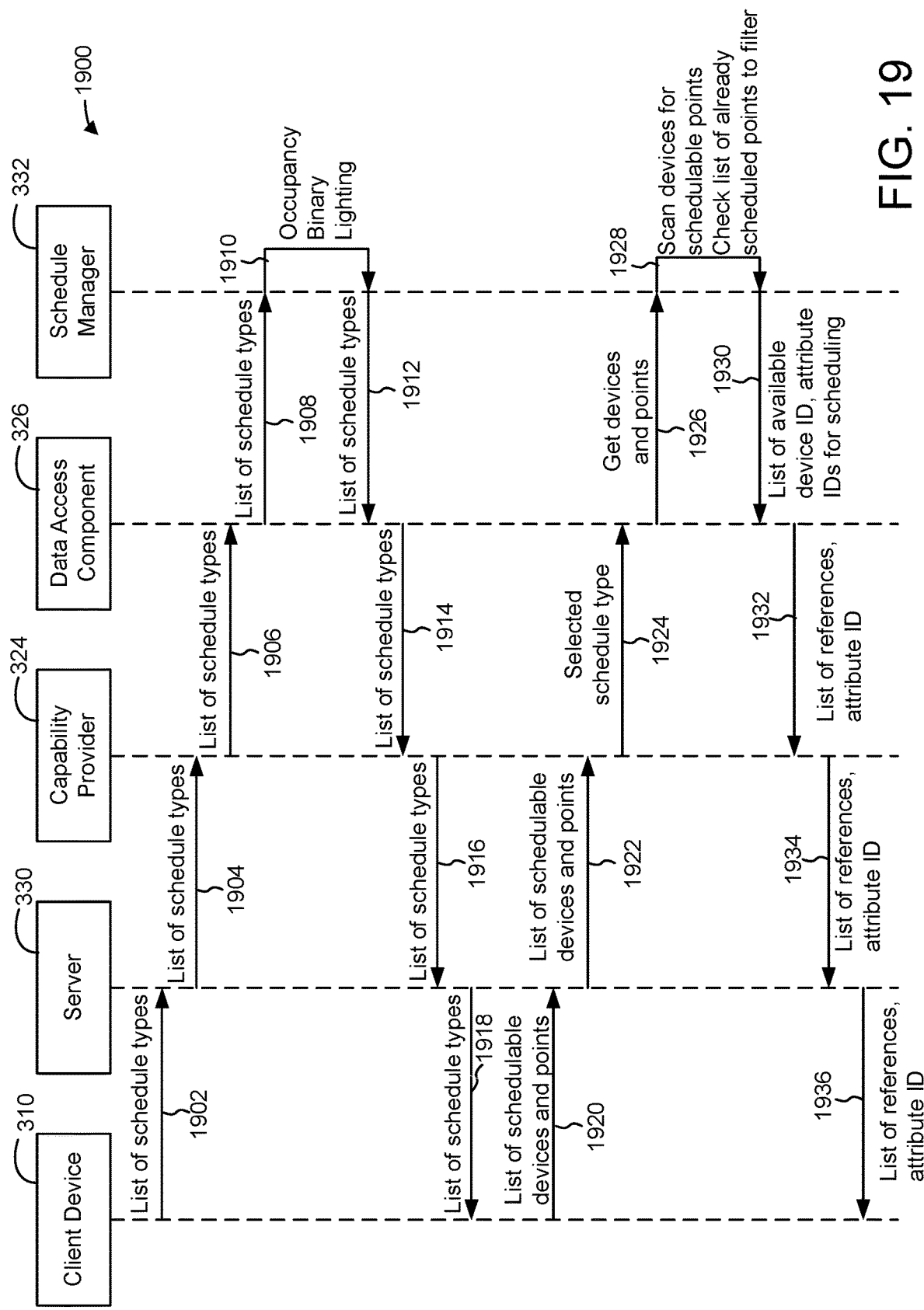
FIG. 19 is a sequence diagram illustrating a process for providing a list of schedule types and points that can be scheduled which can be performed by the system manager of FIG. 2, according to some embodiments.

Referring now to FIG. 19, a sequence diagram illustrating a process 1900 for providing a list of schedule types and points that can be scheduled which can be performed by the system manager 202 of FIG. 2 is shown, according to some embodiments.

Process 1900 is shown to include a client device 310 requesting a list of schedule types from the server 330 (step 1902). The request for the list of schedule types is then sent to the capability provider 324 (step 1904), the data access component 326 (step 1906), and the schedule manager 332 (step 1908). The schedule manager 332 then generates a list of schedule types (e.g., occupancy, binary, lighting, etc.) (step 1910) and sends the list to the data access component 326 (step 1912). The data access component 326 then sends the list to the capability provider 324 (step 1914), which sends the list to the server 330 (step 1916), and then to the client device 310 (step 1918).

In some embodiments, the client will view the list of schedule types and select one of the schedule types for which information is desired. For example, the user may desire to view all of the available points to schedule for the lighting schedule types, so the user will select the lighting schedule types and send a request to the server 330 to return a list of schedulable devices and points (step 1920). The request is forwarded to the capability provider 324 (step 1922), and the capability provider 324 sends a request to the data access component 326 for the selected schedule type (e.g., lighting) (step 1924). The data access component 326 then sends a request to the schedule manager 332 to get the devices and points (step 1926).

The schedule manager 332 then scans the available devices for schedulable points (step 1928) to create a list of schedulable points based on the selection by the user, the devices connected, and lists that have already been configured. In some embodiments, the schedule manager 332 scans the list of points that are already scheduled in order to filter them from the list. The schedule manager 332 then sends a list of available devices and their associated attribute identification to be used for scheduling to the data access component 326 (step 1930).

The data access component 326 then sends a list of references and their associated attribute identification to be used for scheduling to the capability provider 324 (step 1932), which then sends the list of references to the server 330 (step 1934). The server 330 then sends the information to the client device 310 (step 1936) so the user can view the available points to schedule for the desired schedule type.

Adding or Modifying a Schedule

Figure 20:
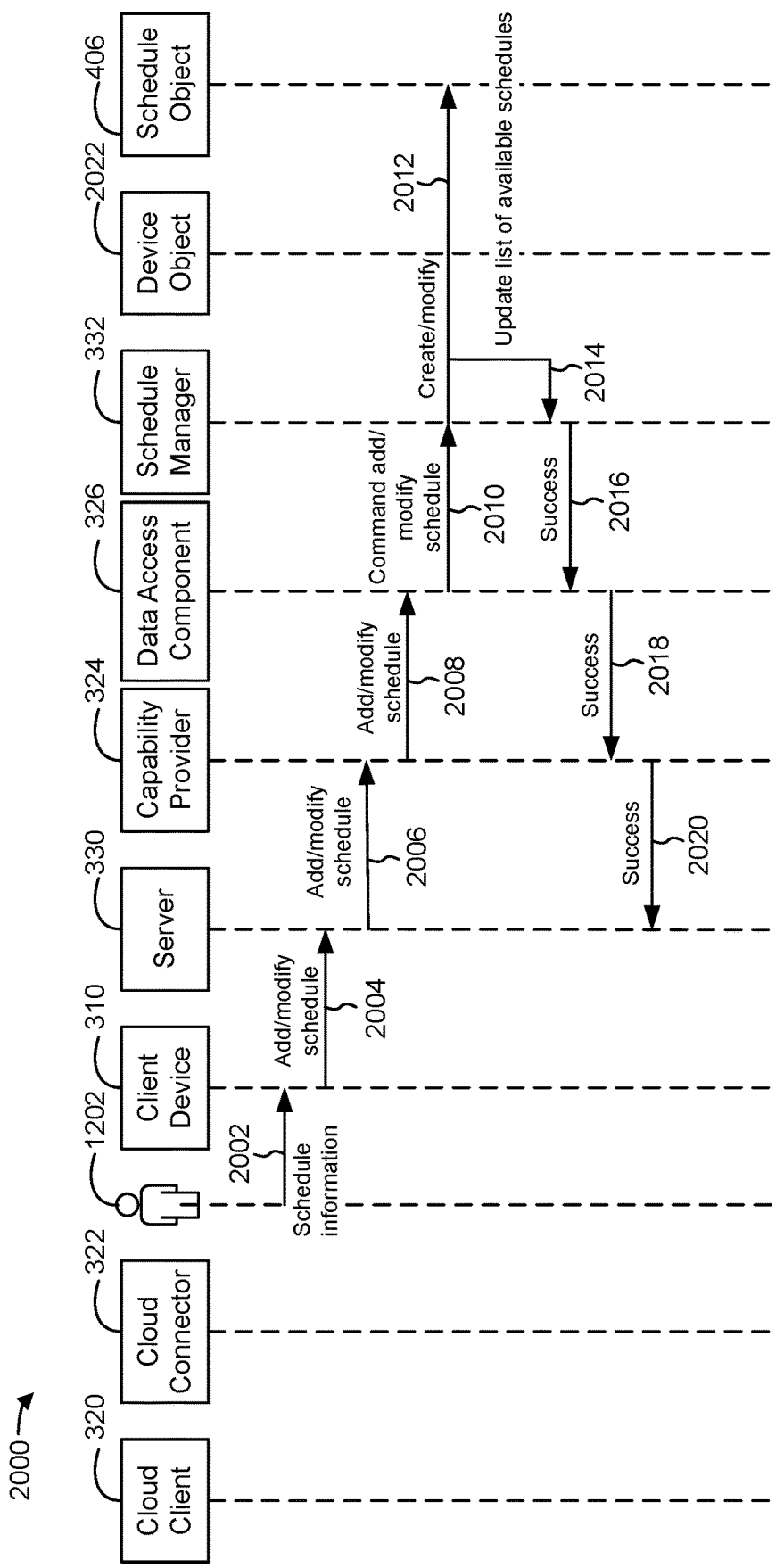
FIG. 20 is a sequence diagram illustrating a process for adding or modifying a schedule which can be performed by the system manager of FIG. 2, according to some embodiments.

Referring now to FIG. 20, a sequence diagram illustrating a process 2000 for adding or modifying a schedule which can be performed by the system manager 202 of FIG. 2 is shown, according to some embodiments.

The process 2000 is shown to include a user 1202 entering schedule information to the client device 310 (step 2002). The schedule information may include schedule identifiers such as the schedule name, the schedule type (e.g., occupancy, point, on/off, etc.), the weekly schedule, an exception schedule, and schedule properties (e.g., setpoints, etc.). The client device 310 then sends the request to add or modify the schedule to the server 330 (step 2004), and the server 330 forwards the request to the capability provider 324 (step 2006). The capability provider 324 then sends the request to the data access component 326 (step 2008), and the data access component 326 then sends a command to add or modify a schedule to the schedule manager 332 (step 2010).

The schedule manager 332 then creates or modifies a schedule based on the request from the user 1202 (step 2012). In some embodiments, and as shown in FIG. 20, the schedule manager 332 may modify an existing schedule object (e.g., schedule object 406) with the information provided by the user 1202. In some embodiments, the schedule manager 332 may create a new schedule based on the information provided by the user. After the schedule is updated or created, the schedule manager 332 then updates the list of available schedules 532 with the new or modified schedule (step 2014).

After the list of available schedules 532 is updated, the schedule manager 332 then sends a response to the data access component 326 that the schedule addition or modification was successful (step 2016). The response is then sent from the data access component 326 to the capability provider 324 (step 2018), and from the capability provider 324 to the server 330 (step 2020).

The schedule manager 332 may also send a change of value (COV) update to the capability provider 324 to provide information to the capability provider 324 about the new or modified schedule. A COV is a way in which other devices, equipment, or systems in communication with the capability provider 324 can be notified of schedule additions or modifications. For example, a new chiller schedule may be added for a new chiller connected to the system 200. Other chillers already connected to the system 200 will be notified of the new schedule via the COV, and then decisions can be made as to whether the current chillers should use the new schedule or continue to use the current schedule.

In some embodiments, the user 1202 is not notified of the success of the addition or modification of the schedule, as the user may presume the addition or modification of the schedule is successful. However, in some embodiments the addition or modification of the schedule may be unsuccessful. In such cases, a response indicating an unsuccessful schedule addition or modification would be sent from the schedule manager 332 to the data access component 326, to the capability provider 324, to the server 330, and to the client device 310 to notify the user 1202 that the desired schedule addition or modification was unsuccessful. The user 1202 can then attempt the addition or modification again or seek further support to implement the desired schedule addition or modification.

Deleting a Schedule

Figure 21:
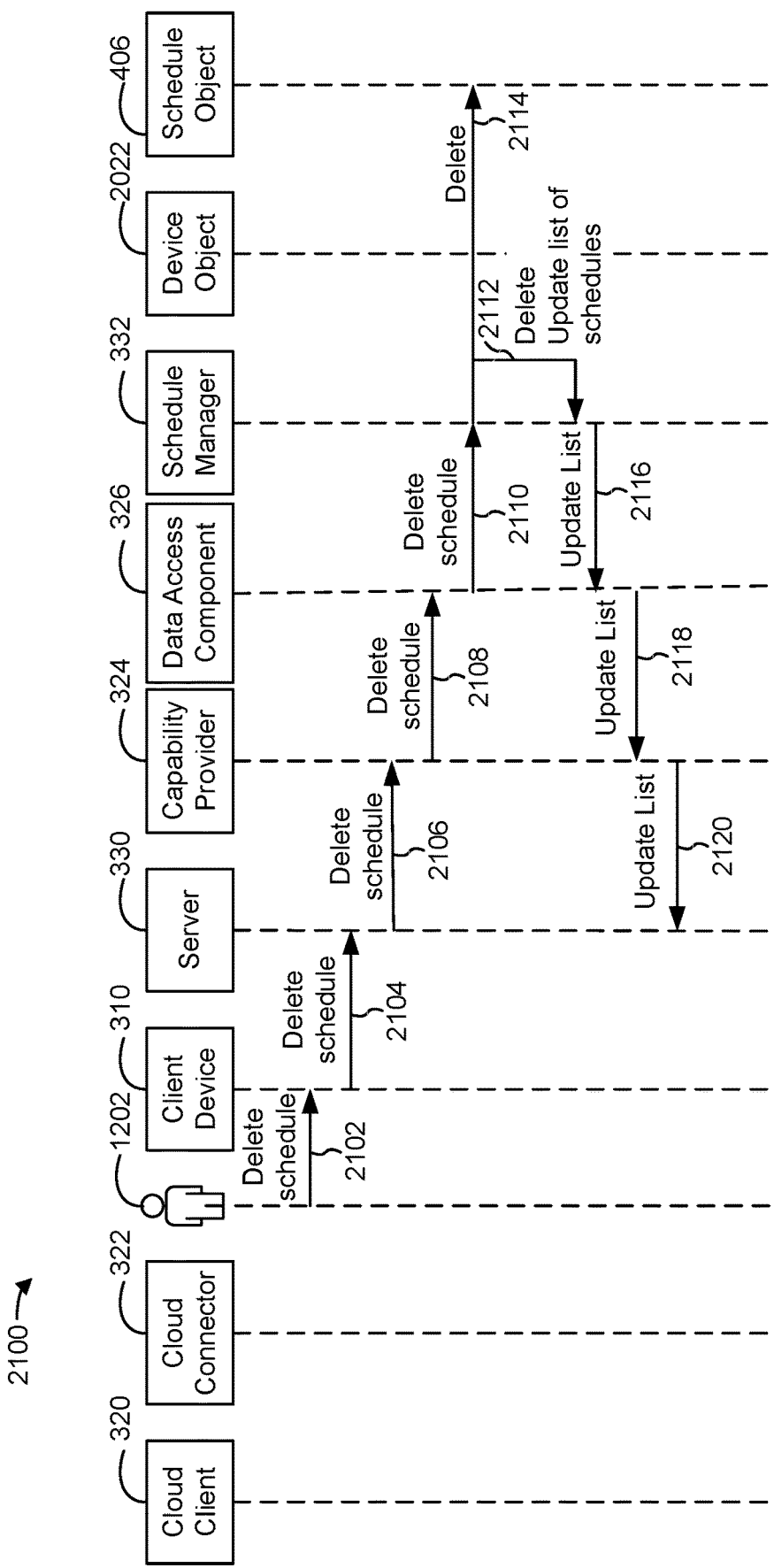
FIG. 21 is a sequence diagram illustrating a process for deleting a schedule which can be performed by the system manager of FIG. 2, according to some embodiments.

Referring now to FIG. 21, a sequence diagram illustrating a process 2100 for deleting a schedule which can be performed by the system manager of FIG. 2 is shown, according to some embodiments.

The process 2100 is shown to include a user 1202 sending a request to the client device 310 to delete a schedule (step 2102). In some embodiments, the user 1202 may request a schedule deletion because the schedule was associated with building equipment that is no longer in service or has been replaced. In some embodiments, the user 1202 may request a schedule deletion because a new schedule has been added to replace an older schedule, and the user does not want to retain older schedules in the system.

The client device 310 then sends the request to delete the schedule to the server 330 (step 2014), and the server 330 sends the request to the capability provider 324 (step 2106). The capability provider 324 then sends the deletion request to the data access component 326 (step 2108), which then sends the request to the schedule manager 332 (step 2110). The schedule manager 332 then deletes an existing schedule object (e.g., the schedule object 406) from the system (step 2114). The schedule manager 332 also updates the list of available schedules 532 to reflect the deletion of the schedule object 406 (step 2112), and notifies the data access component 326 of the schedule deletion and the updated list of available schedules 532 (step 2116).

The data access component 326 then notifies then capability provider 324 of the schedule deletion and the updated list of available schedules 532 (step 2118), and the capability provider 324 then notifies the server 330 of the schedule deletion and the updated list of available schedules 532 (step 2120).

Startup and Device Discovery

Figure 22:
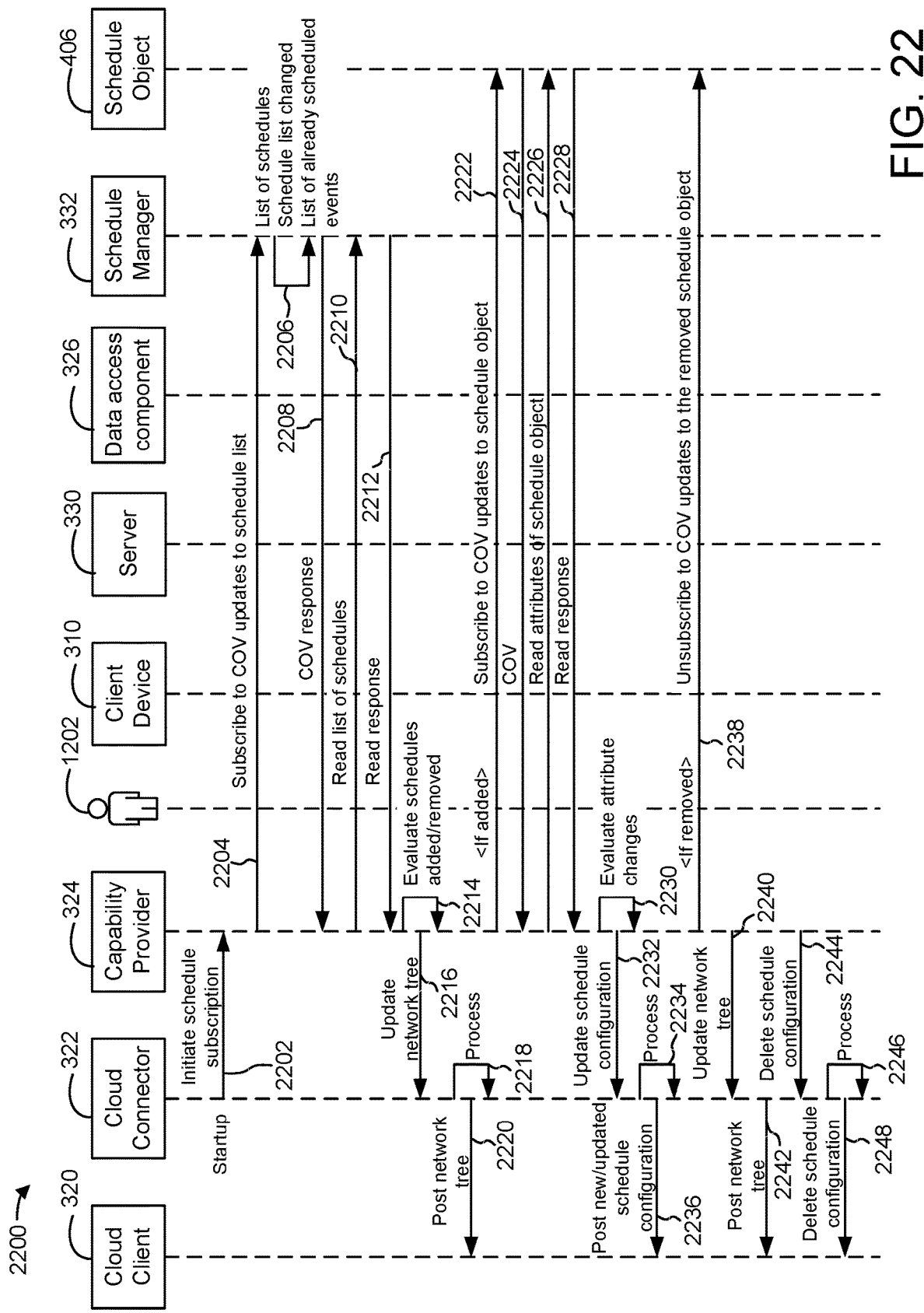
FIG. 22 is a sequence diagram illustrating a startup and device discovery sequence which can be performed by the system manager of FIG. 2, according to some embodiments.

Referring now to FIG. 22, a sequence diagram illustrating a startup and device discovery process 2200 which can be performed by the system manager 202 of FIG. 2 is shown, according to some embodiments.

The process 2200 is shown to include the cloud connector 322 sending a request to the capability provider 324 to initiate a schedule subscription upon system startup (step 2202). The capability provider 324 then sends a request to the schedule manager 332 to subscribe to change of value (COV) updates to the list of available schedules 532 (step 2204). The schedule manager 332 then retrieves the list of available schedules 532, any schedule list changes, and any lists of already scheduled events (step 2206). The schedule manager 332 then provides a COV response to the capability provider 324 (step 2208). The capability provider 324 will therefore be notified by the schedule manager 332 of any changes to the list of available schedules by a COV notification.

The capability provider 324 then sends a request to the schedule manager 332 to read the list of available schedules 532 (step 2210), and the schedule manager 332 provides the list to the capability provider 324 (step 2212). The capability provider 324 reads the list of available schedules 532 and determines if any schedules were added, updated, or removed (step 2214), and then sends a request to the cloud connector 322 to update the network tree (step 2216) to reflect the schedule changes. The cloud connector 322 processes the request (step 2218) and then posts the updated network tree to the cloud client 320 (step 2220).

In some embodiments, if a schedule object was added (e.g., the schedule object 406), the capability provider 324 subscribes to a COV update to the schedule object 406 (step 2222). The schedule object 406 responds with a COV (step 2224), and the capability provider 324 then requests to read the attributes of the schedule object 406 (e.g., setpoints, on/off points, etc.) (step 2226). The schedule object 406 then provides the attributes and the capability provider 324 reads the response (step 2228). The capability provider 324 then evaluates any changes to attributes from the schedule object 406 (step 2230), and then sends a request to the cloud connector 322 to update the schedule configuration (step 2232). The cloud connector 322 processes the request (step 2234) and sends a request to the cloud client 320 to post the new or updated schedule configuration (step 2236).

In some embodiments, if a schedule object is removed (e.g., the schedule object 406), the capability provider 324 unsubscribes to COV updates to the removed schedule object 406 (step 2238). The capability provider 324 then sends a request to the cloud connector 322 to update the network tree (step 2240), and the cloud connector 322 then sends a request to the cloud client 320 to post the updated network tree (step 2242). The capability provider 324 also sends a request to the cloud connector 322 to delete the schedule configuration for the deleted schedule object 406 (step 2244). The cloud connector 322 processes the request (step 2246) and then sends a request to the cloud client 320 to delete the schedule configuration for the deleted schedule object 406 (step 2248).

Schedule Summary View

Figure 23:
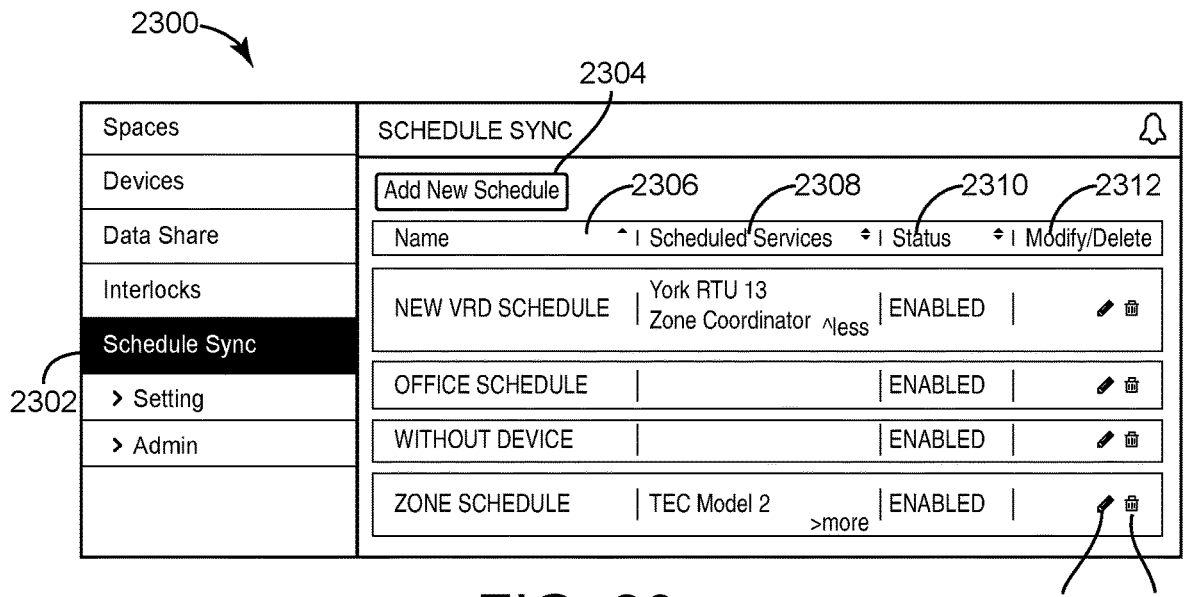
FIG. 23 is an illustration of a user interface to add a new schedule, according to some embodiments.

Referring now to FIG. 23, an illustration of a user interface 2300 to add a new schedule is shown, according to some embodiments. The user interface 2300 is shown to include a schedule sync menu 2302, an add new schedule button 2304, a schedule name list 2306, a scheduled devices list 2308, a schedule status list 2310, a modify/delete list 2312, an edit icon 2314, and a delete icon 2316.

When a user viewing the user interface 2300 desires to view a summary of schedules, the user may select the schedule sync menu 2302. Upon selecting the schedule sync menu 2302, a request is sent to the data access component 326 to retrieve the list of all existing schedules (e.g., the list available schedules 532, the list of available points to schedule 534, and the list of available points to schedule, and unsynced equipment schedules). The data access component 326 then retrieves the list of available schedules 532 from the schedule manager 332 and displays the information on the user interface 2300. After selecting the schedule sync menu 2302, the add new schedule button 2304, schedule name list 2306, scheduled devices list 2308, schedule status list 2310, and the modify/delete list 2312 are displayed to the user.

The schedule name list 2306 displays the names of the available schedules in the list of available schedules 532. For example, there may be a new schedule, an office schedule, and a zone schedule available in the schedule name list 2306. The scheduled devices list 2308 will show which device(s) use the schedule listed in the schedule name list 2306. For example, the new schedule may be used on a rooftop unit (RTU) and a zone coordinator, and the zone schedule may be used on a thermostat controller (TEC).

The schedule status list 2310 indicates the status of the schedule (e.g., whether the schedule is enabled or disabled). In some embodiments, the schedule may be enabled on one or more devices or equipment. In some embodiments, the schedule may be disabled on one or more devices or equipment. For example, the new schedule is shown to be enabled on the RTU and the zone coordinator. The zone schedule is also shown to be enabled on the TEC.

The modify/delete list 2312 provides the user the ability to modify or delete an existing schedule listed in the schedule name list 2306. In some embodiments, a user may desire to modify an existing schedule based on upcoming weather changes. For example, a user may determine that the zone schedule should be modified to provide for more efficient operation. In that case, the user would click on the edit icon 2314 to navigate to another screen to edit the schedule. In some embodiments, a user may desire to delete an existing schedule based on a new schedule that is better suited to a specific device or building equipment. For example, a user may determine that the zone schedule should be deleted because a better schedule is available. In that case, the user would click on the delete icon 2316 to navigate to another screen to delete the schedule.

In some embodiments, the user may desire to add a new schedule to the schedule name list 2306. In such cases, the user would select the add new schedule button 2304 to navigate to another user interface page to enter information regarding the new schedule.

Add Schedule View

Figure 24:
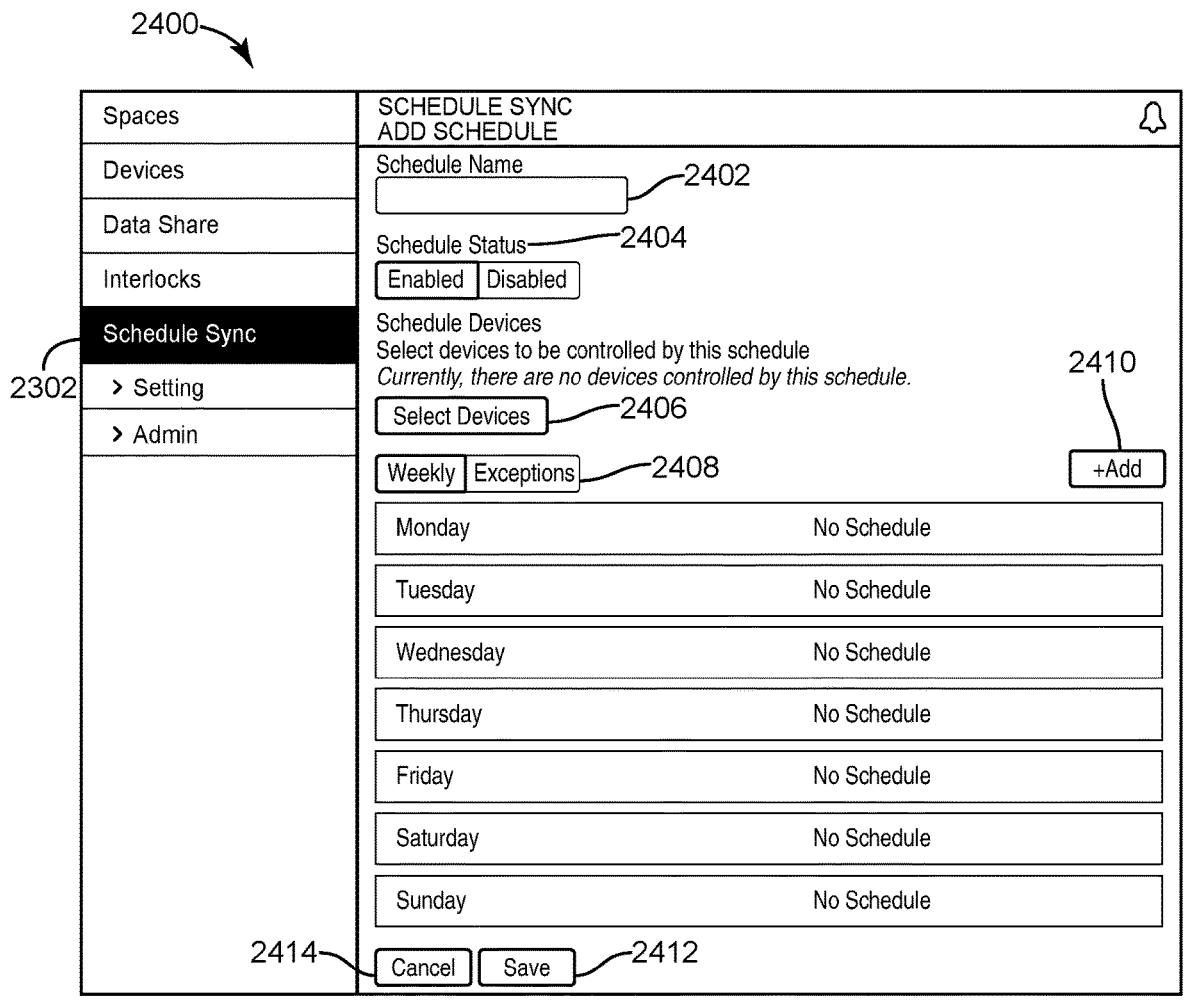
FIG. 24 is an illustration of a user interface to enter information for a new schedule, according to some embodiments.

Referring now to FIG. 24, an illustration of a user interface 2400 to enter information for a new schedule is shown, according to some embodiments. After selecting the add new schedule button 2304, the user interface 2400 is displayed. The user interface 2400 is shown to include a schedule name box 2402, a schedule status selector 2404, a select devices button 2406, a weekly/exceptions selector 2408, an add button 2410, a save button 2412, and a cancel button 2414.

The schedule name box 2402 is a box in which a user can enter text to provide a unique name for the schedule being added. In some embodiments, if the user attempts to provide a name that is already in use on the system, the user will receive an error message that will prompt the user to enter a different name for the desired schedule.

The schedule status selector 2404 allows the user to select whether the schedule is enabled or disabled. An enabled schedule is a schedule that is available for use on devices or equipment connected to the system. A disabled schedule is a schedule that is not available for use on devices or equipment connected to the system. A user may decide to disable a schedule if the equipment to be controlled by the schedule is not yet connected to the system. For example, a user may enter a new schedule that will be followed by a new RTU that is going to be installed. However, the user may not want to allow other devices or equipment to use the new schedule until the new RTU has used the schedule, so the user may set the schedule status selector 2404 to "disabled."

If the user clicks on the select devices button 2406, a new user interface page will load to allow the user to select the devices that will be controlled by the schedule being entered. The interface to select devices will be further described with reference to FIG. 25.

The weekly/exceptions selector 2408 allows the user to view the weekly schedule and the exception schedule for the new schedule to be added. For example, if the user selects the "weekly" portion of the weekly/exceptions selector 2408, the user will be able to view the regular, weekly schedule. If the user selects the "exception" portion of the weekly/exceptions selector 2408, the user will be able to view the exceptions to the regular, weekly schedule. As shown in FIG. 24, no weekly schedules have been added. To add a weekly schedule to the new schedule, the user must click on the add button 2410. Clicking on the add button 2410 will load a new interface page that will allow the user to create the weekly schedule. The interfaces to create the weekly schedule will be further described with reference to FIGS. 26-27.

After the user has entered the desired information for the new schedule, the user can save the schedule by clicking on the save button 2412. However, if the user determines that mistakes have been made when entering the new schedule or if the new schedule is no longer desired, the user can cancel the addition by clicking on the cancel button 2414.

Select Devices View

Figure 25:
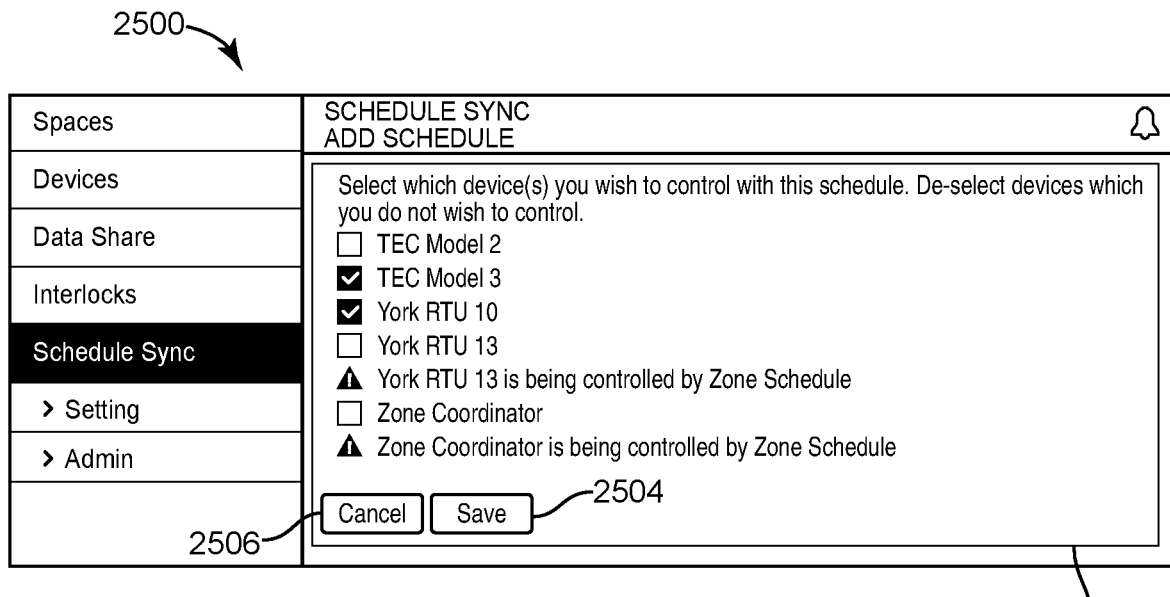
FIG. 25 is an illustration of a user interface to select devices for a new schedule, according to some embodiments.

Referring now to FIG. 25, an illustration of a user interface 2500 to select devices for a new schedule is shown, according to some embodiments. The user interface 2500 is shown to include a device selection box 2502, a save button 2504, and a cancel button 2506.

After clicking on the select devices button 2406, the user interface 2500 will be displayed for the user to select the devices to be controlled by the new schedule. A list of devices will be displayed in the device selection box 2502. In some embodiments, some of the devices listed in the device selection box 2502 may not be available to be controlled by the new schedule. For example, the York RTU 13 and the Zone Coordinator may be controlled by the zone schedule, so they cannot be controlled by the new schedule. Therefore, the user would not be able to select the York RTU 13 or the Zone Coordinator to be controlled by the new schedule.

The equipment and/or devices available to be controlled by the new schedule will include selection boxes next to the device such that the user can click within the device selection box 2502 to select or deselect equipment and/or devices. For example, the user has selected the TEC Model 3 and the York RTU 10 to be controlled by the new schedule by clicking in the device selection box 2502 next to the name of the equipment/device. A checkmark fills the box next to the equipment to indicate that the equipment will be controlled by the new schedule. A box without a checkmark indicates that the equipment will not be controlled by the new schedule (e.g., TEC Model 2 will not be controlled by the new schedule).

To save the changes made by the user, the user will select the save button 2504. To cancel any changes made by the user, the user will select the cancel button 2506. After selecting either the save button 2504 or the cancel button 2506, the user will be redirected back to the user interface 2400.

Add Weekly Schedules

Figure 26:
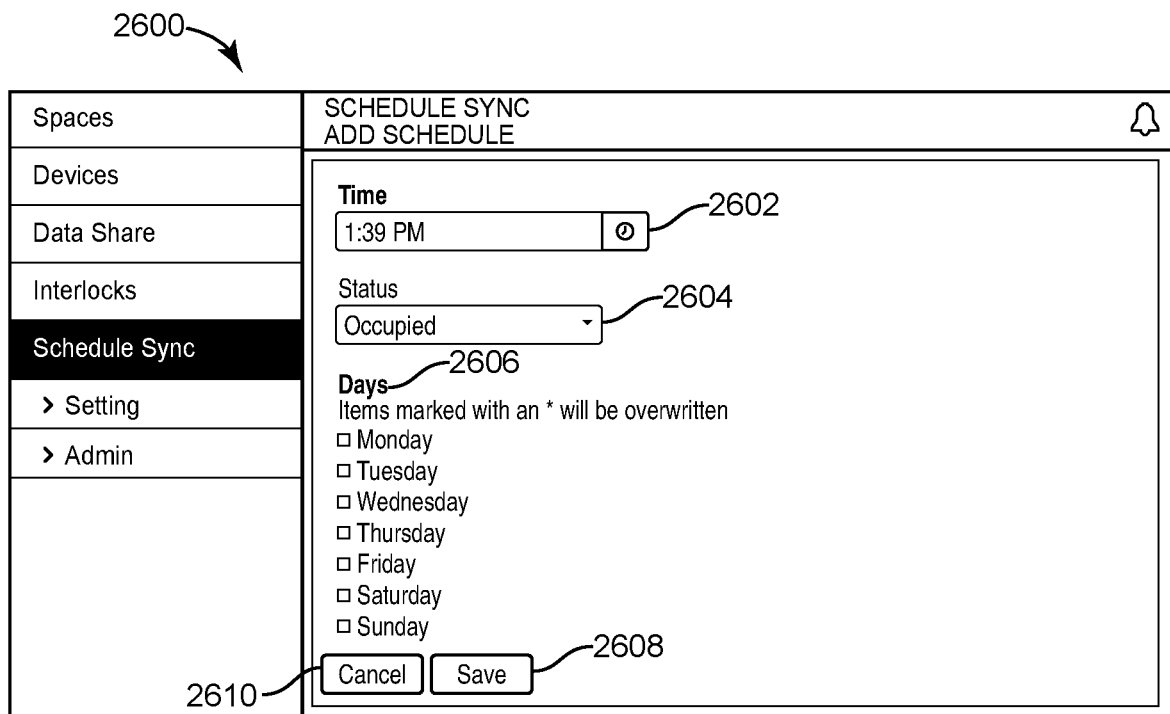
FIG. 26 is an illustration of a user interface to select dates and times for a new schedule, according to some embodiments.

Referring now to FIG. 26, an illustration of a user interface 2600 to select dates and times for a new schedule is shown, according to some embodiments. The user interface 2600 is shown to include a time entry box 2602, a status selector 2604, a day selector 2606, a save button 2608, and a cancel button 2610.

After clicking on the add button 2410, the user will be directed to the user interface 2600 to provide more details about the new schedule being added. For example, the user must determine when the schedule should be occupied (e.g., when the building is occupied by workers) and when the schedule should be unoccupied (e.g., when the building is not occupied by workers), and provide that information to the system.

To enter the time at which the schedule status (e.g., occupied or unoccupied) will apply, the user will enter the time into the time entry box 2602. The user will then use the status selector 2604 to select the status of the new schedule at the time entered into the time entry box 2602. For example, if the user entered the time 9:00 AM in the time entry box 2602, the user may also select occupied in the status selector 2604 because at that time the building may be occupied by workers.

The user must also select the days on which the new schedule will apply by using the day selector 2606. The user can select the days on which the new schedule will apply by clicking in boxes next to the days to select/deselect the days. For example, the user may click on the boxes next to Monday, Tuesday, Wednesday, Thursday, and Friday because at 9:00 AM on those days the building may typically be occupied by workers.

After the user has entered the desired information, the user can save the weekly schedule by clicking on the save button 2608. If the user determines that a mistake was made or no longer desires to enter the information, the user can select the cancel button 2610 to cancel the entry. After the user clicks on the save button 2608 or the cancel button 2610, the user will be directed back to the user interface 2400.

Because the user interface 2600 allows the user to enter a single time and a single status, the user must navigate back to the user interface 2600 by clicking on the add button 2410 to enter additional weekly schedules. For example, if the user desires to set a time at which the building is unoccupied, the user must click on the add button 2410, and then enter the desired information within the user interface 2600 (e.g., at 5:00 PM on Monday through Friday, the building should be unoccupied).

Add Weekly Schedule (Alternate)

Figure 27:
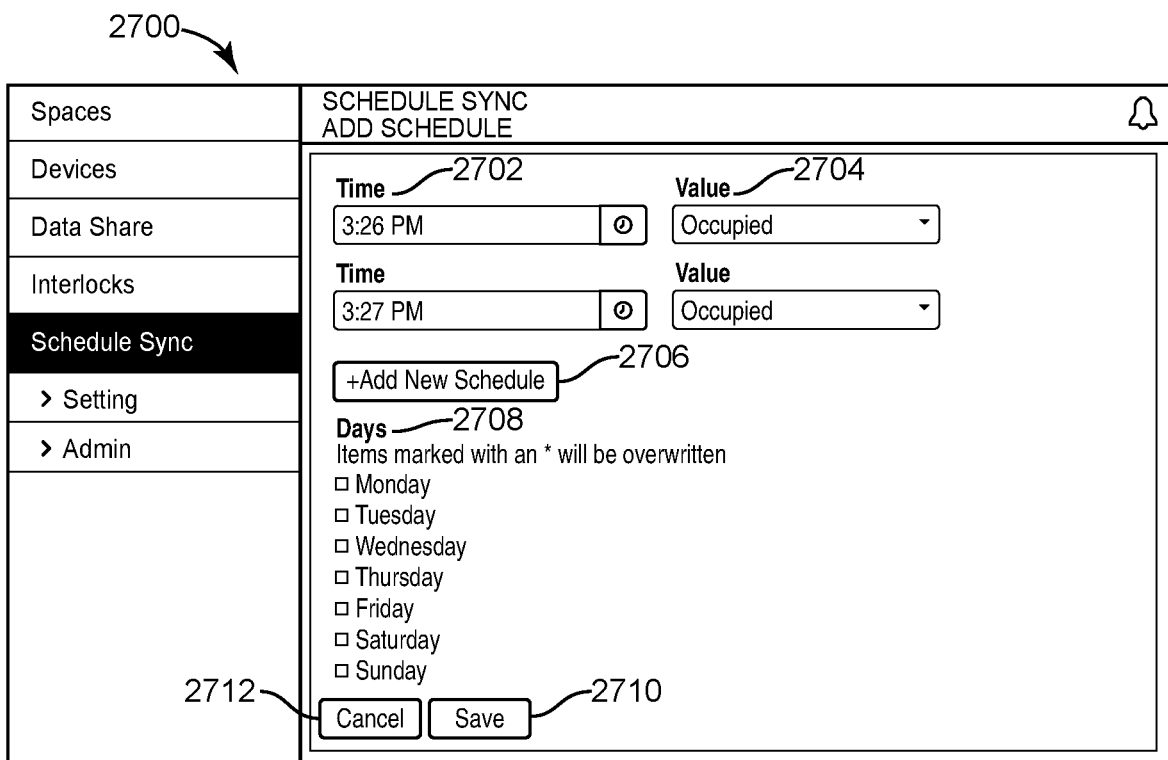
FIG. 27 is an illustration of user interface to update dates and times for a schedule, according to some embodiments.

Referring now to FIG. 27, an illustration of an alternate user interface 2700 to update dates and times for a schedule is shown, according to some embodiments. The user interface 2700 is shown to include a time entry box 2702, a status selector 2704, an add new event box 2706, a day selector 2708, a save button 2710, and a cancel button 2712.

After clicking on the add button 2410, the user will be directed to the alternate user interface 2700 to provide more details about the new schedule being added. For example, the user must determine when the schedule should be occupied (e.g., when the building is occupied by workers) and when the schedule should be unoccupied (e.g., when the building is not occupied by workers), and provide that information to the system.

To enter the time at which the schedule status (e.g., occupied or unoccupied) will apply, the user will enter the time into the time entry box 2702. The user will then use the status selector 2704 to select the status of the new schedule at the time entered into the time entry box 2702. For example, if the user entered the time 9:00 AM in the time entry box 2702, the user may also select occupied in the status selector 2704 because at that time the building may be occupied by workers.

The user must also select the days on which the new schedule will apply by using the day selector 2708. The user can select the days on which the new schedule will apply by clicking in boxes next to the days to select/deselect the days. For example, the user may click on the boxes next to Monday, Tuesday, Wednesday, Thursday, and Friday because at 9:00 AM on those days the building may typically be occupied by workers.

After the user has entered the desired information, the user can save the weekly schedule by clicking on the save button 2710. If the user determines that a mistake was made or no longer desires to enter the information, the user can select the cancel button 2712 to cancel the entry. After the user clicks on the cancel button 2712, the user will be directed back to the user interface 2400. In contrast to the user interface 2600, after the user clicks on the save button 2710, the user will not be directed back to the user interface 2400 because the user has the option of entering multiple dates and times for the new schedule via the user interface 2700.

To enter additional dates and times for the new schedule, the user can click on the add new event box 2706 to add additional time entry boxes 2702 and status selector boxes 2704. Using the user interface 2700, the user will not have to navigate back to the user interface 2700 to add additional weekly schedules (e.g., the building is occupied at 9:00 AM on Monday through Friday, unoccupied at 5:00 PM on Monday through Friday, and unoccupied all day on Saturday and Sunday).

Update Schedule View

Figure 28:
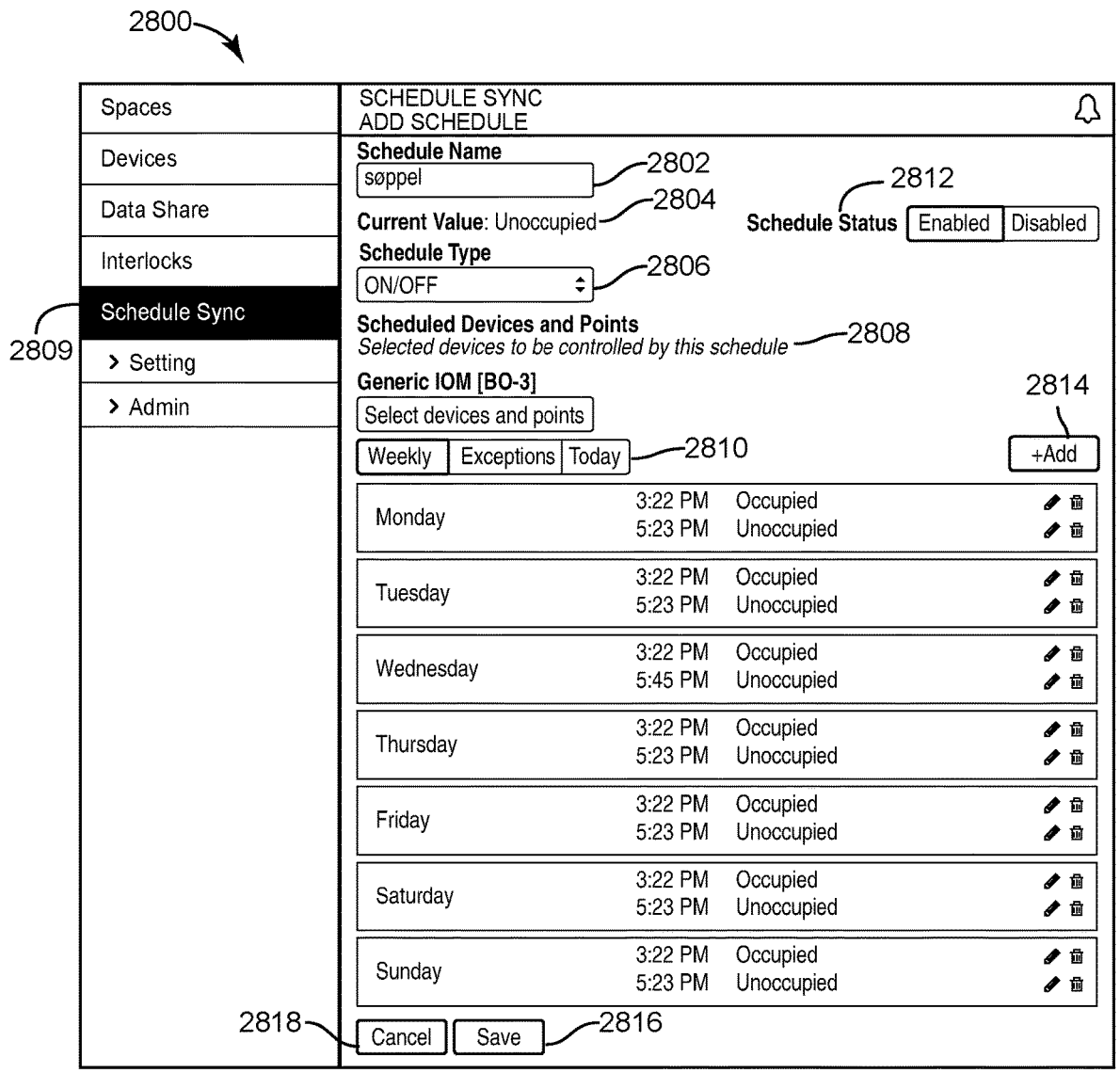
FIG. 28 is an illustration of a user interface to update a schedule, according to some embodiments.

Referring now to FIG. 28, an illustration of a user interface 2800 to update a schedule is shown, according to some embodiments. The user interface 2800 is shown to include a schedule name box 2802, a current status 2804, a schedule type selector 2806, a list of scheduled devices and points 2808, a select devices and points box 2809, a schedule view selector 2810, a schedule status selector 2812, an add button 2814, a save button 2816, and a cancel button 2818.

After a new schedule is added, the new schedule may be modified by clicking on the edit icon 2314 on the user interface 2300. After clicking on the edit icon 2314, the user interface 2800 is displayed to the user. The name of the selected schedule is shown in the schedule name box 2802. If the user desires to change the name of the schedule, the user can enter a new name in the schedule name box 2802. For example, the user may desire to include additional description in the schedule name for clarity.

The current status 2804 shows the user the status of the schedule (e.g., occupied or unoccupied). The current status 2804 is based on the values entered by the user when the schedule was last saved. The schedule type selector 2806 is a dropdown menu that allows the user to select the type of schedule (e.g., occupancy, point, on/off, etc.). The user may desire to change the type of schedule if a mistake was made during the initial schedule set up. For example, the user may have set the schedule as an on/off schedule, however the user actually desired the schedule to be an occupancy schedule. The user can navigate to the user interface 2800 as described and make the desired changes.

The scheduled devices and points 2808 indicates to the user which devices are currently controlled by the selected schedule. The list of devices currently controlled by the selected schedule is based on the values entered by the user when the schedule was last saved. To modify the devices controlled by the selected schedule, the user would click on the select devices and points box 2809 to be redirected to a user interface substantially similar to the user interface 2500. The user could then select or deselect devices to be controlled by the selected schedule.

The schedule view selector 2810 provides the user the ability to view the regular, weekly schedule, the exceptions schedule, and the schedule for the current day. The schedules displayed by the user interface 2800 are based on the values entered by the user when the schedule was last saved. The user can click on the tabs within the schedule view selector 2810 to toggle between the views and see the different schedules.

The schedule status selector 2812 provides the user the ability to enable or disable the selected schedule by clicking "enabled" or "disabled." In some embodiments, the user may desire to disable the schedule because some mistakes were made when the schedule was first entered. For example, the user may have incorrectly set the occupied time when initially saving the schedule and desires to set the correct occupied time. The user may choose to disable the schedule when making the modifications and save the schedule again with the updated occupied time before enabling the schedule again.

If the user desires to add more weekly schedules, the user would click on the add button 2814 when the schedule view selector 2810 was on the "weekly" tab and would be directed to a user interface substantially similar to the user interfaces 2600 or 2700 to make the desired changes and then return to the user interface 2800.

If the user desires to add more exception schedules, the user would click on the add button 2814 when the schedule view selector 2810 was on the "exception" tab and would be directed to a user interface that will be further described with reference to FIG. 30.

After the user has entered the desired information, the user can save the weekly schedule by clicking on the save button 2816. If the user determines that a mistake was made or no longer desires to enter the information, the user can select the cancel button 2818 to cancel the entry.

Add Exceptions

Figure 29:
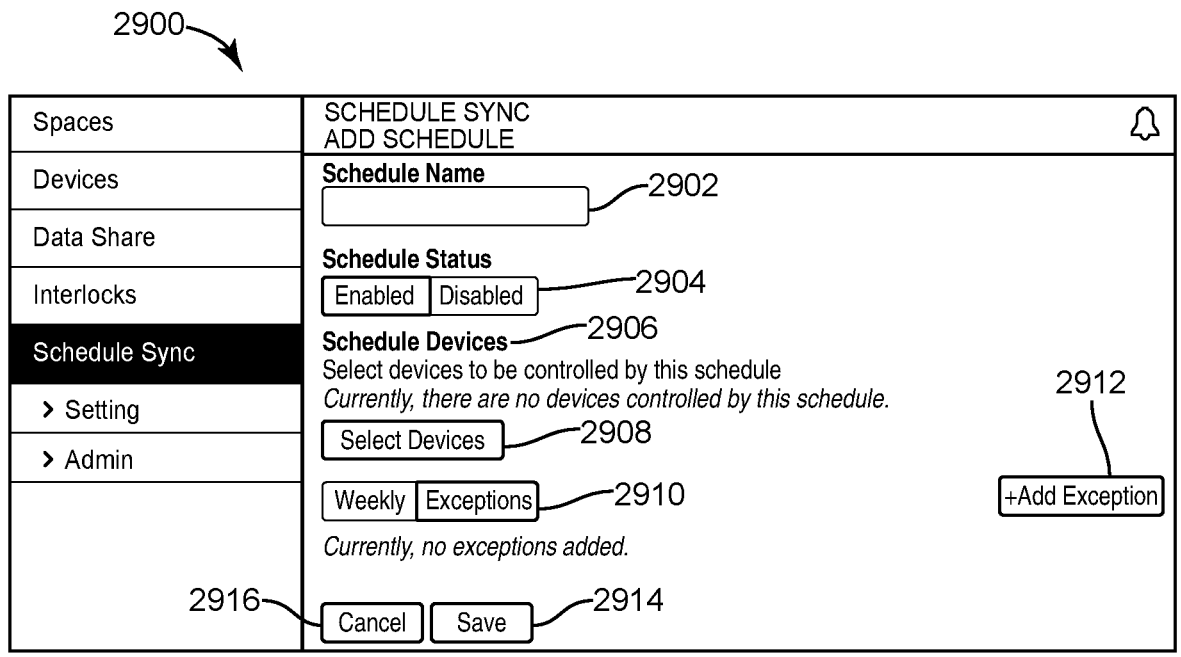
FIG. 29 is an illustration of a user interface to add an exception to a schedule, according to some embodiments.

Referring now to FIG. 29, an illustration of a user interface 2900 to add an exception to a schedule is shown, according to some embodiments. The user interface 2900 is shown to include a schedule name box 2902, a schedule status selector 2904, a schedule devices list 2906, a select devices button 2908, a weekly/exceptions selector 2910, an add exception button 2912, a save button 2914, and a cancel button 2916.

The schedule name box 2902 is a box in which a user can enter text to provide a unique name for the schedule being added. In some embodiments, if the user attempts to provide a name that is already in use on the system, the user will receive an error message that will prompt the user to enter a different name for the desired schedule.

The schedule status selector 2904 allows the user to select whether the schedule is enabled or disabled. An enabled schedule is a schedule that is available for use on devices or equipment connected to the system. A disabled schedule is a schedule that is not available for use on devices or equipment connected to the system. A user may decide to disable a schedule if the equipment to be controlled by the schedule is not yet connected to the system. For example, a user may enter a new schedule that will be followed by a new RTU that is going to be installed. However, the user may not want to allow other devise or equipment to use the new schedule until the new RTU has used the schedule, so the user may set the schedule status selector 2904 to "disabled."

The schedule devices list 2906 displays a list of devices or equipment controlled by the schedule. As shown in FIG. 29, no devices are controlled by the schedule. If the user desires to add devices or equipment to be controlled by the schedule, the user would click on the select devices button 2908, and a new user interface page will load to allow the user to select the devices that will be controlled by the schedule being entered. The user interface page would be substantially similar to the user interface 2500.

The weekly/exceptions selector 2910 allows the user to view the weekly schedule and the exception schedule for the new schedule to be added. For example, if the user selects the "weekly" portion of the weekly/exceptions selector 2908, the user will be able to view the regular, weekly schedule. If the user selects the "exception" portion of the weekly/exceptions selector 2908, the user will be able to view the exceptions to the regular, weekly schedule. As shown in FIG. 29, no exception schedules have been added. To add an exception schedule, the user must click on the add exception button 2912. Clicking on the add exception button 2912 will load a new interface page that will allow the user to create the exception schedule. The interface to create the exception schedule will be further described with reference to FIG. 30.

After the user has entered the desired information for the new schedule, the user can save the schedule by clicking on the save button 2914. However, if the user determines that mistakes have been made when entering the new schedule or if the new schedule is no longer desired, the user can cancel the addition by clicking on the cancel button 2916.

Add Exception Schedule

Figure 30:
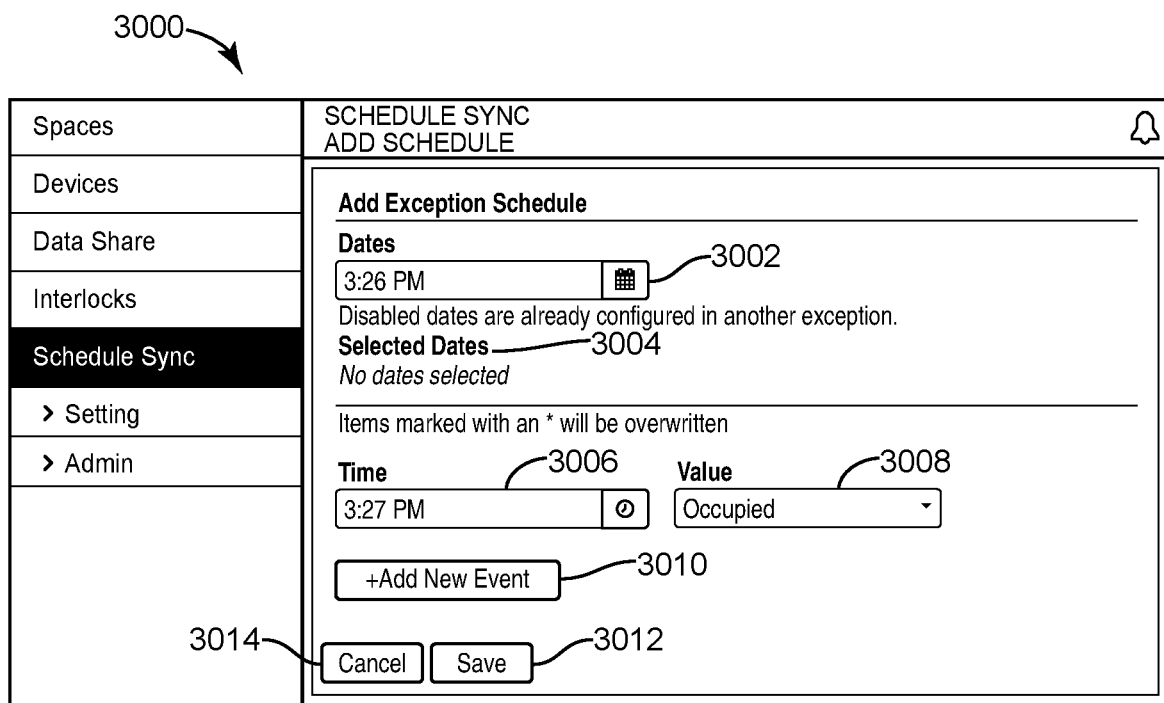
FIG. 30 is an illustration of a user interface to select dates and times for a schedule exception, according to some embodiments.

Referring now to FIG. 30, an illustration of a user interface 3000 to select dates and times for a schedule exception is shown, according to some embodiments. The user interface 3000 is shown to include a date entry box 3002, a selected dates list 3004, a time entry box 3006, a status selector 3008, an add new event button 3010, a save button 3012, and a cancel button 3014.

After the user has clicked the add exception button 2912, the user will be directed to the user interface 3000 to input information regarding the exception. The user can enter the date(s) for the exception in the date entry box 3002. In some embodiments, the user can enter a single date for the exception. In some embodiments, the user can enter multiple dates in the date entry box 3002, separating the dates with an accepted separator (e.g., a comma, semicolon, etc.). The exception dates may also be entered into the date entry box 3002 via a calendar entry method. The calendar entry method will be further described with reference to FIG. 31. After entering the date(s) in the date entry box 3002, the dates entered in the date entry box 3002 will be listed in the selected dates list 3004.

The user can then enter the time at which the exception schedule should begin in the time entry box 3006. In some embodiments, the time is entered into the time entry box 3006 using a twelve-hour time convention. In some embodiments, the time is entered into the time entry box 3006 using a twenty-four-hour time convention. The user then uses the status selector 3008 to select the status (e.g., occupied, unoccupied, etc.) of the exception.

If the user desires to add multiple exceptions on the same selected dates, the user can click on the add new event button 3010 to add additional rows of the time entry box 3006 and status selector 3008. For example, the user may desire to set the status to unoccupied at 9:00 AM and the user may also desire to set the status to occupied at 12:00 PM. By clicking on the add new event button 3010, the user can enter both exceptions on the same page.

After the user has entered the desired information for the exception schedule, the user can save the exception schedule by clicking on the save button 3012. However, if the user determines that mistakes have been made when entering the exception schedule or if the exception schedule is no longer desired, the user can cancel the addition by clicking on the cancel button 3014.

Add Exception Schedule—Calendar View

Figures 31, 32:
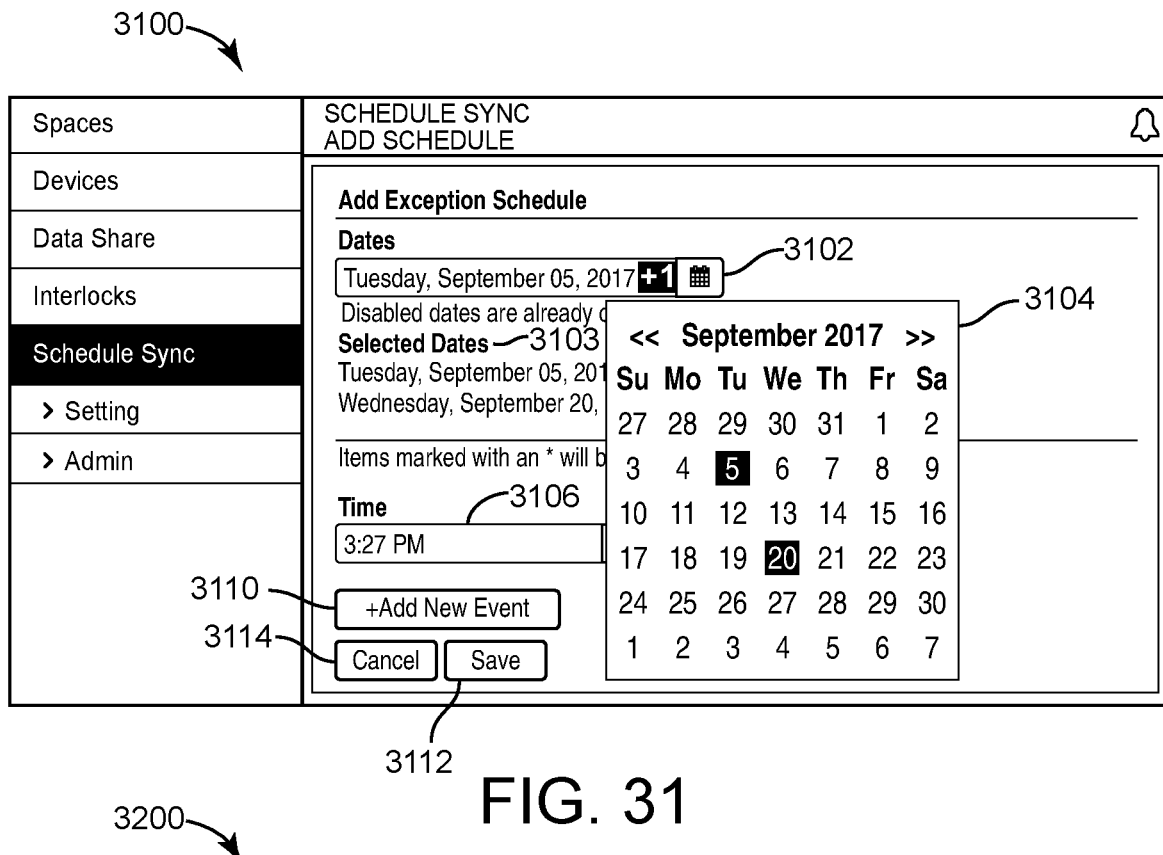
FIG. 31 is an illustration of another user interface to select dates and times for an exception to a schedule, according to some embodiments.
FIG. 32 is an illustration of a user interface to view schedule exceptions, according to some embodiments.

Referring now to FIG. 31, an illustration of another user interface 3100 to select dates and times for an exception to a schedule is shown, according to some embodiments. The user interface 3100 is shown to include a date entry box 3102, a selected dates list 3103, a calendar view 3104, a time entry box 3106, a status selector, an add new event button 3110, a save button 3112, and a cancel button 3114.

After the user has clicked the add exception button 2912, the user will be directed to the user interface 3100 to input information regarding the exception. The user can enter the date(s) for the exception by clicking on the calendar icon next to the date entry box 3102. Clicking on the calendar icon will cause the calendar view 3104 to be displayed. While the calendar view 3104 is displayed, the calendar view 3104 blocks the view of the status selector. On the calendar view 3104, the user can click on the dates on which the exception is desired. In some embodiments, the user can select a single date. In some embodiments, the user can select multiple dates. After selecting the date(s) in the date entry box 3102 using the calendar view 3104, the dates selected will automatically be entered in the date entry box 3102 and will be listed in the selected dates list 3103.

The user can then enter the time at which the exception schedule should begin in the time entry box 3106. In some embodiments, the time is entered into the time entry box 3106 using a twelve-hour time convention. In some embodiments, the time is entered into the time entry box 3106 using a twenty-four-hour time convention. The user then uses the status selector to select the status (e.g., occupied, unoccupied, etc.) of the exception.

If the user desires to add multiple exceptions on the same selected dates, the user can click on the add new event button 3110 to add additional rows of the time entry box 3106 and the status selector. For example, the user may desire to set the status to unoccupied at 9:00 AM and the user may also desire to set the status to occupied at 12:00 PM. By clicking on the add new event button 3110, the user can enter both exceptions on the same page.

After the user has entered the desired information for the exception schedule, the user can save the exception schedule by clicking on the save button 3112. However, if the user determines that mistakes have been made when entering the exception schedule or if the exception schedule is no longer desired, the user can cancel the addition by clicking on the cancel button 3114.

View Exception Schedule

Referring now to FIG. 32, an illustration of a user interface 3200 to view schedule exceptions is shown, according to some embodiments. The user interface 3200 is shown to include a schedule name box 3202, a current status 3204, a list of scheduled devices 3206, a select devices button 3208, a schedule view selector 3210, a schedule status selector 3212, an add exception button 3214, a save button 3216, a cancel button 3218, and a delete button 3220.

After a new exception schedule is added, the new exception schedule may be modified by clicking on the edit icon 2314 on the user interface 2300. In some embodiments, after clicking on the edit icon 2314, the user interface 3200 is displayed to the user. The name of the selected exception schedule is shown in the schedule name box 3202. If the user desires to change the name of the exception schedule, the user can enter a new name in the schedule name box 3202. For example, the user may desire to include additional description in the exception schedule name for clarity.

The current status 3204 shows the user the status of the schedule (e.g., occupied or unoccupied). The current status 3204 is based on the values entered by the user when the schedule was last saved.

The list of scheduled devices 3206 indicates to the user which devices are currently controlled by the selected exception schedule. The list of devices currently controlled by the selected exception schedule is based on the values entered by the user when the exception schedule was last saved. To modify the devices controlled by the selected exception schedule, the user would click on the select devices button 3208 to be redirected to a user interface substantially similar to the user interface 2900. The user could then select or deselect devices to be controlled by the selected schedule.

The schedule view selector 3210 provides the user the ability to view the regular, weekly schedule, the exceptions schedule, and the schedule for the current day. The exception schedules displayed by the user interface 3200 are based on the values entered by the user when the exception schedule was last saved. The user can click on the tabs within the schedule view selector 3210 to toggle between the views and see the different schedules.

The schedule status selector 3212 provides the user the ability to enable or disable the selected exception schedule by clicking "enabled" or "disabled." In some embodiments, the user may desire to disable the exception schedule because some mistakes were made when the exception schedule was first entered. For example, the user may have incorrectly set the occupied time when initially saving the exception schedule and desires to set the correct occupied time. The user may choose to disable the exception schedule when making the modifications and save the exception schedule again with the updated occupied time before enabling the exception schedule again.

If the user desires to add more exception schedules, the user would click on the add exception button 3214 when the schedule view selector 3210 was on the "exception" tab and would be directed to a user interface substantially similar to the user interfaces 3000 or 3100 to make the desired changes and then return to the user interface 3200.

After the user has entered the desired information, the user can save the weekly schedule by clicking on the save button 3216. If the user determines that a mistake was made or no longer desires to enter the information, the user can select the cancel button 3218 to cancel the entry. If the user instead desires to delete the exception schedule, the user can select the delete button 3220 to delete the selected exception schedule.

View Daily Schedule

Figure 33:
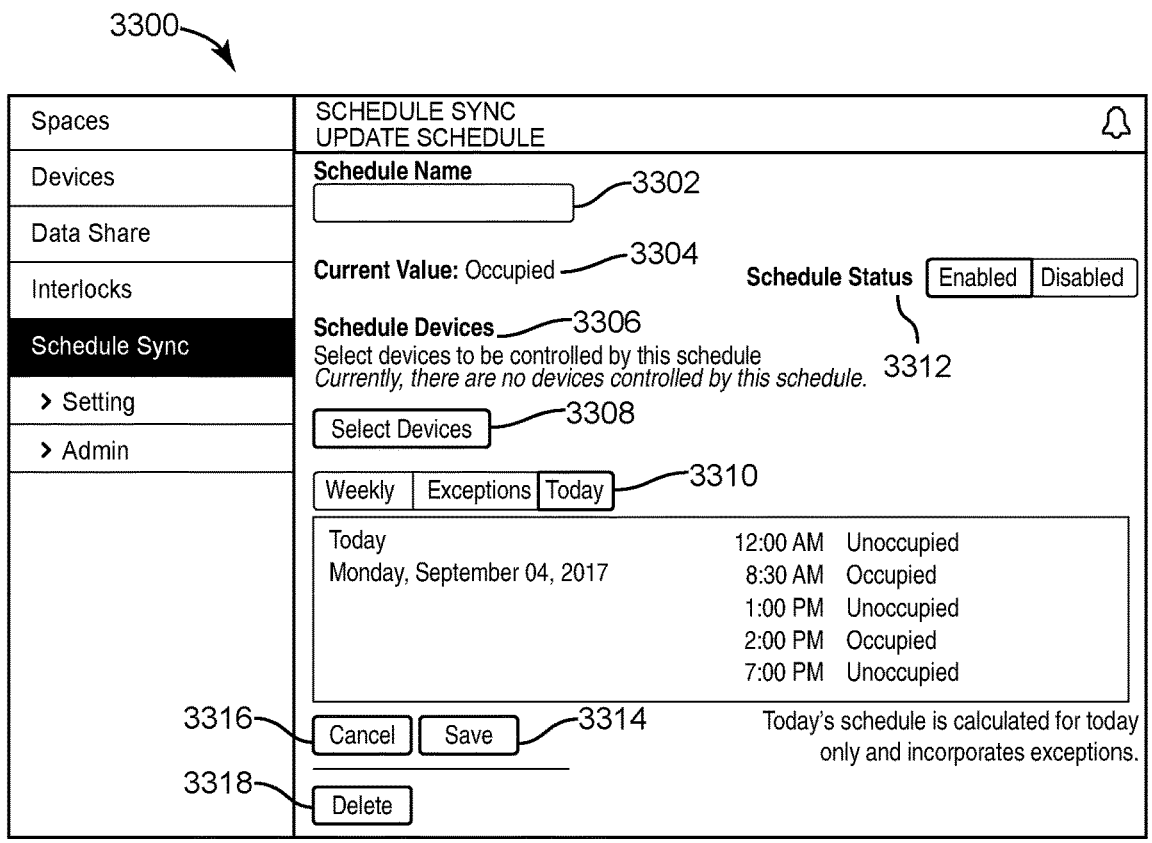
FIG. 33 is an illustration of a user interface to view a daily schedule, according to some embodiments.

Referring now to FIG. 33, an illustration of a user interface 3300 to view a daily schedule is shown, according to some embodiments. The user interface 3300 is shown to include a schedule name box 3302, a current status 3304, a list of scheduled devices 3306, a select devices box 3308, a schedule view selector 3310, a schedule status selector 3312, a save button 3314, a cancel button 3316, and a delete button 3318.

After a new schedule is added, the new schedule may be modified by clicking on the edit icon 2314 on the user interface 2300. In some embodiments, after clicking on the edit icon 2314, the user interface 3300 is displayed to the user. The name of the selected schedule is shown in the schedule name box 3302. If the user desires to change the name of the schedule, the user can enter a new name in the schedule name box 3302. For example, the user may desire to include additional description in the schedule name for clarity.

The current status 3304 shows the user the status of the schedule (e.g., occupied or unoccupied). The current status 3304 is based on the values entered by the user when the schedule was last saved. The list of scheduled devices 3306 indicates to the user which devices are currently controlled by the selected schedule. The list of devices currently controlled by the selected schedule is based on the values entered by the user when the schedule was last saved. To modify the devices controlled by the schedule, the user would click on the select devices box 3308 to be redirected to a user interface substantially similar to the user interface 2500. The user could then select or deselect devices to be controlled by the selected schedule.

The schedule view selector 3310 provides the user the ability to view the regular, weekly schedule, the exceptions schedule, and the schedule for the current day. The schedules displayed by the user interface 3300 are based on the values entered by the user when the schedule was last saved. The user can click on the tabs within the schedule view selector 3310 to toggle between the views and see the different schedules.

The schedule status selector 3312 provides the user the ability to enable or disable the selected schedule by clicking "enabled" or "disabled." In some embodiments, the user may desire to disable the schedule because some mistakes were made when the schedule was first entered. For example, the user may have incorrectly set the occupied time when initially saving the schedule and desires to set the correct occupied time. The user may choose to disable the schedule when making the modifications and save the schedule again with the updated occupied time before enabling the schedule again.

After the user has entered the desired information, the user can save the daily schedule by clicking on the save button 3314. If the user determines that a mistake was made or no longer desires to enter the information, the user can select the cancel button 3316 to cancel the entry. If the user instead desires to delete the exception schedule, the user can select the delete button 3318 to delete the selected exception schedule.

Update Exception Schedule

Figure 34:
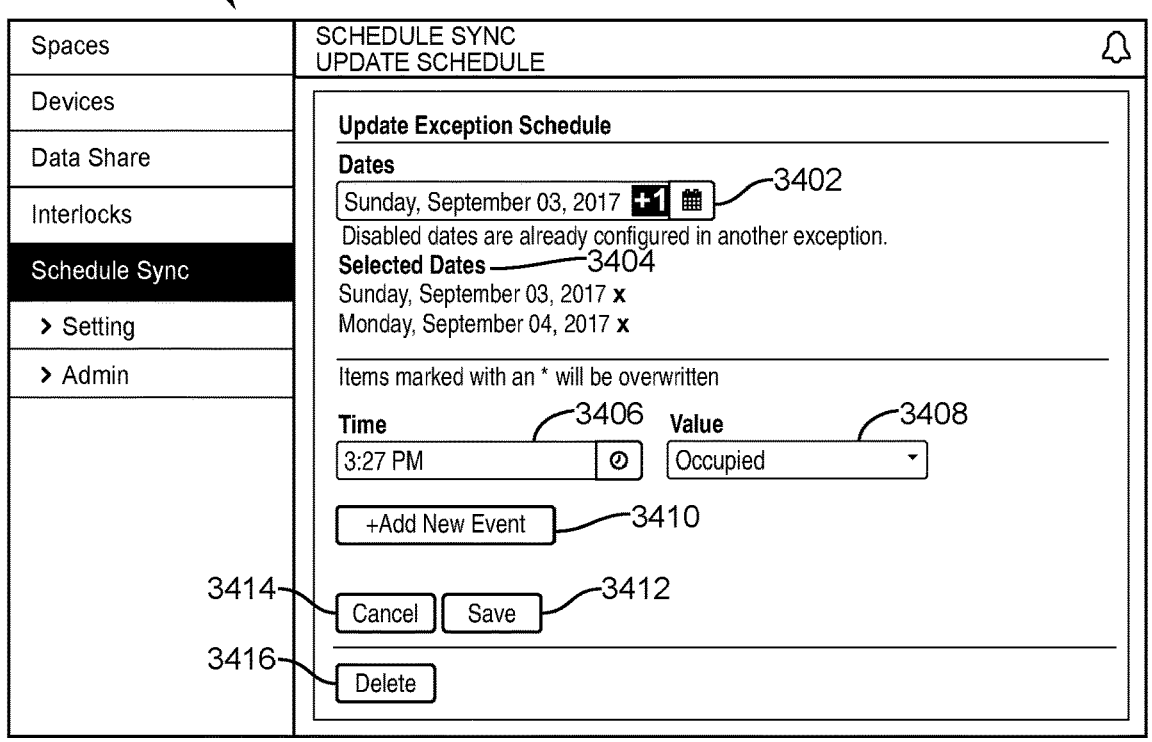
FIG. 34 is an illustration of a user interface to update an exception schedule, according to some embodiments.

Referring now to FIG. 34, an illustration of a user interface 3400 to update an exception schedule is shown, according to some embodiments. The user interface 3400 is shown to include a date entry box 3402, a selected dates list 3404, a time entry box 3406, a status selector 3408, an add new event button 3410, a save button 3412, a cancel button 3414, and a delete button 3416.

If the user desires to modify an exception, the user can click on the "exceptions" tab on the user interface 2800 and the click on the edit icon of the desired exception. The user will then be directed to the user interface 3400 to edit information regarding the exception. If the user desires to enter additional dates for the exception, the user can enter the additional date(s) for the exception in the date entry box 3402. The exception dates may also be entered into the date entry box 3402 via a calendar entry method. The calendar entry method will be further described with reference to FIG. 35. After entering the date(s) in the date entry box 3402, the dates entered in the date entry box 3402 will be listed in the selected dates list 3404.

If the user desires to delete dates for the exception, the user can click on the "x" next to the specific date listed in the selected dates list 3404. In this way, the user can delete one or more dates for the exception without deleting the entire exception. The user can then edit the time at which the exception schedule should begin in the time entry box 3406. In some embodiments, the time is entered into the time entry box 3406 using a twelve-hour time convention. In some embodiments, the time is entered into the time entry box 3406 using a twenty-four-hour time convention. The user can then use the status selector 3408 to edit the status (e.g., occupied, unoccupied, etc.) of the exception.

If the user desires to add additional exceptions on the same selected dates, the user can click on the add new event button 3410 to add additional rows of the time entry box 3406 and the status selector 3408. For example, the user may desire to set the status to unoccupied at 9:00 AM and the user may also desire to set the status to occupied at 12:00 PM. By clicking on the add new event button 3410, the user can enter both exceptions on the same page.

After the user has entered the desired information for the exception schedule, the user can save the exception schedule by clicking on the save button 3412. However, if the user determines that mistakes have been made when entering the exception schedule or if the exception schedule is no longer desired, the user can cancel the addition by clicking on the cancel button 3414. If the user instead desires to delete the entire exception, the user can select the delete button 3416 to delete the exception schedule.

Update Exception Schedule—Calendar View

Figure 35:
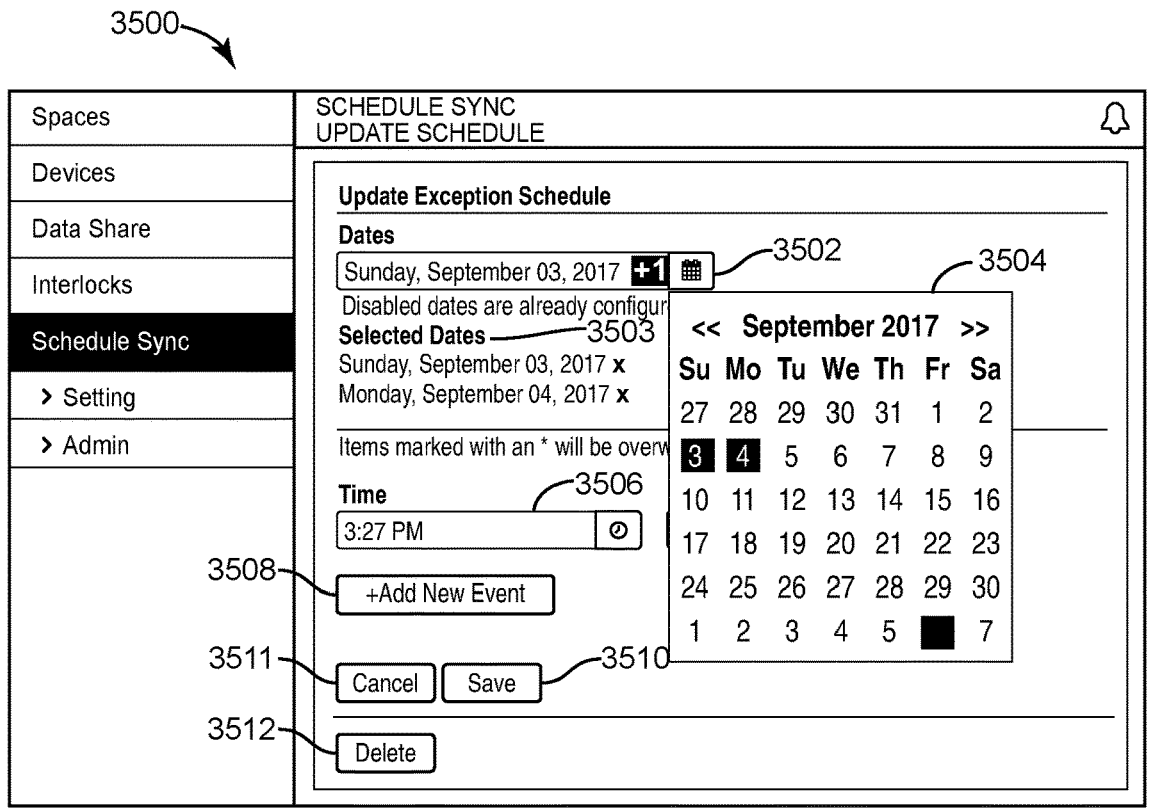
FIG. 35 is an illustration of another user interface to update an exception schedule, according to some embodiments.

Referring now to FIG. 35, an illustration of another user interface 3500 to update an exception schedule is shown, according to some embodiments. The user interface 3500 is shown to include a date entry box 3502, a selected dates list 3503, a calendar view 3504, a time entry box 3506, a status selector, an add new event button 3508, a save button 3510, a cancel button 3511, and a delete button 3512.

If the user desires to modify an exception, the user can click on the "exceptions" tab on the user interface 2800 and the click on the edit icon of the desired exception. The user will then be directed to the user interface 3500 to edit information regarding the exception. The user can enter the date(s) for the exception by clicking on the calendar icon next to the date entry box 3502. Clicking on the calendar icon will cause the calendar view 3504 to be displayed. While the calendar view 3504 is displayed, the calendar view 3504 blocks the view of the status selector. On the calendar view 3504, the user can click on the dates on which the exception is desired. In some embodiments, the user can select a single date. In some embodiments, the user can select multiple dates. After selecting the date(s) in the date entry box 3502 using the calendar view 3504, the dates selected will automatically be entered in the date entry box 3502 will be listed in the selected dates list 3503.

If the user desires to delete dates for the exception, the user can click on the "x" next to the specific date listed in the selected dates list 3503. In this way, the user can delete one or more dates for the exception without deleting the entire exception. The user can then edit the time at which the exception schedule should begin in the time entry box 3506.

In some embodiments, the time is entered into the time entry box 3506 using a twelve-hour time convention. In some embodiments, the time is entered into the time entry box 3506 using a twenty-four-hour time convention. The user then uses the status selector to edit the status (e.g., occupied, unoccupied, etc.) of the exception.

If the user desires to add additional exceptions on the same selected dates, the user can click on the add new event button 3508 to add additional rows of the time entry box 3506 and the status selector. For example, the user may desire to set the status to unoccupied at 9:00 AM and the user may also desire to set the status to occupied at 12:00 PM. By clicking on the add new event button 3508, the user can enter both exceptions on the same page.

After the user has entered the desired information for the exception schedule, the user can save the exception schedule by clicking on the save button 3510. However, if the user determines that mistakes have been made when entering the exception schedule or if the exception schedule is no longer desired, the user can cancel the addition by clicking on the cancel button 3511. If the user instead desires to delete the entire exception, the user can select the delete button 3512 to delete the exception schedule.

Exception Schedule—Equipment View

Figure 36:
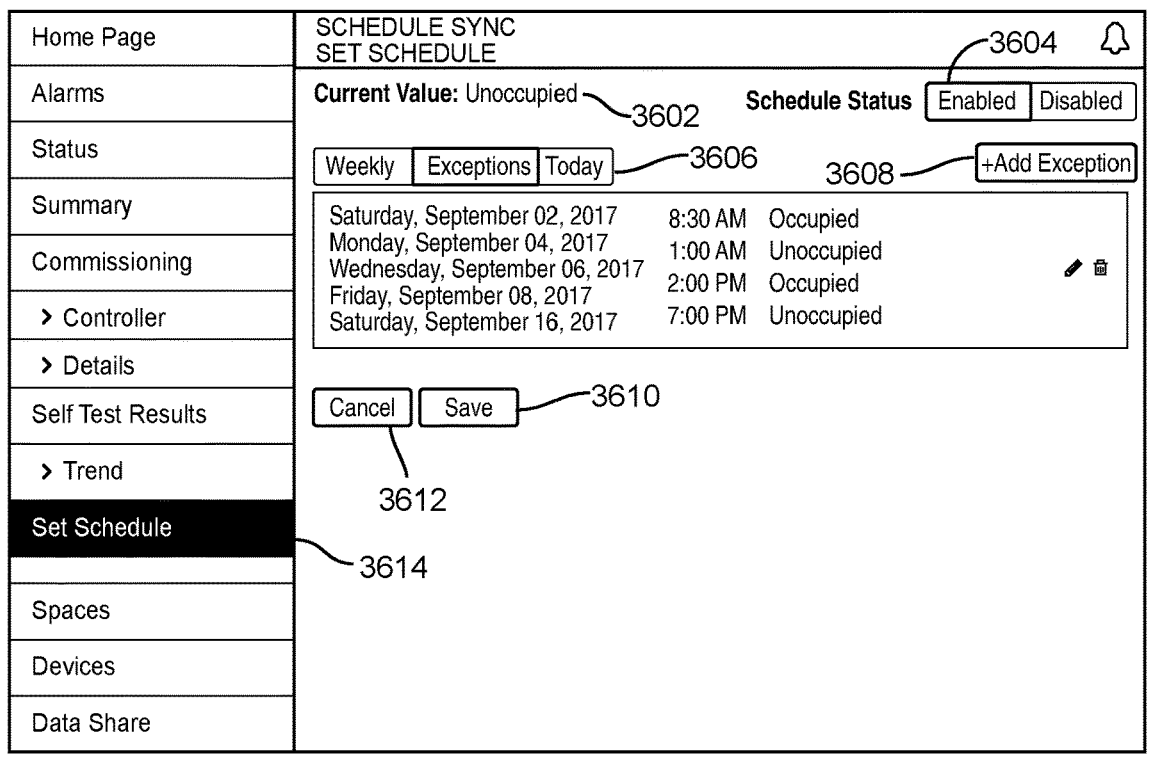
FIG. 36 is an illustration of a user interface to view the schedule for building equipment, according to some embodiments.

Referring now to FIG. 36, an illustration of a user interface 3600 to view the exception schedule for building equipment is shown, according to some embodiments. The user interface 3600 is shown to include a current status 3602, a schedule status selector 3604, a schedule view selector 3606, an add exception button 3608, a save button 3610, a cancel button 3612, and a set schedule button 3614.

If a user desires to view the exception schedule of a specific device or piece of building equipment, the user must click on the set schedule button 3614 to be directed to the user interface 3600. The current status 3602 shows the user the status of the schedule (e.g., occupied or unoccupied). The current status 3602 is based on the values entered by the user when the schedule was last saved.

The schedule status selector 3604 provides the user the ability to enable or disable the selected exception schedule by clicking "enabled" or "disabled." In some embodiments, the user may desire to disable the exception schedule because some mistakes were made when the exception schedule was first entered. For example, the user may have incorrectly set the occupied time when initially saving the exception schedule and desires to set the correct occupied time. The user may choose to disable the exception schedule when making the modifications and save the exception schedule again with the updated occupied time before enabling the exception schedule again.

The schedule view selector 3606 provides the user the ability to view the regular, weekly schedule, the exceptions schedule, and the schedule for the current day. The exception schedules displayed by the user interface 3600 are based on the values entered by the user when the exception schedule was last saved. The user can click on the tabs within the schedule view selector 3606 to toggle between the views and see the different schedules. For example, when the "exceptions" tab is selected, the user can view the exception schedules associated with a specific device or piece of equipment. The user can then edit or delete the exception schedules as desired by clicking on the edit or delete icons.

If the user desires to add more exception schedules for the device or equipment, the user would click on the add exception button 3608 and would be directed to a user interface substantially similar to the user interfaces 3000 or 3100 to make the desired changes and then return to the user interface 3600.

After the user has entered the desired information for the exception schedule, the user can save the exception schedule by clicking on the save button 3610. However, if the user determines that mistakes have been made when entering the exception schedule or if the exception schedule is no longer desired, the user can cancel the addition by clicking on the cancel button 3612.

Equipment Schedule View

Figure 37:
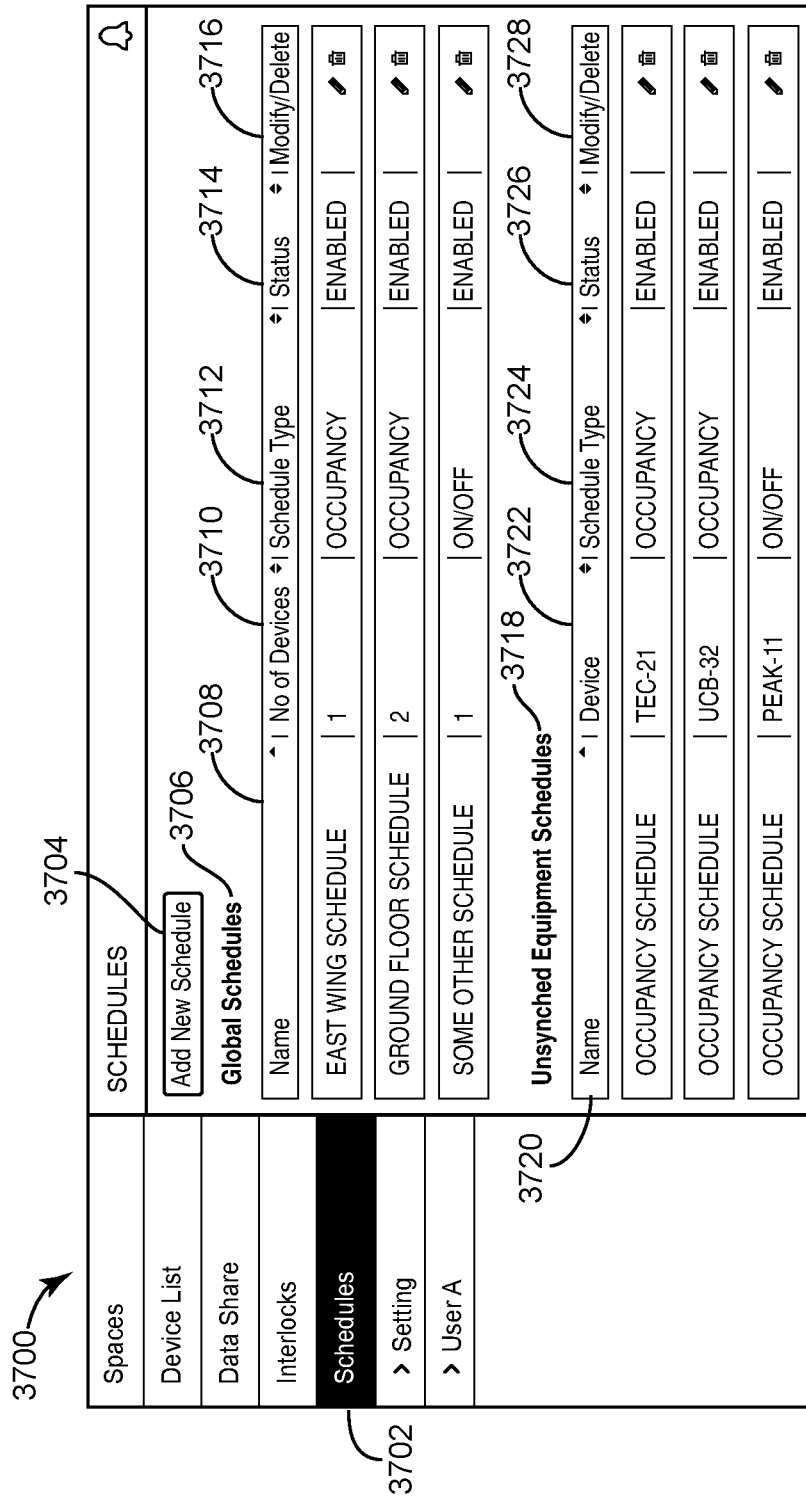
FIG. 37 is an illustration of a user interface to view all existing schedules, according to some embodiments.

Referring now to FIG. 37, an illustration of a user interface 3700 to view equipment schedules is shown, according to some embodiments. The user interface 3700 is shown to include a schedules button 3702, an add new schedule button 3704, a global schedules list 3706, and a unsynced equipment schedules list 3718. The global schedules list 3706 is further shown to include a schedule name list 3708, a number of devices list 3710, a schedule type list 3712, a schedule status list 3714, and a modify/delete option 3716. The unsynced equipment schedules list 3718 is further shown to include a schedule name list 3720, a device name list 3722, a schedule type list 3724, a schedule status 3736, and a modify option 3728.

If a user desires to view equipment schedules, the user would click on the schedules button 3702 and would then be directed to the user interface 3700. To add a new schedule, the user would click on the add new schedule button 3704 and be directed to a user interface to add a new schedule. This user interface will be further described with reference to FIG. 38.

The user interface 3700 provides the user the ability to view the global schedules list 3706, which provides information regarding the global schedules on the system. The schedule name list 3708 includes the unique names of the global schedules, and the number of devices list 3710 indicates the number of devices being controlled by the corresponding global schedule. The schedule type list 3712 identifies the type of schedule (e.g., occupancy, on/off, etc.) and the schedule status list 3714 indicates whether the global schedule is enabled or disabled. The modify/delete option 3716 provides the user the ability to modify and/or delete a global schedule by clicking on the edit icon or delete icon of the desired global schedule. If the user clicks on the edit icon, the user will be directed to another user interface to edit the schedule, substantially similar to other user interfaces previously described.

The unsynced equipment schedules list 3718 provides information regarding the unsynced equipment schedules on the system. The schedule name list 3720 includes the names of the unsynced equipment schedules. The names of the unsynced equipment schedules may not be unique because they are specific to a piece of equipment and not shared across the system. The device name list 3722 indicates the name of the device being controlled by the unsynced equipment schedule, and the schedule type list 3724 identifies the type of schedule (e.g., occupancy, on/off, etc.). The schedule status list 3726 indicates whether the unsynced equipment schedule is enabled or disabled. The modify option 3728 provides the user the ability to modify an unsynced equipment schedule by clicking on the edit icon of the desired schedule. If the user clicks on the edit icon, the user will be redirected to another user interface to edit the schedule, substantially similar to other user interfaces previously described.

If an unsynced equipment schedule is edited, the schedule will then be synced with the global schedules and be moved from the unsynced equipment schedules list 3718 to the global schedules list 3706. For example, if a chiller included an unsynced equipment schedule that only that chiller follows, the unsynced equipment schedule can be edited by a user. After editing the unsynced schedule and saving it, the unsynced schedule then becomes a global schedule and is moved from the unsynced equipment schedules list 3718 to the global schedules list 3706.

Add Schedule—Schedule Type

Referring now to FIG. 38, an illustration of a user interface 3800 to view which devices to associate with a schedule is shown, according to some embodiments. After clicking on the add new schedule button 3704, the user will be directed to the user interface 3800 to enter information regarding the desired schedule. The user interface 3800 is shown to include a schedule name box 3802, a schedule status selector 3804, a schedule type selector 3806, a scheduled devices and points list 3808, a select devices and points button 3810, a weekly/exceptions selector 3812, an add exception button 3814, a save button 3816, and a cancel button 3818.

The schedule name box 3802 is a box in which a user can enter text to provide a unique name for the schedule being added. In some embodiments, if the user attempts to provide a name that is already in use on the system, the user will receive an error message that will prompt the user to enter a different name for the desired schedule.

The schedule status selector 3804 allows the user to select whether the schedule is enabled or disabled. An enabled schedule is a schedule that is available for use on devices or equipment connected to the system. A disabled schedule is a schedule that is not available for use on devices or equipment connected to the system. A user may decide to disable a schedule if the equipment to be controlled by the schedule is not yet connected to the system. For example, a user may enter a new schedule that will be followed by a new RTU that is going to be installed. However, the user may not want to allow other devices or equipment to use the new schedule until the new RTU has used the schedule, so the user may set the schedule status selector 3804 to "disabled."

The schedule type selector 3806 provides the user the ability to select the type of schedule (e.g., on/off, off/on, active/inactive, inactive/active, etc.) for the new schedule. The schedule devices and points list 3808 displays a list of devices/equipment and/or points controlled by the schedule. As shown in FIG. 38, the Generic IOM [BO-3] is controlled by the schedule. If the user desires to add more devices or equipment to be controlled by the schedule, the user would click on the select devices and points button 3810, and a new user interface page will load to allow the user to select the devices that will be controlled by the schedule being entered. The user interface page would be substantially similar to other user interfaces previously described.

The weekly/exceptions selector 3812 allows the user to view the weekly schedule and the exception schedule for the new schedule to be added. For example, if the user selects the "weekly" portion of the weekly/exceptions selector 3812, the user will be able to view the regular, weekly schedule. If the user selects the "exception" portion of the weekly/exceptions selector 3812, the user will be able to view the exceptions to the regular, weekly schedule. As shown in FIG. 38, no exception schedules have been added. To add an exception schedule, the user must click on the add exception button 3814. Clicking on the add exception button 3814 will load a new interface page that will allow the user to create the exception schedule. The interface to create the exception schedule would be substantially similar to other user interfaces previously described.

After the user has entered the desired information for the new schedule, the user can save the schedule by clicking on the save button 3816. However, if the user determines that mistakes have been made when entering the new schedule or if the new schedule is no longer desired, the user can cancel the addition by clicking on the cancel button 3818.

Select Points to Control

Referring now to FIG. 39, an illustration of a user interface 3900 to select points to control is shown, according to some embodiments. The user interface 3900 is shown to include a selection box 3902, a save button 3904, and a cancel button 3906.

After clicking on the select devices and points button 3810, the user interface 3900 will be displayed for the user to select the points to be controlled by the new schedule. A list of points will be displayed in the selection box 3902. In some embodiments, some of the devices listed in the selection box 3902 may not be available to be controlled by the new schedule. For example, the Generic IOM-B03 and the Zone Coordinator may be controlled by the zone schedule, so they cannot be controlled by the new schedule, as only one schedule can control a point at any time. Therefore, the user would not be able to select the Generic IOM-B03 and the Zone Coordinator to be controlled by the new schedule.

The points available to be controlled by the new schedule will include selection boxes next to the points such that the user can click within the selection box 3902 to select or deselect the points. For example, the user has selected the Generic IOM-B01 and the Generic IOM-B02 to be controlled by the new schedule by clicking in the selection box 3902 next to the name of the points. A checkmark fills the box next to the points to indicate that the points will be controlled by the new schedule. A box without a checkmark indicates that the points will not be controlled by the new schedule (e.g., York RTU 10 will not be controlled by the new schedule).

To save the changes made by the user, the user will select the save button 3904. To cancel any changes made by the user, the user will select the cancel button 3906. After selecting either the save button 3904 or the cancel button 3906, the user will be redirected back to the user interface 3800.

Enterprise System for Automatic Scheduling of Multiple Sites

Figure 40:
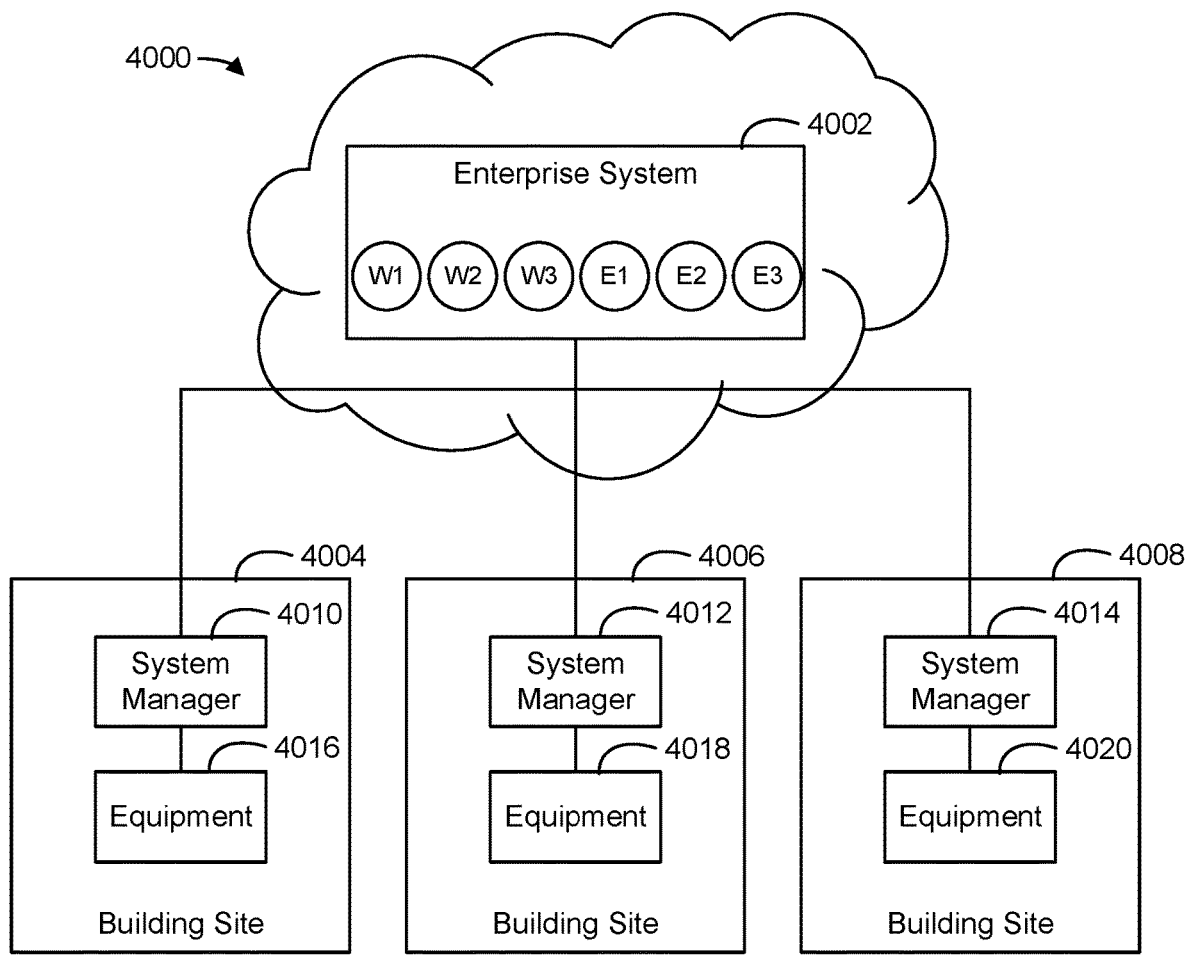
FIG. 40 is a block diagram of an enterprise system in communication with equipment across multiple building sites, according to some embodiments.

Referring now to FIG. 40, a block diagram 4000 of an enterprise system 4002 in communication with equipment across multiple building sites is shown, according to some embodiments. The block diagram 4000 is shown to include an enterprise system 4002, a building site 4004, a building site 4006, and a building site 4008. The building site 4004 is further shown to include a system manager 4010 and equipment 4016. The building site 4006 is further shown to include a system manager 4012 and equipment 4018. The building site 4008 is further shown to include a system manager 4014 and equipment 4020.

The enterprise system 4002 can be any type of large-scale application software package that supports business processes, information flows, reporting, and data analytics, and is capable of managing data across various building sites. Examples of enterprise systems include SAP, Oracle, and cloud-based systems such as Microsoft Azure. As shown in FIG. 40, the enterprise system 4002 manages building site 4004, building site 4006, and building site 4008. However, it will be understood that the enterprise system 4002 can manage a plurality of building sites, and building sites 4004-4008 are shown as examples and are not meant to be limiting.

The enterprise system 4002 further includes template schedules W1, W2, W3, E1, E2, and E3. The template schedules W1, W2, and W3 represent weekly schedule templates, and the template schedules E1, E2, and E3 represent exception schedule templates. The template schedules may be entered by a user into the enterprise system 4002 by any of the methods previously described with reference to FIGS. 23-39.

The enterprise system 4002 is in communication with the system managers 4010-4014 and provides template schedules that the system managers 4010-4014 can push to the respective equipment 4016-4020 such that the equipment 4016-4020 operates properly. For example, the building site 4004 may include a chiller similar to a chiller at a different building site close to the building site 4004. The chiller at the different building site may use template schedule W2 for its regular, weekly schedule and exception template schedule E3 for its holiday schedule. Because building site 4004 is close to the different building site, the system manager 4010 may choose to use the template schedule W2 for the weekly schedule and the exception template schedule E3 for the exception schedule.

The building sites 4004-4008 can be any type of structure that may require the management of different devices or equipment. For example, the building sites 4004-4008 can be an office building, a large retail store, or a shopping mall.

The system managers 4010-4014 are substantially similar to the system manager 202 and are configured to manage communications between the enterprise system 4002 and the client devices and equipment at their respective building sites.

The equipment 4016-4020 can be any type of building equipment previously described with reference to FIGS. 1-2 (e.g., boilers, chillers, variable air volume units, heating coils, cooling coils, fans, and any other building equipment that is configured to follow a schedule of operation).

Figure 41:
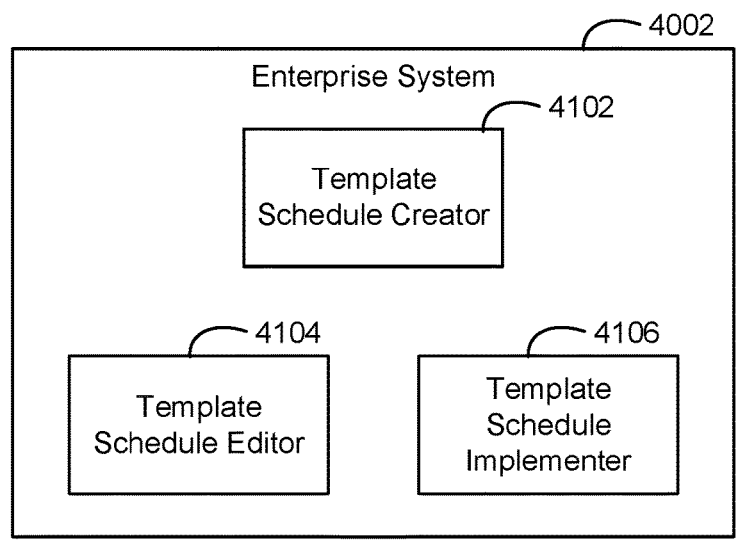
FIG. 41 is a block diagram of the enterprise system of FIG. 40, according to some embodiments.

Referring now to FIG. 41, a block diagram of the enterprise system 4002 of FIG. 40 is shown, according to some embodiments. The enterprise system 4002 is shown to include a template schedule creator 4102, a template schedule editor 4104, and a template schedule implementer 4106.

In some embodiments, the template schedule creator 4102 receives inputs from various building sites in communication with the enterprise system 4002. These inputs may include the addition of new or updated schedules for various building equipment at the various building sites. The template schedule creator 4102 receives the new schedules and creates or updates the schedules as templates that can be used across other building sites, not just the building site from which the schedule was created or updated.

In some embodiments, the template schedule creator 4102 receives inputs from an enterprise client device similar to the enterprise client device 316. These inputs may include the addition of new or updated template schedules that can be used across all the building sites associated with the enterprise system 4002

The template schedule editor 4104 can edit the template schedules created by the template schedule creator 4102. In some embodiments, the template schedules can be edited by an enterprise client device similar to the enterprise client device 316. In some embodiments, the template schedules can be edited by a user at a building site using methods similar to those described with reference to FIGS. 20-39.

The template schedule implementer 4106 can implement the template schedules to the system managers across different building sites. In some embodiments, the template schedule implementer 4106 automatically pushes template schedules to the system managers. For example, a new chiller may have been installed at one building site, and the new chiller is the same model as the current chiller at a different building site. The template schedule implementer 4106 may automatically send the current chiller schedule templates to the system manager for the new chiller so the new chiller follows the same schedule as the current chiller. In some embodiments, the template schedule implementer 4106 pushes template schedules to the system managers after a request from the system managers. For example, after the new chiller is installed, the system manager at that building site may request the appropriate template schedules from the enterprise system 4002. The template schedule implementer 4106 would then send the appropriate template schedules to the system manager for the new chiller.

Figure 42:
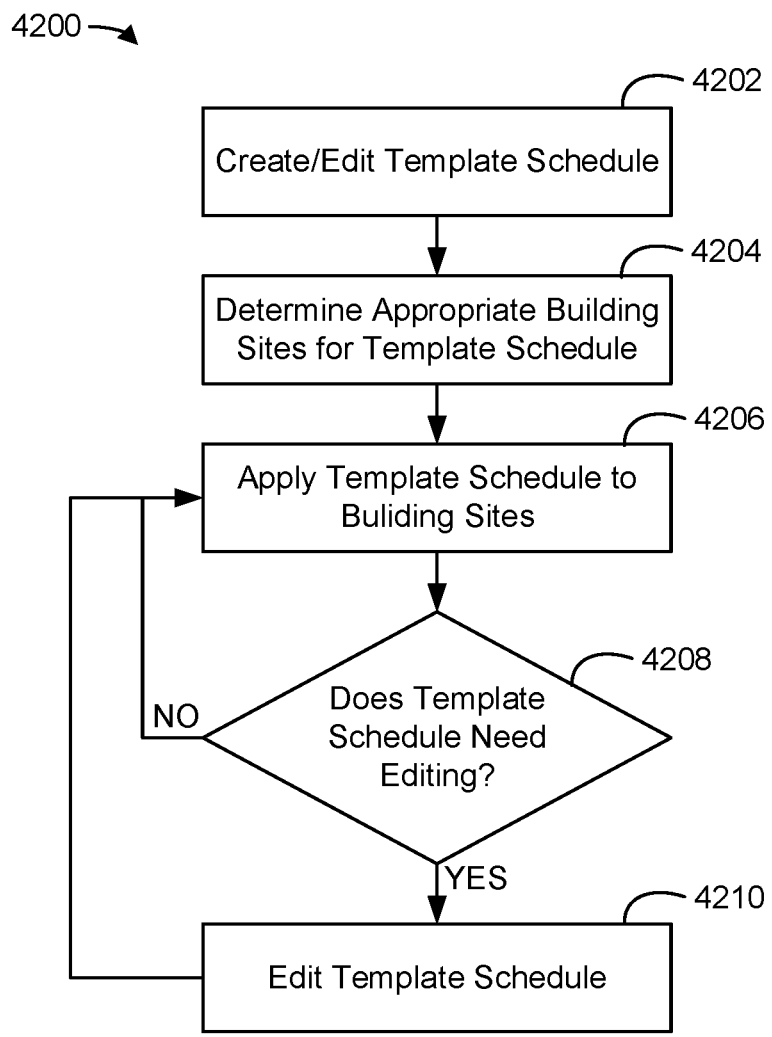
FIG. 42 is a flow diagram illustrating a technique to create schedules and apply schedules to building sites, according to some embodiments.

Referring now to FIG. 42, a flow diagram illustrating a process 4200 to create schedules and apply schedules to building sites is shown, according to some embodiments. In some embodiments, the process 4200 can be performed by one or more components of the system manager 202, as described with reference to FIGS. 3-7. In some embodiments, the process 4200 is performed by the system manager 202 when a new template schedule is created or edited. In some embodiments, the process 4200 can be performed by one or more components of the enterprise system 4002, as described with reference to FIGS. 41-42. In some embodiments, the process 4200 is performed by the enterprise system 4002 when a new template schedule is created or edited.

The process 4200 is shown to include creating or editing a template schedule (step 4202). For example, a user may have determined that a new schedule is necessary for specific chillers across various building sites for more efficient operation. The new template schedule can be created or edited by any of the methods described with reference to FIGS. 20-39, and FIG. 41.

The process 4200 is shown to include determining the appropriate building sites for the template schedule (step 4204). For example, the new schedule for specific chillers must be implemented across the building sites. In some embodiments, the enterprise system 4002 determines which building sites have the specific chillers. In some embodiments, the user that entered the new schedule determines which building sites have the specific chillers. In some embodiments, the specific chillers identify themselves to the enterprise system 4002.

The process 4200 is shown to include applying the template schedule to building sites (step 4206). For example, after determining which building sites include the new chillers, the template schedule implementer 4106 can push the template schedules to the appropriate building sites for implementation into the new chillers. In some embodiments, the system managers for the building sites with the new chillers can pull the template schedules from the template schedule implementer 4106.

The process 4200 is shown to include determining whether the template schedule needs editing (step 4208). For example, the new chillers may not be operating at the most efficient levels, and it must be determined whether the schedule needs to be modified.

If it is determined that the template schedule does not need to be edited (NO at step 4208), the template schedules will continue to be implemented to the appropriate building sites (step 4206). If it is determined that the template schedule needs to be edited (YES at step 4208), the template schedule is then edited by any of the methods previously described with reference to FIGS. 20-39, and FIG. 41 (step 4210), and then the edited template schedule is implemented at the appropriate building sites (step 4206).

Batch Scheduling—Occupancy Schedule

Figure 43:
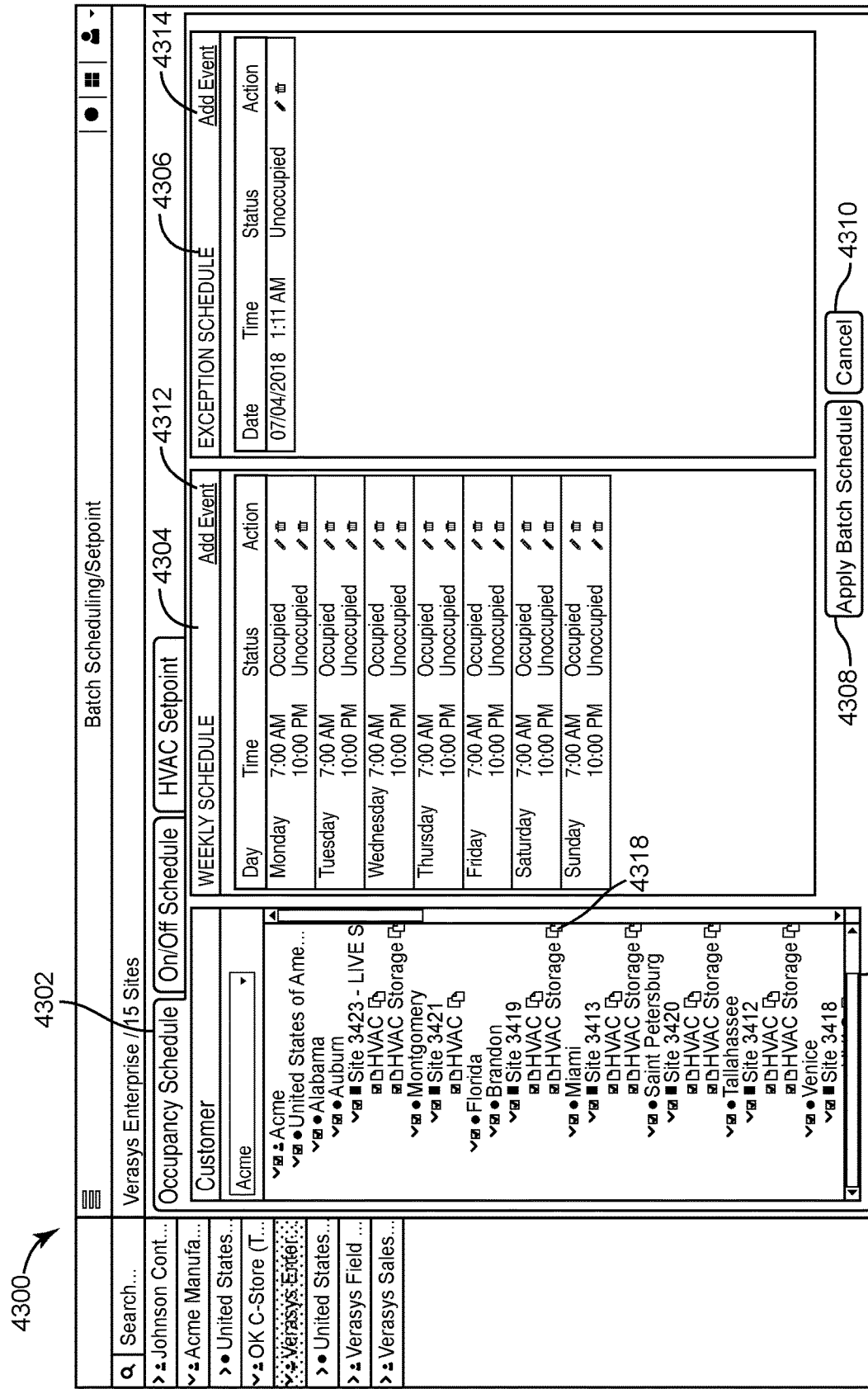
FIG. 43 is an illustration of a user interface to apply schedules to building equipment across multiple building sites, according to some embodiments.

Referring now to FIG. 43, an illustration of a user interface 4300 to apply schedules to building equipment across multiple building sites via an enterprise connection is shown, according to some embodiments. The user interface 4300 is shown to include a schedule selector 4302, a weekly schedule display 4304, an exception schedule display 4306, an apply batch schedules button 4308, a cancel button 4310, an add event button 4312, an add event button 4314, an equipment selector box 4316, and a copy icon 4318.

The schedule selector 4302 includes tabs for "occupancy schedule," "on/off schedule," and "HVAC setpoint." A user can toggle between the different types of schedules by clicking on the different tabs. When a tab is clicked, the equipment selector box 4316 will update with the equipment available for that specific type of schedule. For example, when the "occupancy schedule" tab is selected, equipment such as HVAC equipment (e.g., chillers, boilers, etc.) is shown in the equipment selector box 4316 as equipment that can be controlled by the occupancy schedule. When the "on/off" tab is selected, equipment such as lighting equipment is shown in the equipment selector box 4316 as equipment that can be controlled by the on/off schedule.

The weekly schedule display 4304 shows the regular, weekly schedule that is available for implementation across the equipment in the equipment selector box 4316. For example, the weekly schedule available when the "occupancy schedule" tab is selected on the schedule selector 4302 can include the times when the building is occupied and unoccupied during the week.

The exception schedule display 4306 shows the exception schedule(s) available for implementation across the equipment in the equipment selector box 4316. For example, the exception schedule available when the "occupancy schedule" tab is selected on the schedule selector 4302) can include the date(s) and time(s) when the regular, weekly schedule should not be followed (e.g., for holidays like national holidays, religious holidays, etc.).

The add event button 4312 can be used when a user desires to add more events to the weekly schedule display 4304. For example, a building may have recently changed from a single shift to a double shift operation. As a result, additional status times may be required for the regular schedule. To add those additional status times, a user would click on the add event button 4312 and enter the required information to update the weekly schedule display 4304.

The add event button 4314 can be used when a user desires to add more events to the exception schedule display 4306. For example, the government may have recently recognized a new national holiday and the holiday must be included in the exception schedule. To add the additional exception schedule for the new holiday, a user would click on the add event button 4314 and enter the required information to update the exception schedule display 4306.

The equipment selector box 4316 includes a list of all the equipment at various building sites that can be controlled by the weekly schedule shown in the weekly schedule display 4304 and by the exception schedule shown in the exception schedule display 4306. The equipment selector box 4316 includes a hierarchical list of building locations (e.g., country, state, territory, etc.), building sites, and building equipment. Each item includes a box next to it, and a user can click on the box to either check or uncheck the box. A checked box indicates that the user intends for the checked item to follow the weekly schedule and the exception schedule displayed in the weekly schedule display 4304 and the exception schedule display 4306.

Checking a box at a higher hierarchical level may automatically check the boxes at a lower hierarchical level. For example, checking the box next to "Brandon" may automatically check the boxes next to "Site 3419," "HVAC," and "HVAC Storage." Therefore, if a user intends to select a large number of sites in which to implement the schedules, the user does not need to click every piece of equipment to be controlled by the schedules.

After the user has checked and unchecked the desired boxes, the user can click on the apply batch schedules button 4308 to push the schedules to all of the selected equipment at the same time. The selected equipment will then be controlled by the weekly schedule and the exception schedule. If the user determines that the schedule changes are not desired, the user can click on the cancel button 4310 to cancel the changes made before implementing the batch schedules.

The copy icon 4318 can be used when a user desires to copy a schedule configuration (e.g., weekly and exception events, occupied and unoccupied schedules, setpoints, etc.) from one piece of equipment and apply the schedule to other equipment. For example, a user may desire to copy the "HVAC Storage" schedule from the "Brandon" site and apply the schedule to other sites. To do so, the user selects the copy icon 4318 and selects the sites to which the schedule should be applied. In some embodiments, the schedule can be applied to various equipment across the enterprise system. In some embodiments, the user can make modifications to the schedule before applying the schedule to other equipment. For example, the user may desire to use all but a portion of the schedule (e.g., all parts of the schedule except for the unoccupied time), so the user can execute the copy function by selecting the copy icon 4318 to avoid recreating the entire schedule to achieve the desired results.

Batch Scheduling—On/Off Schedule

Figure 44:
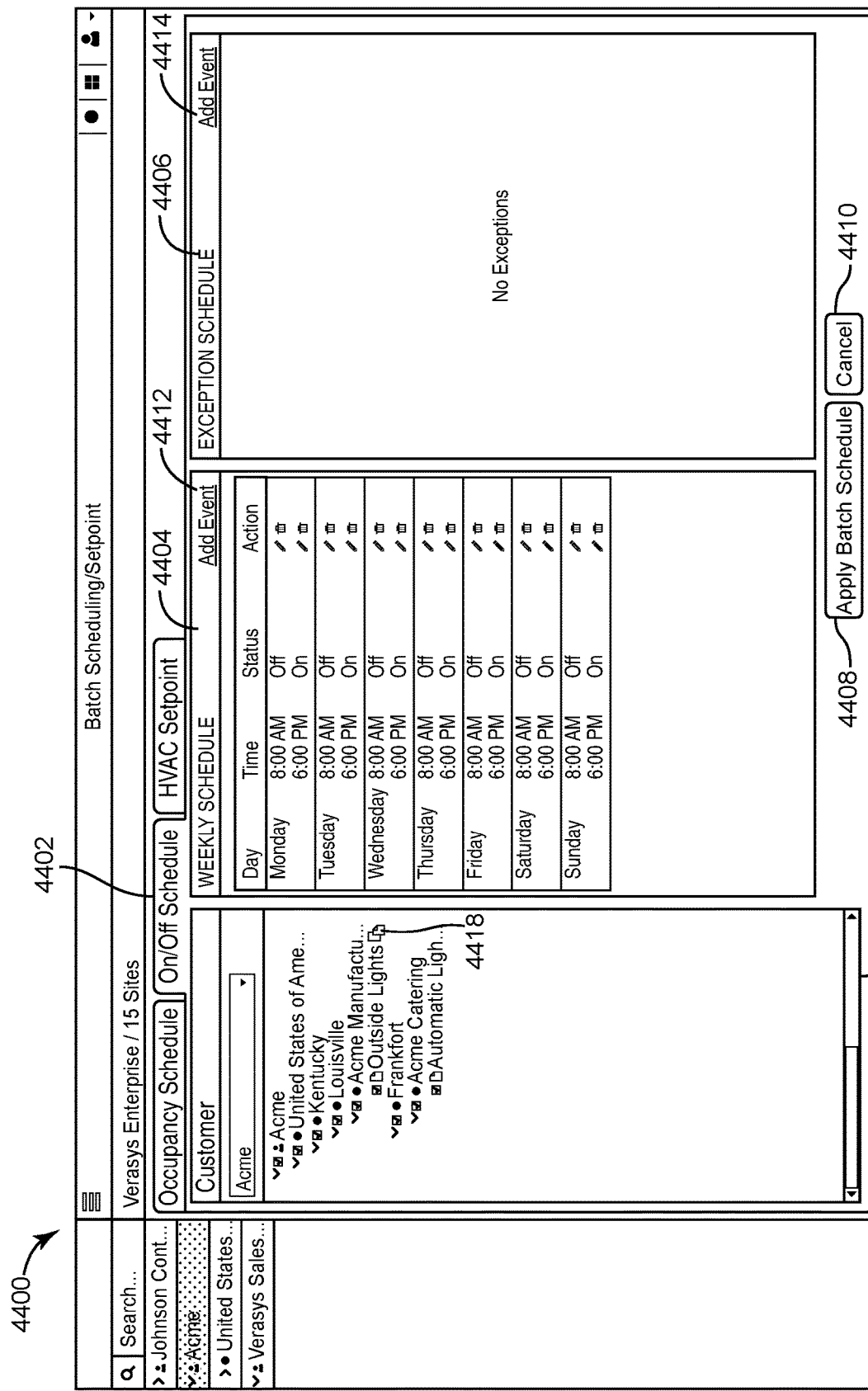
FIG. 44 is an illustration of a user interface to apply schedules to lighting equipment across multiple building sites, according to some embodiments.

Referring now to FIG. 44, an illustration of a user interface 4400 to apply schedules to lighting equipment across multiple building sites via an enterprise connection is shown, according to some embodiments. The user interface 4400 is shown to include a schedule selector 4402, a weekly schedule display 4404, an exception schedule display 4406, an apply batch schedules button 4408, a cancel button 4410, an add event button 4412, an add event button 4414, an equipment selector box 4416, and a copy icon 4418.

The schedule selector 4402 includes tabs for "occupancy schedule," "on/off schedule," and "HVAC setpoint." A user can toggle between the different types of schedules by clicking on the different tabs. When a tab is clicked, the equipment selector box 4416 will update with the equipment available for that specific type of schedule. For example, when the "occupancy schedule" tab is selected, equipment such as HVAC equipment (e.g., chillers, boilers, etc.) is shown in the equipment selector box 4416 as equipment that can be controlled by the occupancy schedule. When the "on/off" tab is selected, equipment such as lighting equipment is shown in the equipment selector box 4416 as equipment that can be controlled by the on/off schedule.

The weekly schedule display 4404 shows the regular, weekly schedule that is available for implementation across the equipment in the equipment selector box 4416. For example, the weekly schedule available when the "on/off" tab is selected on the schedule selector 4402 can include the times when the lighting is on and off during the week.

The exception schedule display 4406 shows the exception schedule(s) available for implementation across the equipment in the equipment selector box 4416. For example, the exception schedule available when the "on/off" tab is selected on the schedule selector 4402 can include the date(s) and time(s) when the regular, weekly on/off schedule should not be followed (e.g., for holidays like national holidays, religious holidays, etc.).

The add event button 4412 can be used when a user desires to add more events to the weekly schedule display 4404. For example, a building may have recently changed from a single shift to a double shift operation. As a result, additional status times may be required for the regular schedule. To add those additional status times, a user would click on the add event button 4412 and enter the required information to update the weekly schedule display 4404.

The add event button 4414 can be used when a user desires to add more events to the exception schedule display 4406. For example, the government may have recently recognized a new national holiday and the holiday must be included in the exception schedule. To add the additional exception schedule for the new holiday, a user would click on the add event button 4414 and enter the required information to update the exception schedule display 4406.

The equipment selector box 4416 includes a list of all the equipment at various building sites that can be controlled by the weekly schedule shown in the weekly schedule display 4404 and the exception schedule controlled by the exception schedule shown in the exception schedule display 4406. The equipment selector box 4416 includes a hierarchical list of building locations (e.g., country, state, territory, etc.), building sites, and building equipment. Each item includes a box next to it, and a user can click on the box to either check or uncheck the box. A checked box indicates that the user intends for the checked item to follow the weekly schedule and the exception schedule displayed in the weekly schedule display 4404 and the exception schedule display 4306.

Checking a box at a higher hierarchical level may automatically check the boxes at a lower hierarchical level. For example, checking the box next to "Louisville" may automatically check the boxes underneath it, including the box for "Outside Lights." Therefore, if a user intends to select a large number of sites in which to implement the schedules, the user does not need to click every piece of equipment to be controlled by the schedules.

After the user has checked and unchecked the desired boxes, the user can click on the apply batch schedules button 4408 to push the schedules to all of the selected equipment at the same time. The selected equipment will then be controlled by the weekly schedule and the exception schedule. If the user determines that the schedule changes are not desired, the user can click on the cancel button 4410 to cancel the changes made before implementing the batch schedules.

The copy icon 4418 can be used when a user desires to copy a schedule configuration (e.g., weekly and exception events, occupied and unoccupied schedules, setpoints, etc.) from one piece of equipment and apply the schedule to other equipment. For example, a user may desire to copy the "Outside Lights" schedule from the "Louisville" site and apply the schedule to other sites. To do so, the user selects the copy icon 4318 and selects the sites to which the schedule should be applied. In some embodiments, the schedule can be applied to various equipment across the enterprise system. In some embodiments, the user can make modifications to the schedule before applying the schedule to other equipment. For example, the user may desire to use all but a portion of the schedule (e.g., all parts of the schedule except for the unoccupied time), so the user can execute the copy function by selecting the copy icon 4318 to avoid recreating the entire schedule to achieve the desired results.

Add Exception Schedule—Batch Scheduling

Figure 45:
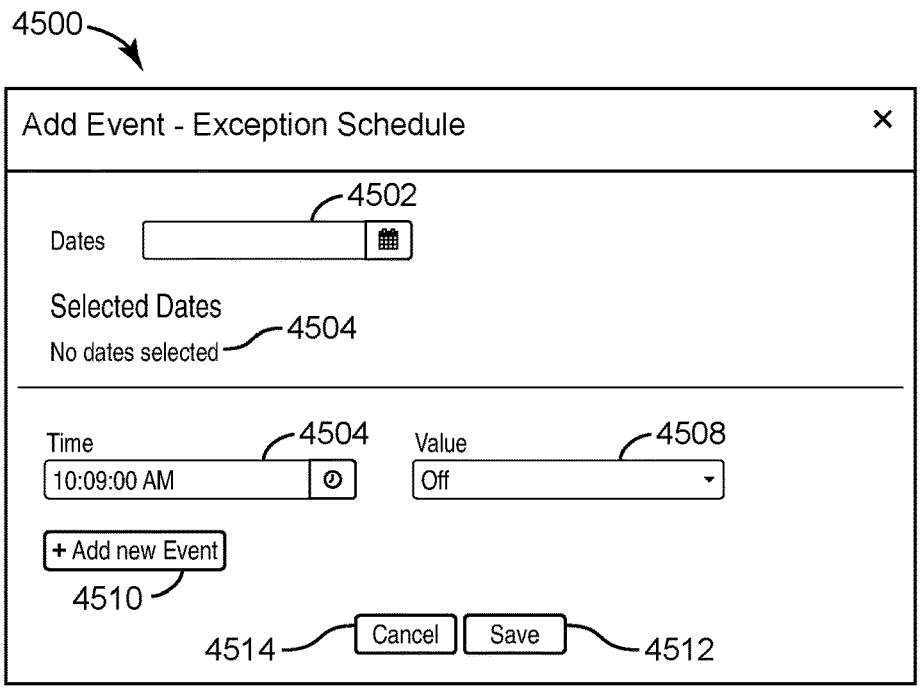
FIG. 45 is an illustration of a user interface to add a schedule exception, according to some embodiments.

Referring now to FIG. 45, an illustration of a user interface 4500 to add a schedule exception via an enterprise connection is shown, according to some embodiments. The user interface 4500 is shown to include a date entry box 4502, a selected dates list 4504, a time entry box 4506, a status selector 4508, an add new event button 4510, a save button 4512, and a cancel button 4514.

If a user desires to add an exception to the exception schedule display 4406, the user would click on the add event button 4414 and be directed to the user interface 4500 to enter the desired information. The user can enter the date(s) for the exception in the date entry box 4502. In some embodiments, the user can enter a single date for the exception. In some embodiments, the user can enter multiple dates in the date entry box 4502, separating the dates with an accepted separator (e.g., a comma, semicolon, etc.). The exception dates may also be entered into the date entry box 4502 via a calendar entry method similar to the method described with reference to FIG. 31. After entering the date(s) in the date entry box 4502, the dates entered in the date entry box 4502 will be listed in the selected dates list 4504.

The user can then enter the time at which the exception schedule should begin in the time entry box 4506. In some embodiments, the time is entered into the time entry box 4506 using a twelve-hour time convention. In some embodiments, the time is entered into the time entry box 4506 using a twenty-four-hour time convention. The user then uses the status selector 4508 to select the status (e.g., ON, OFF, occupied, unoccupied, etc.) of the exception.

If the user desires to add multiple exceptions on the same selected dates, the user can click on the add new event button 4510 to add additional rows of the time entry box 4506 and status selector 4508. For example, the user may desire to set the status to ON at 9:00 AM and the user may also desire to set the status to ON at 12:00 PM. By clicking on the add new event button 4510, the user can enter both exceptions on the same page.

After the user has entered the desired information for the exception schedule, the user can save the exception schedule by clicking on the save button 4512. However, if the user determines that mistakes have been made when entering the exception schedule or if the exception schedule is no longer desired, the user can cancel the addition by clicking on the cancel button 4514.

Overwriting an Existing Schedule

Figure 46:
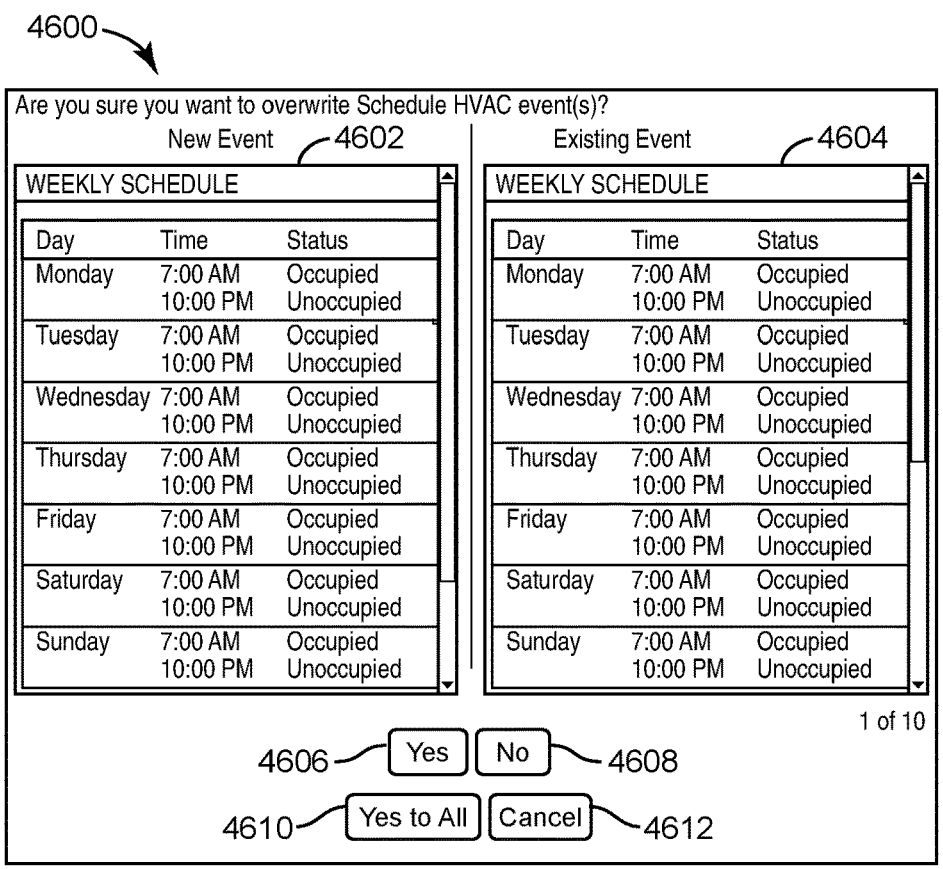
FIG. 46 is an illustration of a user interface to overwrite an existing schedule with a new schedule, according to some embodiments.

Referring now to FIG. 46, an illustration of a user interface 4600 to overwrite an existing schedule with a new schedule via an enterprise connection is shown, according to some embodiments. The user interface 4600 is shown to include a new event list 4602, an existing event list 4604, a yes button 4606, a no button 4608, a yes to all button 4610, and a cancel button 4612.

If a user desires to add a schedule event to the weekly schedule display 4304, the user would click on the add event button 4312 and be redirected to a page on which the user would enter the desired information regarding the schedule event. In some embodiments, the new schedule event may conflict with a current schedule event. In that case, when the user attempted to save the new schedule event, the user would be redirected to the user interface 4600.

The new event list 4602 displays the proposed new weekly schedule that includes the desired new schedule event. The new event list 4602 displays the days of the week, the times at which the status changes, and the status at those times. The existing event list 4604 displays the existing weekly schedule that does not include the desired new schedule event. The existing event list 4604 displays the days of the week, the times at which the status changes, and the status at those times. The new event list 4602 and the existing event list 4604 are displayed side by side in order to allow the user to view potential conflicts. The user can scroll down both the new event list 4602 and the existing event list 4604 to compare the lists to each other.

If the user desires to accept a new event, the user can click on the yes button 4606. Clicking on the yes button 4606 will accept a single event on the new event list 4602. The user can continue to click the yes button 4606 for each event. If the user chooses not to accept a new schedule event, the user can click the no button 4608 to reject the new schedule event. If the user desires to accept all the events in the new event list 4602, the user can click on the yes to all button 4610 to accept all the events and avoid clicking the yes button 4606 for each event individually. If the user desires to cancel the new event addition process, the user can click on the cancel button 4612.

Enterprise System for Setpoint Control and Synchronization Across Sites

Figure 47:
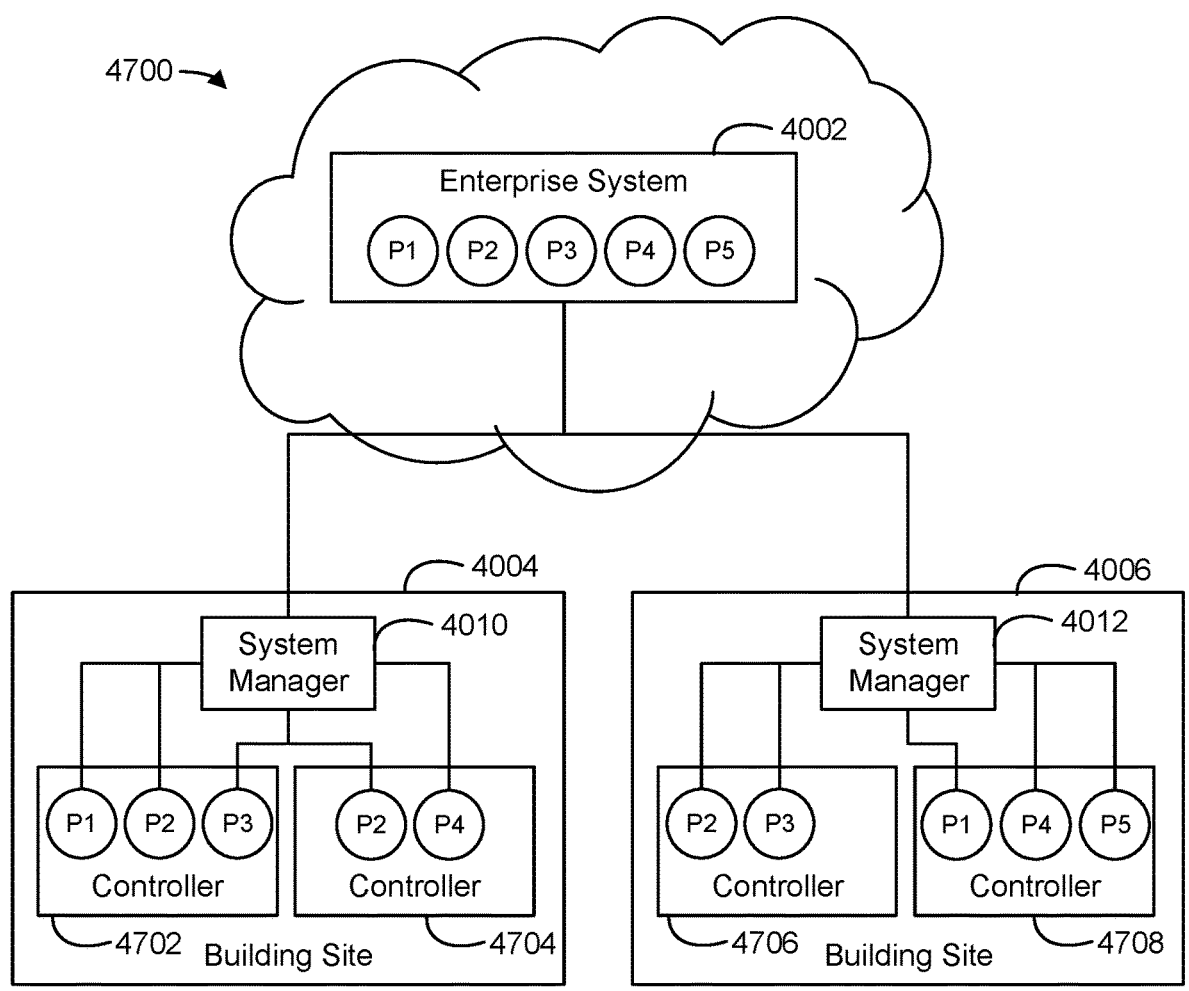
FIG. 47 is a block diagram of the enterprise system of FIG. 40 in communication with system managers across multiple building sites, according to some embodiments.

Referring now to FIG. 47, a block diagram 4700 of the enterprise system 4002 of FIG. 40 in communication with system managers across multiple building sites is shown, according to some embodiments.

The system manager 4010 is shown to be in communication with a controller 4702 and a controller 4704. The system manager 4012 is shown to be in communication with a controller 4706 and a controller 4708. The controllers 4702-4708 can be any type of device or system configured to store and implement setpoints across equipment within a building site. For example, the controller 4702 includes the setpoints P1, P2, and P3, and the controller 4708 includes the setpoints P1, P4, and P5. The setpoints P1-P5 can be any type of setpoints (e.g., temperature, etc.) that can be implemented in a piece of building equipment.

The controller 4702 provides the setpoints P1, P2, and P3 to the system manager 4010. The controller 4704 provides the setpoints P2 and P4 to the system manager 4010. The controller 4706 provides the setpoints P2 and P3 to the system manager 4012. The controller 4708 provides the setpoints P1, P4, and P5 to the system manager 4012. The system managers 4010 and 4012 then provide the available setpoints to the enterprise system 4002 such that the enterprise system 4002 includes all the setpoints P1-P5. The enterprise system 4002 can then provide templates to other system managers and controllers within the system.

Figure 48:
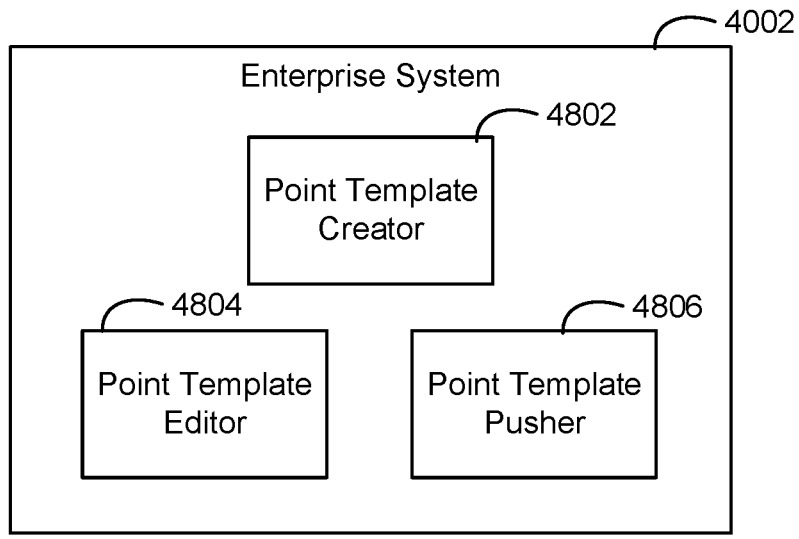
FIG. 48 is a block diagram of the enterprise system of FIG. 47, according to some embodiments.

Referring now to FIG. 48, a block diagram of the enterprise system 4002 of FIG. 47 is shown, according to some embodiments. The enterprise system 4002 is shown to include a point template creator 4802, a point template editor 4804, and a point template pusher 4806.

In some embodiments, the point template creator 4802 receives inputs from various building sites in communication with the enterprise system 4002. These inputs may include the addition of new or updated points for various building equipment at the various building sites. The point template creator 4802 receives the new points and creates or updates the points as templates that can be used across other building sites, not just the building site from which the point was created or updated.

In some embodiments, the point template creator 4802 receives inputs from an enterprise client device similar to the enterprise client device 316. These inputs may include the addition of new or updated points that can be used across all the building sites associated with the enterprise system 4002

The point template editor 4804 can edit the point templates created by the point template creator 4802. In some embodiments, the point templates can be edited by an enterprise client device similar to the enterprise client device 316. In some embodiments, the point templates can be edited by a user at a building site using methods similar to those described with reference to FIGS. 20-39.

The point template pusher 4806 can push the point templates to the system managers across different building sites. In some embodiments, the point template pusher 4806 automatically pushes template schedules to the system managers. For example, a new chiller may have been installed at one building site, and the new chiller is the same model as the current chiller at a different building site. The point template pusher 4806 may automatically send the current chiller point templates to the system manager for the new chiller so the new chiller uses the same points as the current chiller. In some embodiments, the point template pusher 4806 pushes point templates to the system managers after a request from the system managers. For example, after the new chiller is installed, the system manager at that building site may request the appropriate point templates from the enterprise system 4002. The point template pusher 4806 would then push the appropriate point templates to the system manager for the new chiller.

Figure 49:
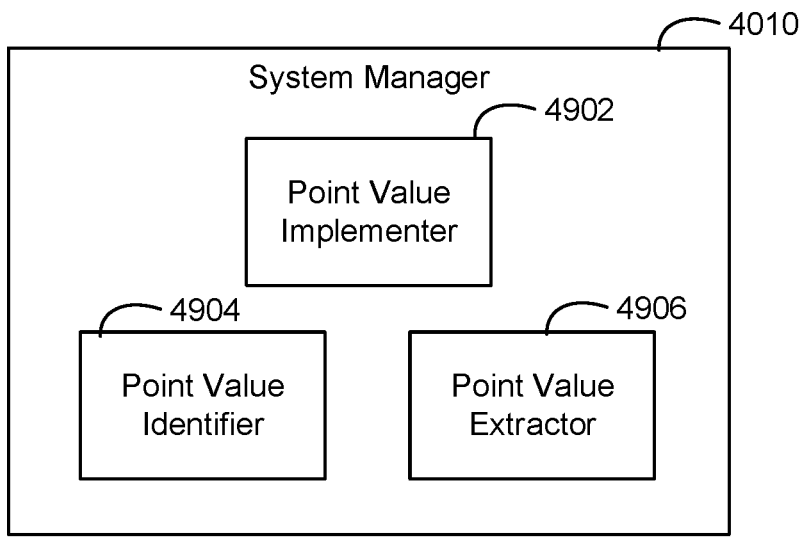
FIG. 49 is a block diagram of the system manager of FIG. 47, according to some embodiments.

Referring now to FIG. 49, a block diagram of the system manager 4010 of FIG. 47 is shown, according to some embodiments. The system manager 4010 is shown to include a point value implementer 4902, a point value identifier 4904, and a point value extractor 4906.

The point value extractor 4906 can extract the desired point values from the point templates that are pushed to the system manager 4010 from the point template pusher 4806. For example, the point template for a chiller may include multiple point values which should be provided to the chiller. The point value extractor 4906 in configured to extract those point values from the point template.

The point value identifier 4904 can scan the point values extracted by the point value extractor 4906 and identify the particular points to which the values should be applied. For example, the point value identifier 4904 may identify eight point values associated with a particular point template for a chiller. The point value identifier 4904 would then determine which values should be associated with particular points of the chillers associated with the system manager 4010.

The point value implementer 4902 can implement the point value changes to the desired building equipment via the system manager 4010. For example, the point value identifier 4904 may determine that three of the eight point values should be associated with the chillers associated with the system manager 4010. The point value implementer 4902 would then implement those points to the desired chillers such that the chillers utilize those points.

Creating and Applying Point Templates to Building Sites

Figure 50:
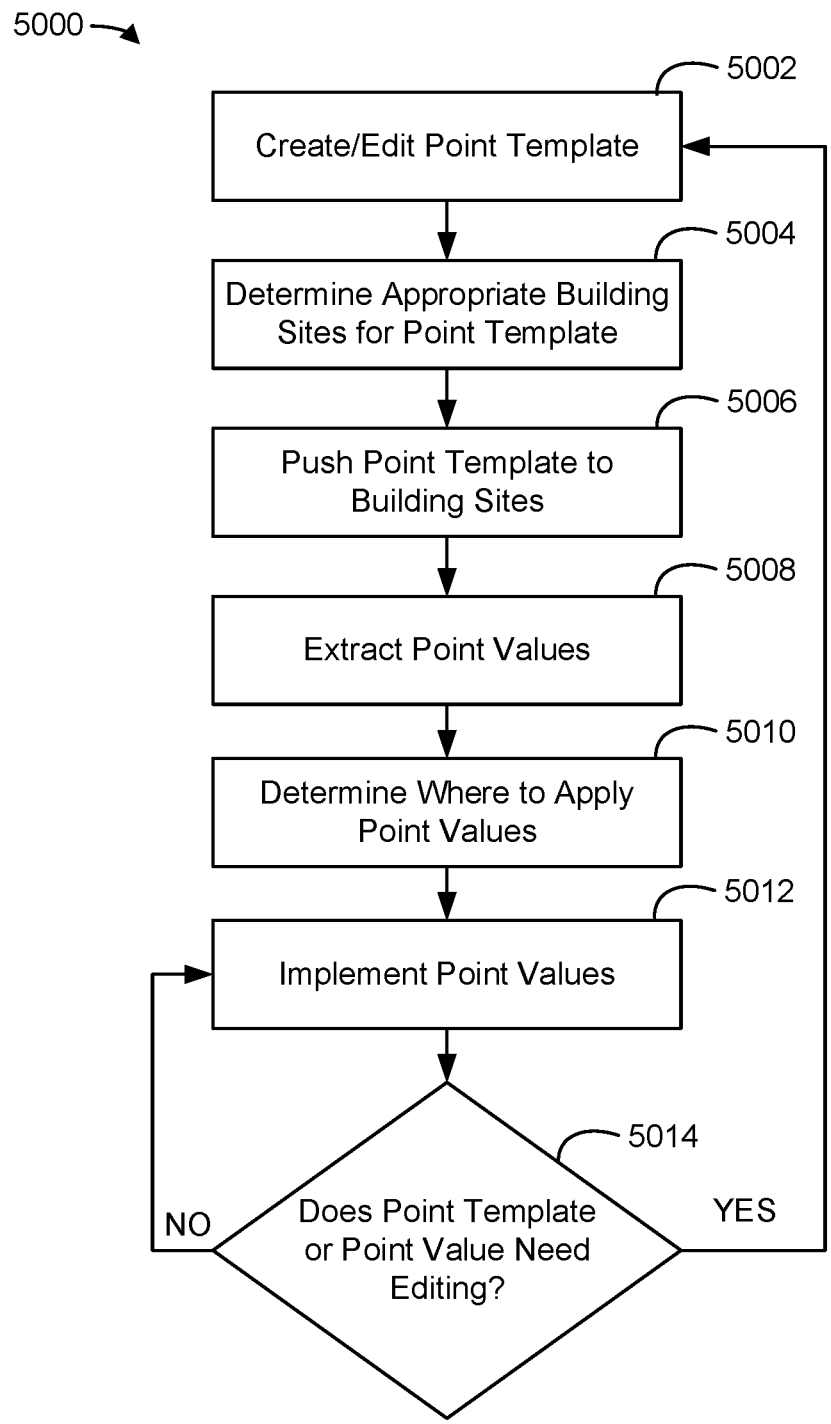
FIG. 50 is a flow diagram illustrating a technique to create point templates and apply point templates to building sites, according to some embodiments.

Referring now to FIG. 50, a flow diagram illustrating a process 5000 to create point templates and apply point templates to building sites via an enterprise connection is shown, according to some embodiments. In some embodiments, the process 5000 can be performed by one or more components of the system manager 202, as described with reference to FIGS. 3-7. In some embodiments, the process 5000 is performed by the system manager 202 when a new point template is created or edited. In some embodiments, the process 5000 can be performed by one or more components of the enterprise system 4002, as described with reference to FIGS. 47-48. In some embodiments, the process 5000 is performed by the enterprise system 4002 when a new template schedule is created or edited.

The process 5000 is shown to include creating or editing a point template (step 5002). For example, user may have determined that a new point template is necessary for a new chiller installed at a building site. A point template can be created or edited using any of the methods described with reference to FIGS. 20-39.

The process 5000 is shown to include determining the appropriate building sites for the point template (step 5004). For example, the point template may be associated with chillers, so the point template would not be appropriate for a building site that only includes boilers. The enterprise system 4002 would determine the appropriate building sites for the point template, and the point template pusher 4806 would push the point template to the appropriate building sites (step 5006).

The process 5000 is shown to include extracting point values (step 5008). After receiving the point template, the system manager 4010 of the building site would then use the point value extractor 4906 to extract the point values from the point template. The point value identifier 4904 would then determine where to apply the point values (step 5010). For example, the point value identifier 4904 may determine that point values only apply to chillers, not boilers, so the point values would be applied only to chillers.

The process 5000 is shown to include implementing point values (step 5012). For example, the desired point values must be provided to the desired equipment so the equipment can operate using the desired point values. After the point value identifier 4904 identifies where to apply the point values, the point value implementer 4902 provides the point values to the desired equipment.

The process 5000 is shown to include determining whether the point template or point value need editing (step 5014). For example, long-term weather changes may motivate a user to modify the existing points to account for a warmer or cooler season. If the user determines that no editing is required (NO at step 5014), the point values will continue to be implemented (step 5012). If the user determines that editing is required (YES at step 5014), the process 5000 will begin again with the creation or modification of the point template (step 5002).

Viewing and Applying Batch Setpoints

Figure 51:
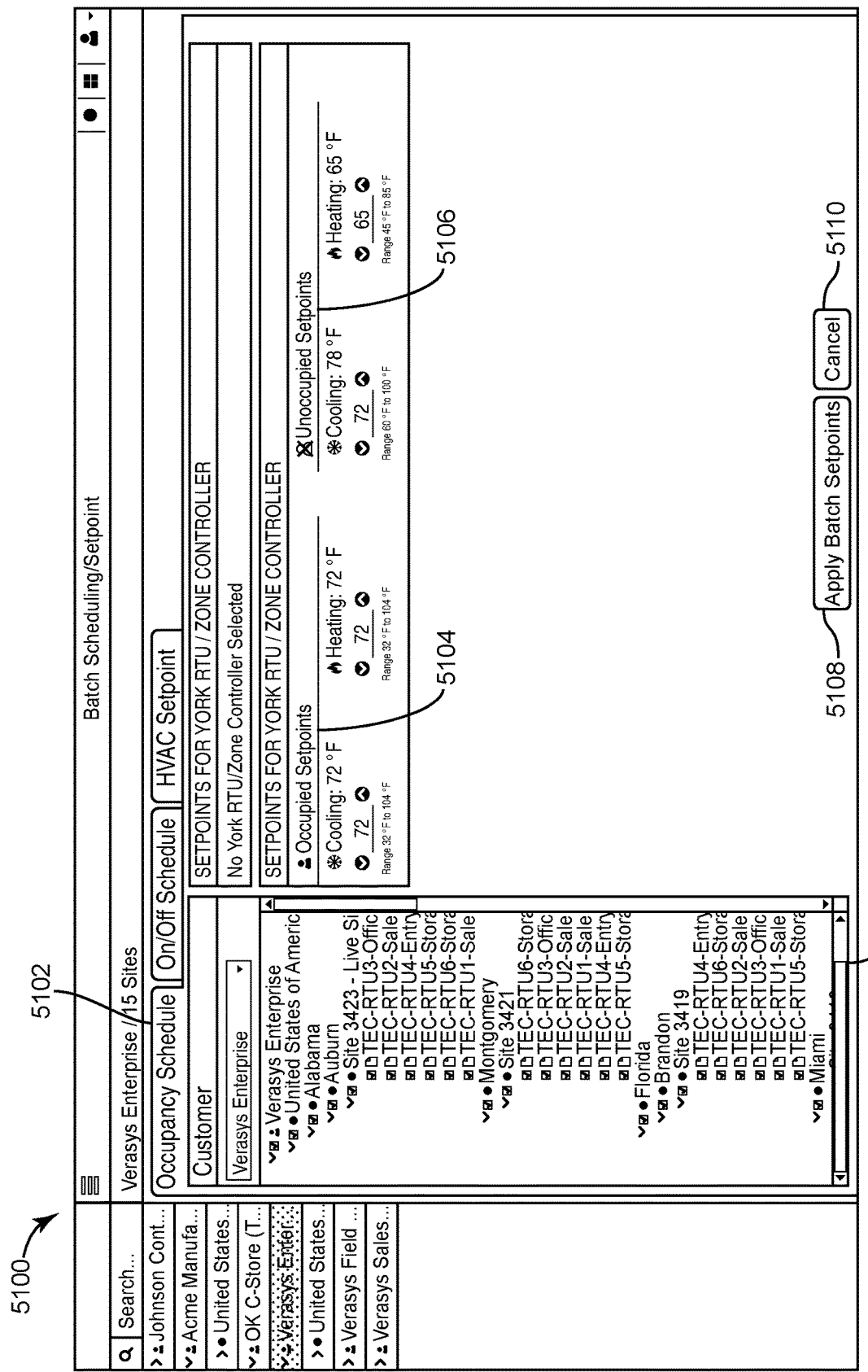
FIG. 51 is an illustration of a user interface to view setpoints of building equipment, according to some embodiments.

Referring now to FIG. 51, an illustration of a user interface 5100 to view setpoints of building equipment via an enterprise connection is shown, according to some embodiments. The user interface 5100 is shown to include a schedule selector 5102, an occupied setpoint list 5104, an unoccupied setpoint list 5106, an apply batch setpoints button 5018, a cancel button 5110, and an equipment selector box 5112.

The schedule selector 5102 includes tabs for "occupancy schedule," "on/off schedule," and "HVAC setpoint." A user can toggle between the different types of schedules by clicking on the different tabs. When a tab is clicked, the equipment selector box 5112 will update with the equipment available for that specific type of schedule. For example, when the "HVAC Setpoint" tab is selected, equipment such as HVAC equipment (e.g., thermostats, etc.) is shown in the equipment selector box 5112 as equipment that can be controlled by the HVAC setpoint schedule. When the "on/off" tab is selected, equipment such as lighting equipment is shown in the equipment selector box 5112 as equipment that can be controlled by the on/off schedule.

The occupied setpoints list 5104 shows the setpoints when the building is in an occupied state. The unoccupied setpoints list 5106 shows the setpoints when the building is in an unoccupied state. The setpoints can include any discrete points for equipment connected to the system (e.g., temperature, flowrate, motor speed, etc.). The setpoints can be modified by clicking on the arrows next to the setpoint value. Clicking on an "up" arrow will increment the setpoint upwards, and clicking on the "down" arrow will increment the setpoint downwards.

The equipment selector box 5112 includes a list of all the equipment at various building sites that can be controlled by the HVAC setpoints shown in the occupied setpoints list 5104 and the unoccupied setpoints list 5106. The equipment selector box 5112 includes a hierarchical list of building locations (e.g., country, state, territory, etc.), building sites, and building equipment. Each item includes a box next to it, and a user can click on the box to either check or uncheck the box. A checked box indicates that the user intends for the checked item to follow the occupied and unoccupied schedules displayed in the occupied setpoints list 5104 and the unoccupied setpoints list 5106.

Checking a box at a higher hierarchical level may automatically check the boxes at a lower hierarchical level. For example, checking the box next to "Site 3423" may automatically check the boxes next to "TEC-RTU1," "TEC-RTU2," "TEC-RTU3," "TEC-RTU4," "TEC-RTU5," and "TEC-RTU6." Therefore, if a user intends to select a large number of sites (e.g., all the selected sites and building equipment) to which the updated setpoint values will be pushed, the user can do so in a single operation.

After the user has checked and unchecked the desired boxes, the user can click on the apply batch setpoints button 5108 to push the setpoints to all of the selected equipment at the same time. The selected equipment will then be controlled by the occupied schedule and the unoccupied schedule. If the user determines that the setpoint changes are not desired, the user can click on the cancel button 5110 to cancel the changes made before implementing the batch setpoints. If the user has modified any setpoints, the user will be directed to another user interface to confirm the changes made. This user interface will further described with reference to FIG. 52.

Modifying Batch Setpoints

Figure 52:
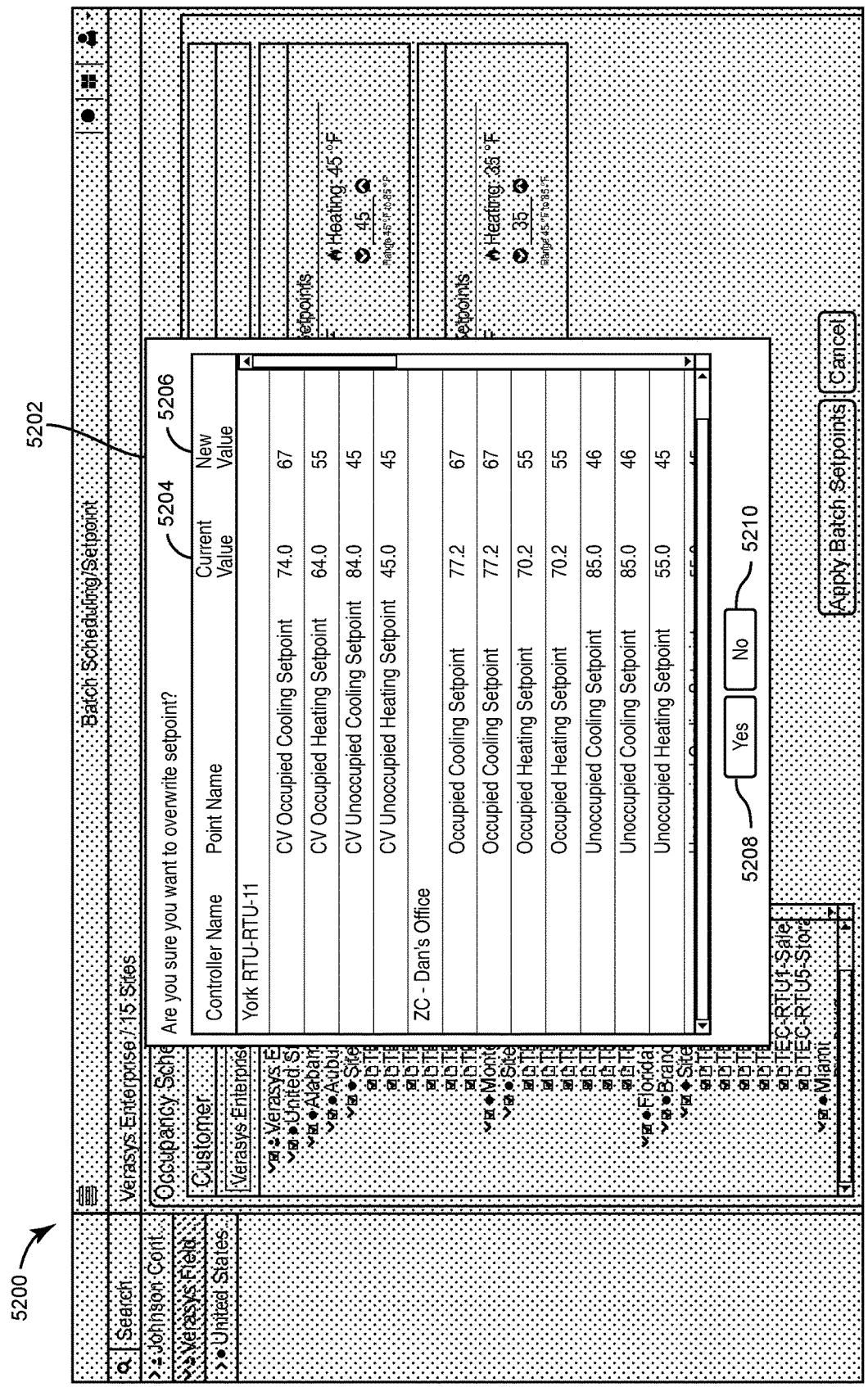
FIG. 52 is an illustration of a user interface to modify setpoints of building equipment, according to some embodiments.

Referring now to FIG. 52, an illustration of a user interface 5200 to modify setpoints of building equipment is shown, according to some embodiments. The user interface 5200 is shown to include a popup box 5202, a current setpoint list 5204, a new setpoint list 5206, a yes button 5208, and a no button 5210.

After a user modifies the setpoint values using the arrows as described with reference to FIG. 51, the user may attempt to save the changes by clicking the apply batch setpoints button 5108. When the user clicks the apply batch setpoints button 5108, the popup box 5202 will appear and prompt the user to confirm the changes before the changes are implemented.

The current setpoint list 5204 shows the current setpoint values for all the equipment for which the user changed a setpoint. The new setpoint list 5206 shows the changed setpoint values caused by the user. The user can then compare the new setpoint list 5206 to the current setpoint list 5204 to determine if the changes should be implemented.

If the user determines that the changes should be implemented, the user would click the yes button 5208 to accept all the changes and implement the new setpoints. If the user determines that the changes should not be implemented (e.g., a mistake was made when making modifications), then the user would click the no button 5210 to reject all the changes and return to the user interface 5100. The user could then make corrections on the desired changes before returning to the user interface 5200, or the user could abandon the changes altogether.

Equipment Malfunction Information Security

In some instances, a device or piece of building equipment may malfunction or fail. Many devices and pieces of equipment are capable of logging information relevant to the operation of the devices and pieces of equipment (e.g., temperature, vibration, motor speed, internal states, software and algorithmic traces, etc.). This information is important in order to diagnose, correct, and fix problems. This information may also be confidential and should not be available to unauthorized personnel.

Equipment Malfunction Security System

Figure 53:
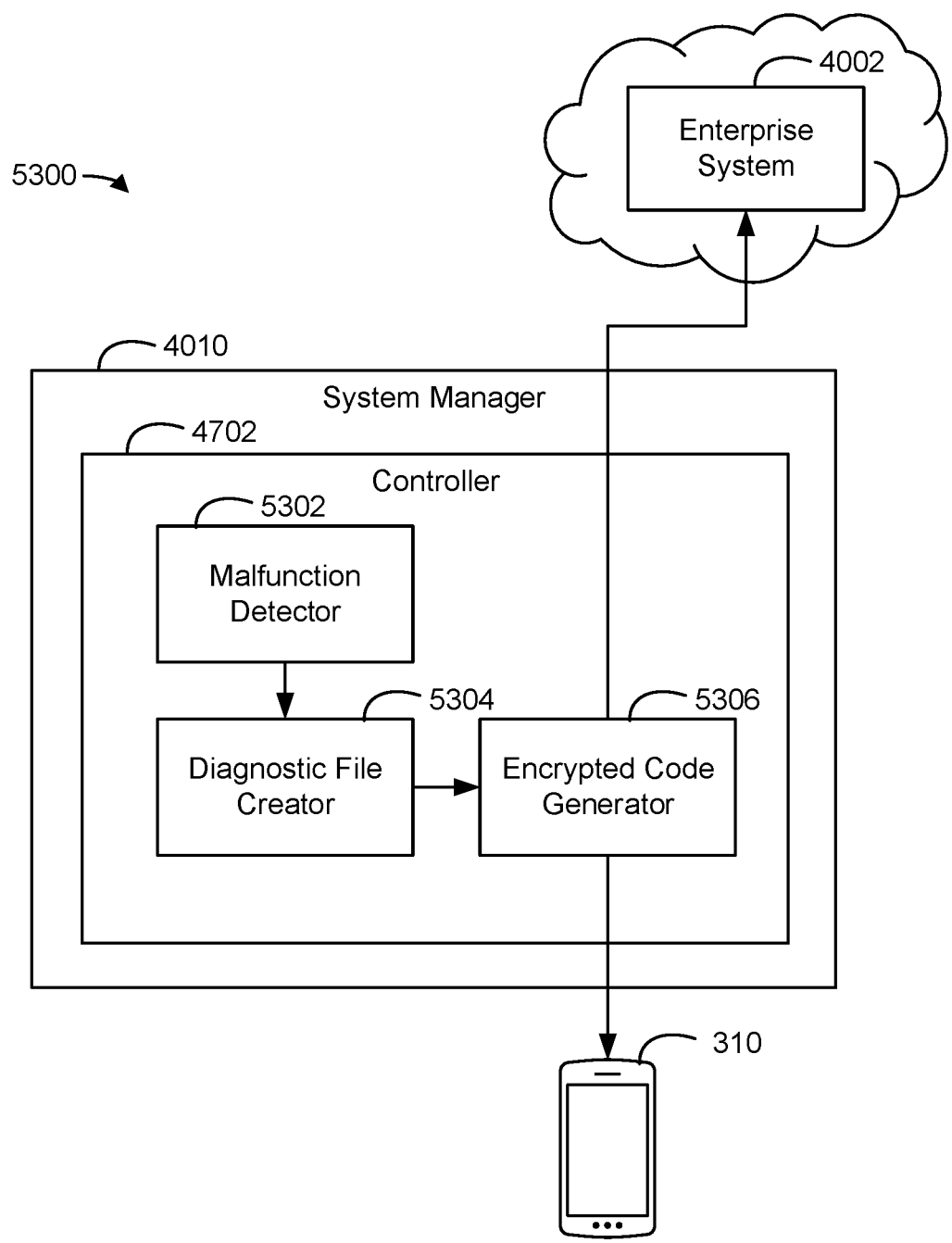
FIG. 53 is a block diagram of the system manager of FIG. 40 in communication with the enterprise system of FIG. 40 and a client device, according to some embodiments.

Referring now to FIG. 53, a block diagram of the system manager 4010 of FIG. 40 in communication with the enterprise system 4002 of FIG. 40 and a client device 310 is shown, according to some embodiments. The controller 4702 is shown to include a malfunction detector 5302, a diagnostic file creator 5304, and an encrypted code generator 5306.

The malfunction detector 5302 is in communication with the diagnostic file creator 5304 and can be any device or system that detects a malfunction in a device or building equipment. For example, the malfunction detector 5302 can be a temperature sensor, a vibration sensor, an accelerometer, or any other type of sensing equipment that may be able to determine when a malfunction is imminent.

The diagnostic file creator 5304 is in communication with the malfunction detector 5302 and the encrypted code generator 5306. The diagnostic file creator 5304 receives a notification from the malfunction detector 5302 that the device or equipment is malfunctioning, and the diagnostic file creator 5304 then creates a file that includes the relevant device or equipment operating information during the time prior to, and including, the malfunction. The diagnostic file creator 5304 then sends the diagnostic file to the encrypted code generator 5306.

The encrypted code generator 5306 is in communication with the diagnostic file creator 5304, the enterprise system 4002, and the client device 310. The encrypted code generator 5306 can be any device or system configured to encrypt data and provide a decryption key to the appropriate personnel. The encrypted code generator 5306 receives the diagnostic file from the diagnostic file creator 5304 and creates a unique encrypted code to protect the data within the diagnostic file. The encrypted code generator 5306 then creates a unique encrypted code to send to an authorized user to provide access to the diagnostic file. The authorized user may be accessible via the client device 310, the enterprise system 4002, or both.

After receiving the encrypted code from the encrypted code generator 5306, the authorized user can use the encrypted code to access diagnostic file and proceed to analyze the data to determine the cause of the equipment malfunction. In some embodiments, the user can access the diagnostic file using the encrypted code and other encrypted information (e.g., a unique password, a user identification, etc.).

Equipment Malfunction Security Process

Figure 54:
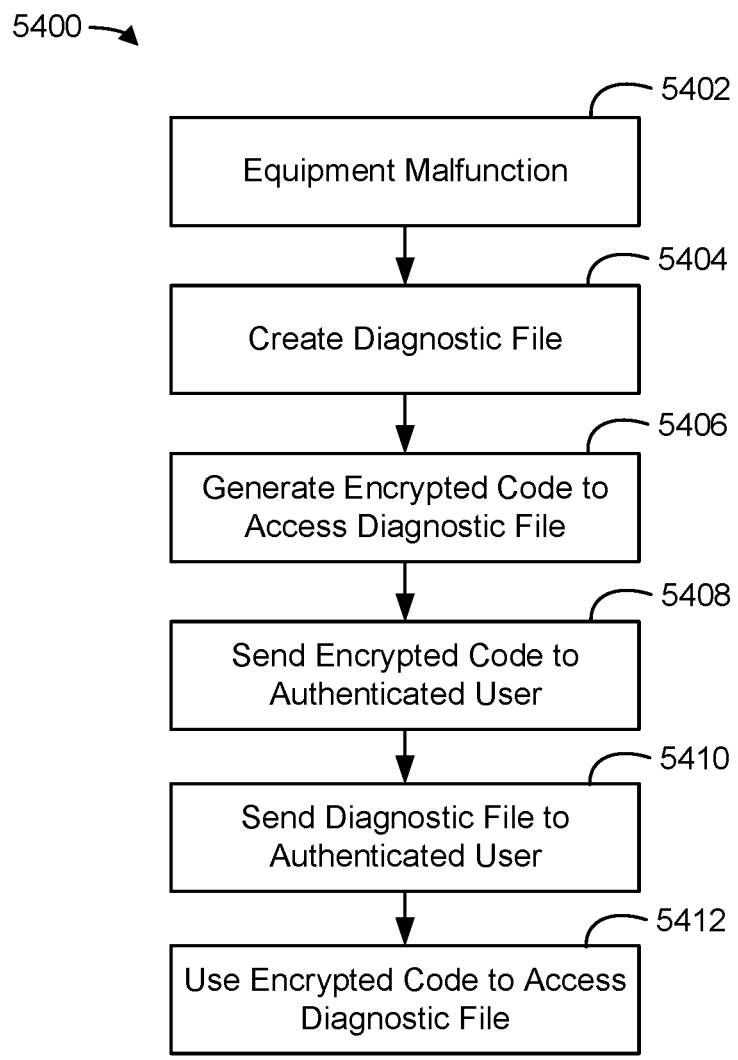
FIG. 54 is a flow diagram illustrating a technique to use encrypted communication to provide access to equipment diagnostic files, according to some embodiments.

Referring now to FIG. 54, a flow diagram illustrating a process 5400 to use encrypted communication to provide access to equipment diagnostic files is shown, according to some embodiments. In some embodiments, the process 5400 can be performed by one or more components of the system manager 4010, as described with reference to FIG. 53. In some embodiments, the process 5400 is performed by the system manager 4010 when a device or piece of equipment malfunctions.

The process 5400 is shown to include an equipment malfunction (step 5402). For example, a chiller may be operating under normal conditions until the internal temperature begins to rise above the normal conditions. In addition, the chiller may be vibrating more than it would under normal operating conditions. Internal temperature and vibration sensors can sense these differences and alert the malfunction detector 5302 that a malfunction of the chiller is imminent.

The process 5400 is shown to include creating a diagnostic file (step 5404). For example, when the malfunction detector 5302 receives notification from the sensors that a malfunction of the chiller is imminent, the malfunction detector 5302 notifies the diagnostic file creator 5304 that a diagnostic file must be created for the chiller. The diagnostic file creator 5304 then creates a diagnostic file that includes the relevant operating information for the chiller such that the information can be analyzed and the chiller can be repaired.

The process 5400 is shown to include generating an encrypted code to access the diagnostic file (step 5406). For example, when the diagnostic file creator 5304 creates the diagnostic file, it notifies the encrypted code generator 5306 that an encrypted code must be generated to provide access to the diagnostic file. The encrypted code generator 5306 then creates an encrypted code to be sent to an authenticated user.

The process 5400 is shown to include sending an encrypted code to an authenticated user (step 5408). For example, authenticated users may be accessible via the enterprise system 4002 and through the client device 310. The encrypted code generator 5306 would therefore send the encrypted code to the authenticated users via the enterprise system 4002 and the client device 310.

The process 5400 is shown to include sending the diagnostic file to an authenticated user (step 5410). For example, after sending the encrypted code to the authenticated user, the encrypted code generator 5306 also sends the diagnostic file to the authenticated user. The diagnostic file can only be opened by using the encrypted code, so the information within the diagnostic file is protected from those who do not have authorized access.

The process 5400 is shown to include using the encrypted code to access the diagnostic file (step 5412). For example, after receiving the encrypted code and the diagnostic file, a user attempts to access the diagnostic file via the enterprise system 4002 by using the encrypted code, thus proving that the user is an authenticated user. After receiving the correct encrypted code, the diagnostic file can be opened by the authenticated user to analyze the data in attempts to repair the malfunctioning equipment.

Equipment Diagnostics File

Figure 55:
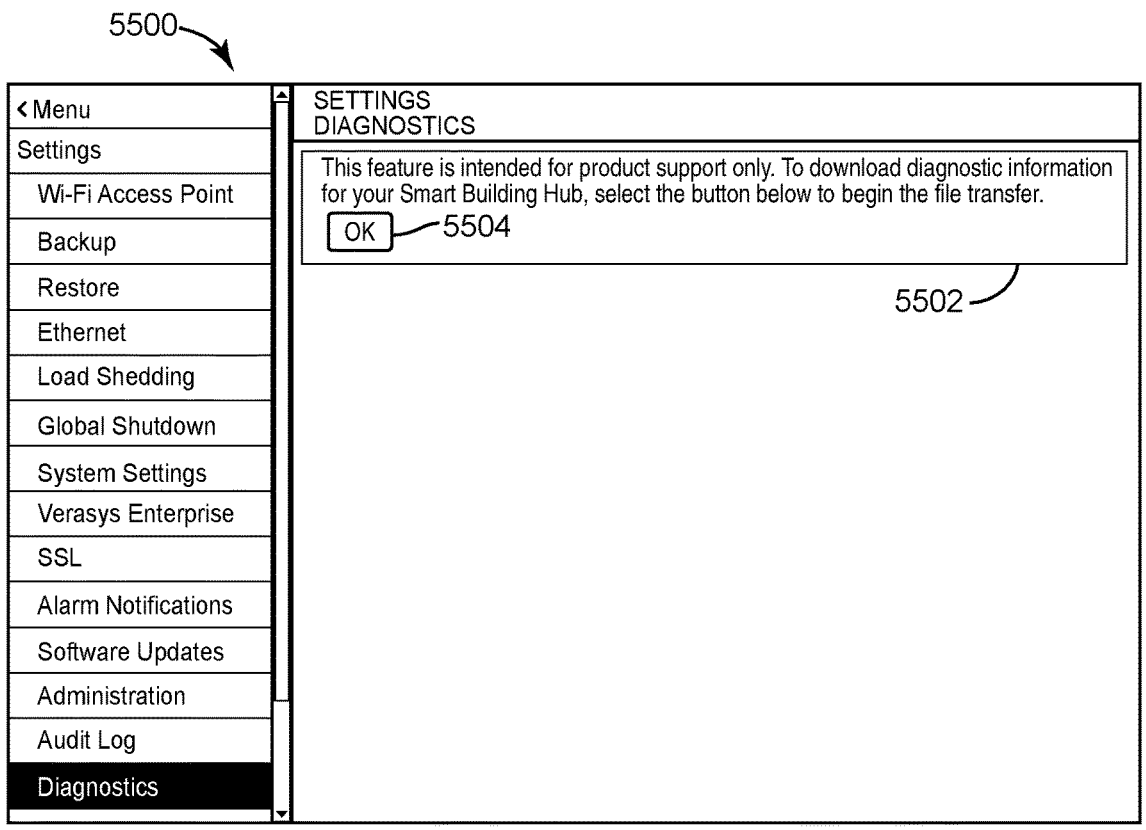
FIG. 55 is an illustration of a user interface to transfer equipment diagnostic information, according to some embodiments.

Referring now to FIG. 55, an illustration of a user interface 5500 to transfer equipment diagnostic information is shown, according to some embodiments. The user interface 5500 is shown to include a download notification 5502 and an ok button 5504.

If the user desires to view diagnostic information from an equipment malfunction, the user will navigate to the diagnostics by clicking on the diagnostics menu 5506. The user would then be routed to the user interface 5500. The download notification 5502 notifies the user that the transfer of the diagnostic file can begin after the user clicks the ok button 5504.

Equipment Diagnostics Code

Figure 56:
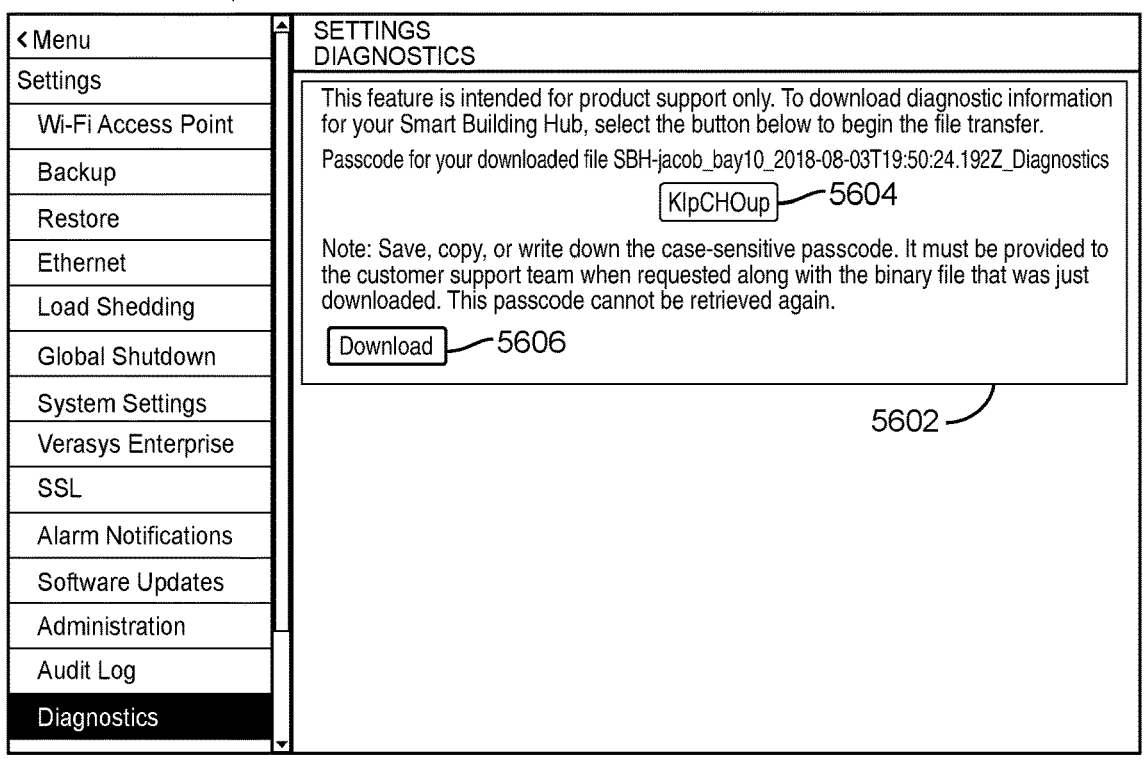
FIG. 56 is an illustration of a user interface to download equipment diagnostic information using a passcode, according to some embodiments.

Referring now to FIG. 56, an illustration of a user interface 5600 to download equipment diagnostic information using a passcode is shown, according to some embodiments. The user interface 5600 is shown to include a download notification 5602, a passcode 5604, and a download button 5606.

After clicking the ok button 5504, the user is routed to the user interface 5600 to download the diagnostics file. The download notification 5602 notifies the user that the diagnostic file can be downloaded by clicking on the download button 5606. The download notification 5602 also notifies the user that the user must have the passcode 5604 when attempting to open the diagnostic file.

The passcode 5604 is an encrypted code generated by the encrypted code generator 5306 to prevent unauthorized access to the diagnostic file. The user can download the diagnostic file by clicking on the download button 5606, but before the diagnostic file can be opened, the authorized user must provide the passcode 5604. After providing the passcode 5604, the authorized user can view the diagnostic file and analyze the data in attempts to correct the malfunction.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
building equipment operable to affect a physical state or condition of a building;
a system manager coupled to the building equipment via a system bus and in communication with a schedule manager configured to control an operation schedule of the building equipment;
at least one of the building equipment configured to communicate with the schedule manager further configured to modify the operation schedule of the building equipment or add a new operation schedule for the building equipment;
the schedule manager comprising:
a list of available schedules for the building equipment, wherein the schedule manager is configured to, in response to a modification of the operation schedule or an addition of the new operation schedule, update the list of available schedules to include the modification of the operation schedule or the new operation schedule; and
a list of available equipment to schedule comprising the building equipment in communication with the system manager;
an equipment identifier configured to identify new building equipment in communication with the building management system;
a new schedule identifier configured to identify a new schedule in the new building equipment, the new schedule being different from operation schedules located in the list of available schedules; and
an existing schedule identifier configured to identify an existing schedule in the new building equipment, the existing schedule being similar to one of the operation schedules located in the list of available schedules.

2. The building management system of claim 1, further comprising:
a schedule creator configured to create the new operation schedule for the building equipment;
a schedule updater configured to modify the operation schedule of the building equipment;
a schedule distributor configured to distribute the new operation schedule and the modified operation schedule to the building equipment; and a schedule deleter configured to delete obsolete schedules from the list of available schedules.

3. The building management system of claim 2, wherein the schedule distributor is configured to distribute a schedule to a plurality of building equipment simultaneously.

4. The building management system of claim 1, further comprising:
a list manager in communication with the schedule manager, the list manager further comprising:
the list of available schedules;
a list of available points to schedule, the list of available points to schedule comprising setpoints for the building equipment; and
the list of available equipment to schedule.

5. The building management system of claim 4, further comprising:
a point creator configured to create new setpoint templates for the building equipment;
a point updater configured to update existing setpoints in the list of available points to schedule;
a point distributor configured to distribute the new setpoint templates and the updated setpoints to the building equipment; and
a point deleter configured to delete obsolete setpoints from the list of available points to schedule.

6. The building management system of claim 5, wherein the point distributor is configured to distribute a setpoint to a plurality of building equipment simultaneously.

7. The building management system of claim 1, wherein the list of available schedules comprises weekly events that define a regular, weekly schedule for the building equipment, and exception events that define irregular schedules for the building equipment, the building equipment configured to prioritize the exception events over the weekly events.

8. The building management system of claim 1, further comprising:
an MSTP mapper created by the system manager after the equipment identifier identifies the new building equipment, the MSTP mapper configured to discover schedules and setpoints within the new building equipment.

9. The building management system of claim 1, wherein an enterprise client device is in communication with the schedule manager, the enterprise client device configured to modify the operation schedule of the building equipment or add the new operation schedule for the building equipment.

10. A method for monitoring and controlling building equipment in a building management system, the method comprising:
operating building equipment to affect a physical state or condition of a building;
identifying new building equipment in communication with the building management system;
discovering existing equipment schedules within the new building equipment, the existing equipment schedules being similar to one of a plurality of operation schedules located in a list of schedules;
discovering new equipment schedules within the new building equipment, the new equipment schedules being different from the plurality of operation schedules located in the list of schedules;
generating a template schedule based on at least one of:
an input from a user;
the existing equipment schedules; and
the new equipment schedules; and
updating the list of schedules in a schedule manager to include the new equipment schedules; and
distributing the template schedule to a plurality of building equipment simultaneously.

11. The method of claim 10, further comprising notifying the schedule manager that new equipment schedules have been discovered.

12. The method of claim 10, the discovering new equipment schedules further comprising iterating over all schedules located within the new equipment to discover the new equipment schedules.

13. The method of claim 10, wherein the list of schedules comprises a list of available schedules and a list of available points to schedule.

14. The method of claim 13, wherein the list of available schedules comprises a list of weekly schedules and list of exception schedules.

15. The method of claim 13, wherein the list of available points to schedule comprises a list of setpoints available in the building management system.

16. The method of claim 13, wherein updating the list of available schedules in the schedule manager to include the new equipment schedules comprises:
comparing the new equipment schedules with existing equipment schedules by comparing a list of property references of the new equipment schedules with a list of property references of the existing equipment schedules to determine if any of the new equipment schedules are different from the existing equipment schedules;
providing the schedule manager with different schedules, the different schedules being the new equipment schedules that are different from the existing equipment schedules; and
updating the list of schedules in the schedule manager to include only the new equipment schedules that are identified as the different schedules.

17. The method of claim 10, the plurality of building equipment comprising building equipment in a plurality of buildings.

18. A building management system comprising:
building equipment operable to affect a physical state or condition of a building;
a system manager coupled to the building equipment via a system bus and in communication with a schedule manager configured to control an operation schedule of the building equipment, the schedule manager comprising:
a list of available schedules for the building equipment; and
a list of available equipment to schedule comprising the building equipment in communication with the system manager;
an equipment identifier configured to identify new building equipment in communication with the building management system;
a new schedule identifier configured to identify a new schedule in the new building equipment, the new schedule being different from the operation schedules located in the list of available schedules;
an existing schedule identifier configured to identify an existing schedule in the new building equipment, the existing schedule being similar to one of the operation schedules located in the list of available schedules;
the system manager comprising:
a malfunction detector in communication with a diagnostic file creator, the malfunction detector configured to detect a current or future malfunction of the building equipment;

the diagnostic file creator in communication with an encrypted code generator, the diagnostic file creator configured to create a diagnostic file comprising data regarding the current or future malfunction of the building equipment; and the encrypted code generator in communication an enterprise system, the encrypted code generator configured to create a unique code related to the diagnostic file.

19. The building management system of claim 18, wherein the diagnostic file is sent to an authorized user and the unique code is sent to the authorized user and the authorized user can access the diagnostic file using the unique code along with other encrypted information.

\* \* \* \* \*